(12) United States Patent
Shimizu et al.

(10) Patent No.: US 9,815,393 B2
(45) Date of Patent: Nov. 14, 2017

(54) HEADREST FORE-AFT POSITION ADJUSTER

(71) Applicant: TS TECH CO., LTD., Asaka-shi, Saitama (JP)

(72) Inventors: Shuichi Shimizu, Tochigi (JP); Yuji Tanaka, Tochigi (JP)

(73) Assignee: TS TECH CO., LTD., Asaka-shi (JP)

( * ) Notice: Subject to any disclaimer, the term of this patent is extended or adjusted under 35 U.S.C. 154(b) by 200 days.

(21) Appl. No.: 14/834,768

(22) Filed: Aug. 25, 2015

(65) Prior Publication Data

US 2015/0360594 A1 Dec. 17, 2015

Related U.S. Application Data

(60) Division of application No. 13/693,829, filed on Dec. 4, 2012, now Pat. No. 9,150,131, which is a
(Continued)

(30) Foreign Application Priority Data

Dec. 24, 2010 (JP) ................................ 2010-288185
Jun. 3, 2011 (JP) ................................ 2011-125666

(51) Int. Cl.
 *B60N 2/48* (2006.01)
(52) U.S. Cl.
 CPC ......... *B60N 2/4864* (2013.01); *B60N 2/4844* (2013.01); *B60N 2/4847* (2013.01)
(58) Field of Classification Search
 CPC ... B60N 2/4847; B60N 2/4844; B60N 2/4841
(Continued)

(56) References Cited

U.S. PATENT DOCUMENTS

| 1,594,409 A | 8/1926 | Russel |
| 3,328,085 A | 6/1967 | Schwartz |

(Continued)

FOREIGN PATENT DOCUMENTS

| CN | 101633333 A | 1/2010 |
| CN | 101641236 A | 2/2010 |

(Continued)

OTHER PUBLICATIONS

Oct. 13, 2015 Office Action issued in Japanese Patent Application No. 2012-549869.
(Continued)

*Primary Examiner* — Sarah McPartlin
(74) *Attorney, Agent, or Firm* — Oliff PLC

(57) ABSTRACT

Disclosed is a headrest fore-aft position adjuster including a displaceable body which receives load of an occupant's head and which displaces in a fore-aft direction with respect to a headrest pillar and a lock mechanism which locks and unlocks the displaceable body at a plurality of positions along the fore-aft direction, and the lock mechanism includes an engaging part which displaces in the fore-aft direction integrally with the displaceable body, a plurality of engaged part which is provided along a trajectory of the engaging part and which the engaging part is engaged with in a locked state and the engaging part is configured to engage with the engaged parts from a lateral position.

13 Claims, 53 Drawing Sheets

Related U.S. Application Data continuation-in-part of application No. PCT/JP2011/079789, filed on Dec. 22, 2011.

(58) Field of Classification Search
USPC .................................. 297/408, 409, 216.12
See application file for complete search history.

(56) References Cited

U.S. PATENT DOCUMENTS

| | | | |
|---|---|---|---|
| 3,603,642 A | 9/1971 | Laessker | |
| 4,674,797 A | 6/1987 | Tateyama | |
| 7,431,400 B2* | 10/2008 | Brawner | B60N 2/4808 297/391 |
| 7,681,955 B2* | 3/2010 | Seo | B60N 2/4844 297/403 |
| 7,866,754 B2 | 1/2011 | Furukawa et al. | |
| 8,146,997 B2* | 4/2012 | Sobieski | B60N 2/4864 297/391 |
| 2007/0013219 A1 | 1/2007 | Chung | |
| 2007/0057559 A1 | 3/2007 | Miyahara et al. | |
| 2007/0164593 A1* | 7/2007 | Brockman | B60N 2/4847 297/408 |
| 2010/0019559 A1* | 1/2010 | Smith | B60N 2/4864 297/408 |
| 2011/0095592 A1* | 4/2011 | Willard | B60N 2/4844 297/408 |

FOREIGN PATENT DOCUMENTS

| | | |
|---|---|---|
| CN | 101665091 A | 3/2010 |
| DE | 19951966 A1 | 5/2001 |
| FR | 2 796 822 A1 | 2/2001 |
| GB | 2 016 916 A | 9/1979 |
| JP | 60-179359 A | 9/1985 |
| JP | H03-039080 U | 4/1991 |
| JP | 03-39080 Y2 | 8/1991 |
| JP | 07-11646 Y2 | 3/1995 |
| JP | 08-052044 A | 2/1996 |
| JP | 2671134 B2 | 10/1997 |
| JP | 2000-225036 A | 8/2000 |
| JP | 2000-342379 A | 12/2000 |
| JP | 4430664 B2 | 3/2010 |
| JP | 4560731 B2 | 10/2010 |
| WO | 2009/103616 A2 | 8/2009 |

OTHER PUBLICATIONS

Jan. 26, 2015 Office Action issued in Chinese Patent Application No. 201180062427.9.

Jun. 25, 2013 International Preliminary Report on Patentability issued in International Application No. PCT/JP2011/079789.

Mar. 19, 2012 International Search Report issued in International Patent Application No. PCT/JP2011/079789.

Apr. 1, 2017 Office Action Issued in Chinese Patent Application No. 201510810532.6.

Jul. 14, 2017 Search Report issued in European Patent Application No. 11850792.0.

* cited by examiner

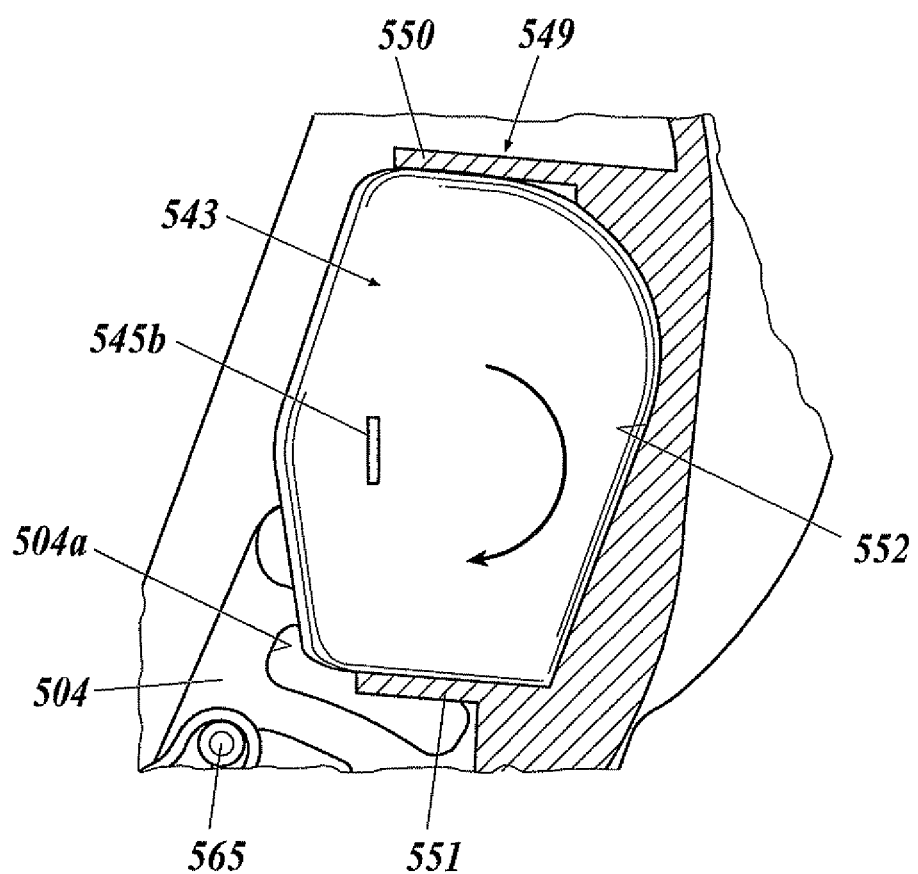

US 9,815,393 B2

HEADREST FORE-AFT POSITION ADJUSTER

CROSS REFERENCE TO RELATED APPLICATION

This application is a Divisional application of U.S. patent application Ser. No. 13/693,829 filed Dec. 4, 2012 which is a Continuation-in-Part (CIP) of International Application No. PCT/JP2011/079789 filed on Dec. 22, 2011 which claims priority to Japanese Patent Application No. 2010-288185 filed on Dec. 24, 2010 and Japanese Patent Application No. 2011-125666 filed on Jun. 3, 2011. The disclosure of each of the prior applications is hereby incorporated by reference in its entirety.

BACKGROUND OF THE INVENTION

1. Field of the Invention

The present invention relates to a fore-aft position adjuster for adjusting the fore-aft position of a headrest provided to a vehicle seat.

2. Description of Related Art

Headrests of vehicle seats are provided in order to improve comfort when seated on the seats, as well as to improve safety by supporting a head at the collision of a vehicle.

To achieve the comfort and safety by means of headrests, it is important that the headrests are located on a correct position with respect to an occupant's head. For this reason, techniques of adjusting not only the height of a headrest by the use of a pillar but also its fore-aft position have been developed (for example, see JP H08-052044).

SUMMARY OF THE INVENTION

However, to compose the fore-aft position adjuster of patent document 1, it requires such parts as a long shaft which is provided in the fore-aft direction of a headrest, a relatively large part like a long frame which is provided in the lateral direction of the headrest, and many processed parts with holes, grooves and the like. The use of such large parts and many well-processed parts may results a complex overall structure as well as heavy weight.

It is an object of the present invention to provide a headrest fore-aft position adjuster which is lighter and simpler than conventional ones.

In order to achieve the above object, a headrest fore-aft position adjuster according to an aspect of the present invention comprises: a displaceable body which receives a load of an occupant's head and which displaces in a fore-aft direction with respect to a headrest pillar; and a lock mechanism which locks or unlocks the displaceable body in a plurality of positions along the fore-aft direction, wherein the lock mechanism comprises: an engaging part which displaces integrally with the displaceable body in the fore-aft direction, a plurality of engaged parts which are provided along a trajectory of the engaging part and with which the engaging part is engaged in a locked state, and the engaging part is configured to engage with the engaged parts from a lateral position.

BRIEF DESCRIPTION OF THE DRAWINGS

The present invention will become more fully understood from the detailed description given hereinbelow and the appended drawings, and thus are not intended as a definition of the limits of the present invention, and wherein:

FIG. 37B is a view showing an attached state of an other-end engaging member;

DETAILED DESCRIPTION OF THE PREFERRED EMBODIMENTS

Hereinafter, embodiments of the present invention will be described with reference to the drawings.

First Embodiment

A headrest fore-aft position adjuster of the embodiment includes: a displaceable body (upper bracket 120) which receives load of an occupant's head and which displaces in the fore-aft direction with respect to a headrest pillar, and a lock mechanism which locks and unlocks the displaceable body at a plurality of positions along the fore-aft direction. The lock mechanism includes an engaging part (lock pin 161) which displaces integrally with the displaceable body in the fore-aft direction, and a plurality of engaged parts (lock holes 133) which are provided along the trajectory of the engaging part and which the engaging part is engaged with in a locked state. The engaging part is configured to engage with the engaged parts from a lateral position.

Hereinafter the embodiment will be described in more detail.

Figure 1:
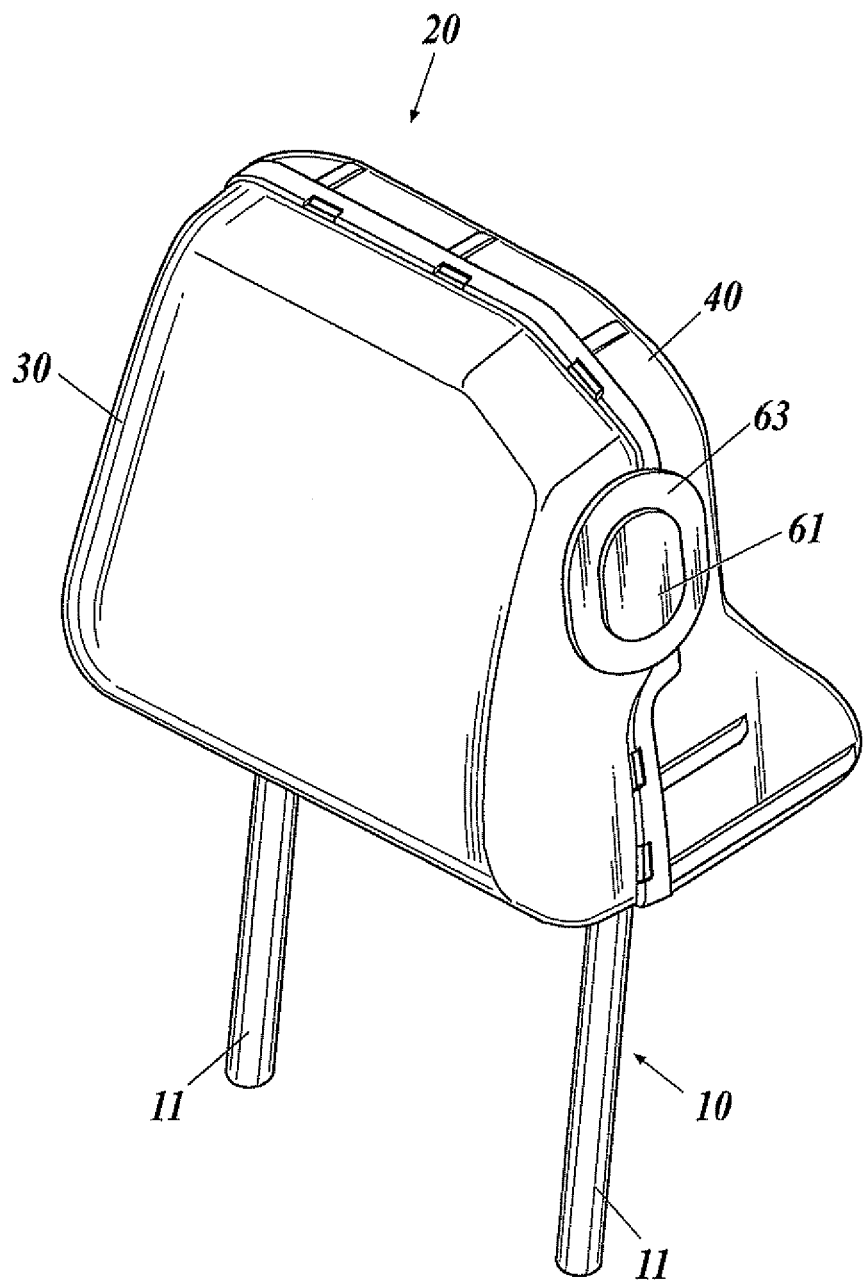
FIG. 1 is a perspective view showing an inner cover of a headrest in a state where a fore-aft position adjuster is housed.
Figure 2:
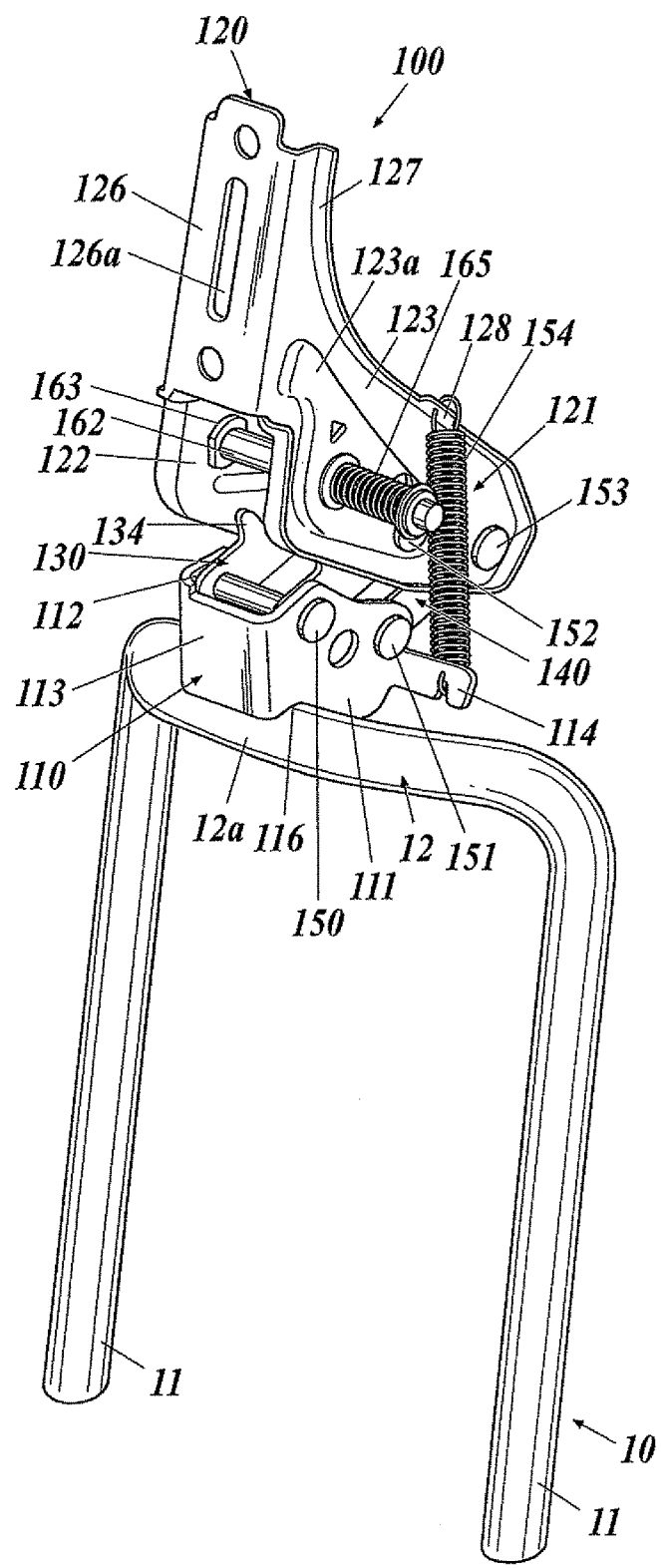
FIG. 2 is a perspective view showing an example of a fore-aft position adjuster.

FIG. 1 is a perspective view showing an inner cover 20 of a headrest which is provided at the upper end of a seat back of a vehicle seat, and FIG. 2 is a perspective view showing an example of a fore-aft position adjuster 100 according to the present invention.

In FIG. 1, reference numeral 10 represents a headrest pillar. The headrest pillar 10 includes a pair of side pillars 11 and 11 which are separately provided on either side, and an upper pillar 12 which is integrally formed between the upper ends of these side pillars 11 and 11. The upper pillar 12 has such a curved shape that a center part 12a locates at a position superior and anterior to the upper ends of the side pillars 11 and 11.

The fore-aft position adjuster 100 is attached on the upper part of the center part 12a of the upper pillar 12. Further, the fore-after position adjuster 100 is housed in the inner cover 20.

The inner cover 20 is dividedly composed of a front cover 30 which is located at the front side of the vehicle seat in the fore-aft direction, and a rear cover 40 which is located at the rear side.

Further, the inner cover 20 is covered with a pad 64 (not shown).

Figure 3:
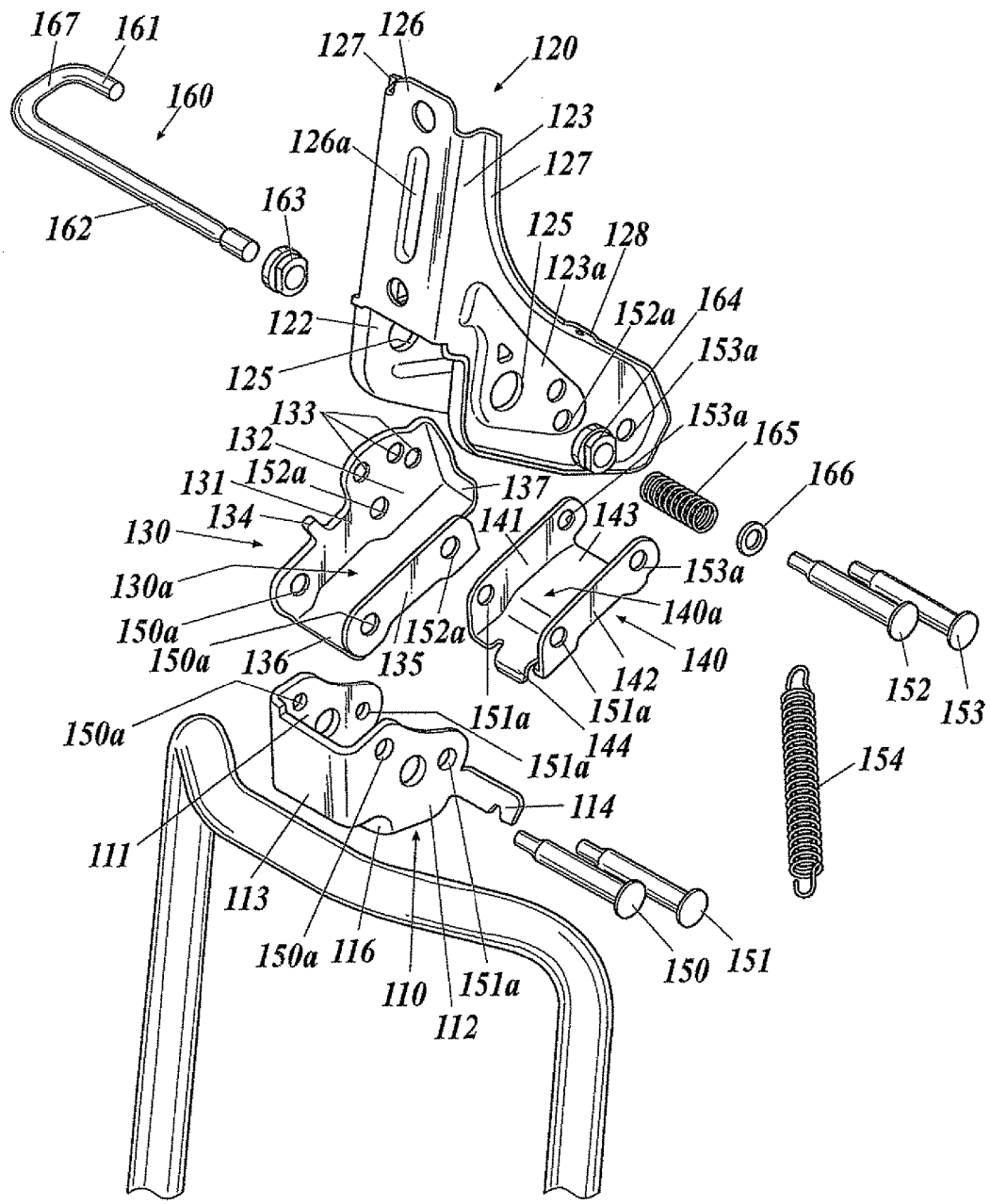
FIG. 3 is an exploded view of the fore-aft position adjuster shown in FIG. 2.
Figure 4:
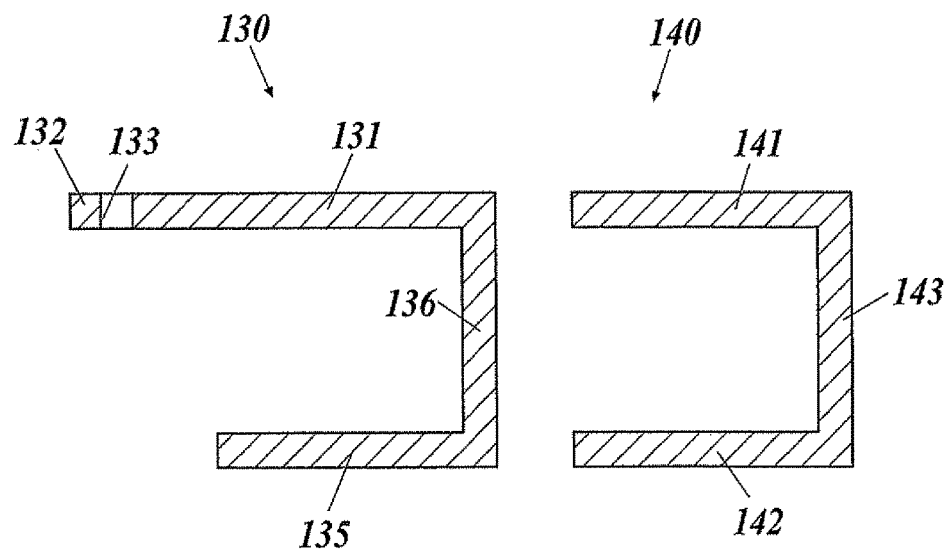
FIG. 4 is a cross-sectional view showing one and the other links.

As shown in FIGS. 2 and 3, the fore-aft position adjuster 100 includes: a lower bracket 110 which is fixed to the headrest pillar 10; an upper bracket 120 as the displaceable body which is fixed to the inner cover 20; one and the other links 130 and 140 which are each pivotally connected to the lower bracket 110 and upper bracket 120 and which are placed approximately in parallel with each other and which allows the upper bracket 120 to move along the fore-aft direction of the vehicle seat; and the lock mechanism which locks and unlocks the upper bracket 120 at a plurality of positions along the fore-aft direction.

A button 61 is provided on the side face of the inner cover 20, which is an operation part for unlocking the lock of the lock mechanism. The button 61 is held on the inner cover 20 by a decoration member 63 which holds the button 61 as well as decorates the surroundings of the button 61.

As shown in FIGS. 2, 3, 7A, 7B and 7C, the lower bracket 110 includes a pair of side walls 111 and 112 which are opposed to each other, a front wall 113 which is integrally formed between the front ends of the side walls 111 and 112, a lower wall 115 which are integrally provided between the lower ends of the side walls 111 and 112, and a cutoff concave 116 which is formed by cutting out an edge defined by the side walls 111 and 112, front wall 113 and lower wall 115 in a concave shape along its longitudinal direction.

The cutoff concave 116 has a curvature which fits the outer face of the center part 12a of the upper pillar 12, and is adapted to closely contact with the center part 12a.

A mount 114 is integrally provided at the rear end of the side wall 112, and protrudes sideward from the side wall 112, and is attached with a biasing unit 154 described below.

As shown in FIGS. 2, 3, 5A, 5B, 7A, 7B and 7C, the upper bracket 120 includes a bracket body 121, and a front fixed part 126 which is provided at the front end of the bracket 121 and which is fixed on the inner wall of the front cover 30 of the inner cover 20.

Further, the bracket body 121 is perpendicular to the front fixed part 126, and includes a pair of side walls 122 and 123 which are opposed to each other.

The pair of side walls 122 and 123 has such a curved shape that they gradually rises up obliquely upward with the distance to their front ends. The front fixed part 126, which is provided at the front end of the bracket body 121, is accordingly located higher than the bracket body 121 to which pivot connections and the lock mechanism are provided.

The front fixed part 126 is a plate which is fixed on the inner wall of the front cover 30 of the inner cover 20, and is provided with a bead 126a in the center portion in order to increase the rigidity.

Further, a flange 127 is formed at the edges of the side walls 122 and 123.

Furthermore, to the flange 127 at the upper part around the center portion of the side wall 123, a mount 128 is integrally provided and protrudes sideward from the flange 127. The mount 128 is attached with the upper end of the biasing unit 154 described below.

One link 130 is provided in front, and the other link 140 is provided at the back (hereinafter, referred to as front link 130 and rear link 140 respectively).

As shown in FIGS. 2 to 4, 7A, 7B and 7C, these front link 130 and rear link 140 are each pivotally connected to the lower bracket 110 and upper bracket 120, and placed approximately in parallel with each other. Accordingly, the fore-aft position adjuster 100 is provided with these front link 130, rear link 140, lower bracket 110 and upper bracket 120 so as to form a so-called "parallel linkage mechanism".

The front link 130 and rear link 140 are placed approximately in parallel with each other in the embodiment, however they are not limited thereto. For example, they may be placed in an inverted V-shape or modified in any way without being apart from the scope of the invention.

Further, the front link 130 and rear link 140 are each formed in an approximately U-shape in the cross section with respective openings 130a and 140a. These front link 130 and rear link 140 are placed with their respective openings 130a and 140a facing forward.

The front link 130 is formed in an approximately U-shape in the cross section, and thus includes a pair of side walls 131 and 135 which are opposed to each other, and a center wall 136 which is integrally provided between the rear ends of these side walls 131 and 135. Further, a stopper 134 is integrally provided to the side wall 131 of this front link 130, and protrudes forward. The stopper 134 regulates that the front link 130 and rear link 140 rotate forward.

The rear link 140 is formed in an approximately U-shape in the cross section, and thus includes a pair of side walls 141 and 142 which are opposed to each other, and a center wall 143 which is integrally provided between the rear ends of these side walls 141 and 142. On the center wall 143, a stopper 144 which abuts the lower wall 115 is further integrally provided.

Further, as shown in FIGS. 2, 3, 7A, 7B and 7C, the pivot connection between the lower bracket 110 and front link 130 is located higher than the pivot connection between the lower bracket 110 and rear link 140.

Further, the pivot connection between the upper bracket 120 and front link 130 is located higher than the pivot connection between the upper bracket 120 and rear link 140.

In other words, the pivot connections between brackets 110 and 120 and link 130 and 140 are obliquely aligned in parallel, in which the front connections are located higher than the rear connections. Accordingly, the front link 130 is located higher than the rear link 140. If the front link 130 and rear link 140 are positioned at the rearmost ends of their ranges of rotation, the front link 130 overrides the rear link 140 as shown in FIG. 7C.

As the pivot connections between brackets 110 and 120 and link 130 and 140 are obliquely aligned in parallel, the upper bracket 120 is also provided obliquely.

Further, if the front link 130 and rear link 140 are positioned at the rearmost ends of their ranges of rotation, the front end of the bracket body 121 of the upper bracket 120 overhangs forward over the pivot connection between the upper bracket 120 and front link 130. In more detail, as shown in FIG. 7C, if the front link 130 and rear link 140 are positioned at the rearmost ends of their ranges of rotation, the front fixed part 126 is located in the forefront of the fore-aft position adjuster 100 in the horizontal direction while the rear end of the bracket body 121 is located at the end of the fore-aft position adjuster 100 in the horizontal direction.

The pivot connections have such a structure that rivets 150, 151, 152 and 153 are inserted through rivet holes 150a, 151a, 152a and 153a which are respectively through the brackets 110 and 120 and links 130 and 140, and the rivets 150, 151, 152 and 153 are swaged at the inserted tips.

Specifically, the pivot connection between the lower bracket 110 and front link 130 has such a structure that the rivet 150 is inserted through the rivet hole 150a which is through these lower brackets 110 and front link 130, and the rivet 150 is swaged at the inserted tip.

Also, the pivot connection between the lower bracket 110 and rear link 140 has a such structure that the rivet 151 is inserted through the rivet hole 151a which is through these lower brackets 110 and rear link 140, and the rivet 151 is swaged at the inserted tip.

Also, the pivot connection between the upper bracket 120 and front link 130 has a such structure that the rivet 152 is inserted through the rivet hole 152a which is through these upper brackets 120 and front link 130, and the rivet 152 is swaged at the inserted tip.

Also, the pivot connection between the upper bracket 120 and rear link 140 has such a structure that the rivet 153 is inserted through the rivet hole 153a which is through these upper brackets 120 and rear link 140, and the rivet 153 is swaged at the inserted tip.

Further, as shown in FIGS. 2 and 3, a biasing member 154 is provided between the upper bracket 120 and lower bracket 110. The biasing unit 154 biases the upper bracket 120 toward the lower bracket 110.

A coil spring is employed as the biasing unit 154, in which the lower end of the coil spring 154 is attached to the mount 114 which is provided to the lower bracket 110, and the upper end is attached to the mount 128 which is provided to the upper bracket 120.

The coil spring 154 pulls the lower bracket 110 and upper bracket 120 toward each other. Thus, if the movement of the upper bracket 120 is not locked by the lock mechanism, the front link 130 is located closely over the rear link 140, and the upper and lower brackets 110 and 120 are located close to each other as shown in FIG. 7C.

As shown in FIGS. 2 to 7A, 7B and 7C, the lock mechanism includes: a plurality of lock holes 133 . . . which are aligned along the rotating direction of the front link 130 on the side wall 131 of the front link 130 opposed to the upper bracket 120 and which function as the engaged parts; a through hole 124 which is provided on the side wall 122 of the upper bracket 120 opposed to the upper link 130, specifically on the rotational trajectory of the plurality of lock holes 133 . . . according to the rotation of the upper link 130; and a lock member 160 which includes at least a lock pin 161 which functions as the engaging part as its tip is pushed into and pulled out from the plurality of the lock holes 133 while it remains inserted through the through hole 124.

The lock mechanism also includes a lock plate 132 which is integrally provided at the upper end of the side wall 131 of the front link 130 and on which the plurality of lock holes 133 . . . are formed.

The lock plate 132 is wider than the side wall 131 of the front link 130, and overhangs forward over the front end of the side wall 131. On the lock plate 132, the plurality of lock holes 133 . . . are formed from one end to the other end of the lock plate in the width direction, as well as they are aligned along the rotational direction of the front link 130.

The plurality of lock holes 133 . . . penetrates the lock plate 132 in the thick thickness direction of the lock plate 132. In the embodiment, three lock holes 133 are formed on the lock plate 132. The number of the lock holes 133 is however not limited thereto, as long as it is plural.

Since the lock plate 132 and the plurality of lock holes 133 . . . constitute the lock mechanism, the front link 130, where the lock plate 132 is provided, may be subjected to external force compared to the rear link 140.

To cope with this, as shown in FIG. 3, a reinforcing wall 137 is provided at the upper end of the upper link 130, and is integrally formed with the upper end of the side wall 131 including the lock plate 132 and the upper end of the center wall 136. Specifically, in order to produce the front link 130, the side wall 131 including the lock plate 132, center wall 136 and reinforcing wall 137 are formed from a steel material, which is the material of the front link 130, by drawing or the like. The side wall 135, which is opposed to the side wall 131, is integrally formed with the center wall 136 by bending or the like.

Figure 5A:
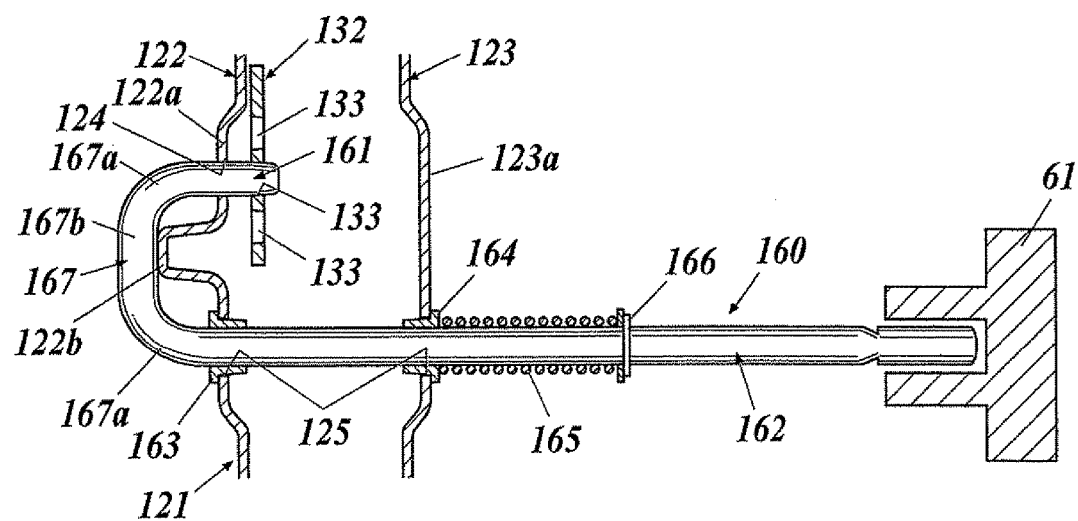
FIG. 5A is a cross-sectional view of an example of a lock mechanism in a locked state.
Figure 5B:
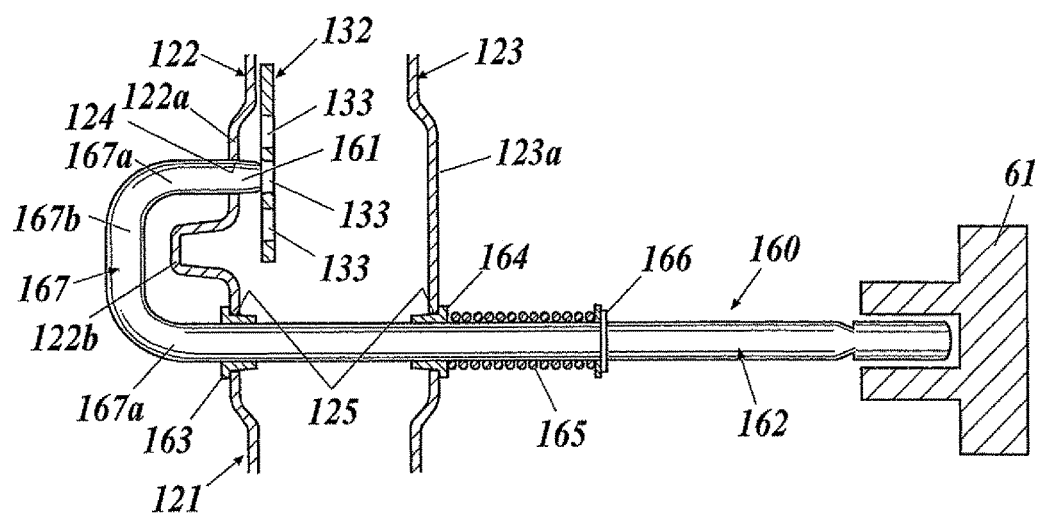
FIG. 5B is a cross-sectional view of an example of a lock mechanism in an unlocked state.

As shown in FIGS. 5A and 5B, the through hole 124 is formed on the side wall 122 of the bracket body 121 of the bracket 120, and penetrates the side wall 122 in the thickness direction. Further, on the side wall 122, the through hole 124 is specifically located at a point on the rotational trajectory of the plurality of lock holes 133 . . . which are provided on the front link 130.

At the part where the through hole 124 is formed, the side wall 122 has a step 122a which protrudes outward in a table shape. The step 122a is formed from the side wall 122 by drawing or the like.

Furthermore, as shown in FIGS. 2, 3, 5A and 5B, a step 123a is also formed on the side wall 123 which is opposed to the side wall 122 in the upper bracket 120 in a symmetric manner with the side wall 122.

A shaft insertion hole 125 is provided on the upper bracket 120, and penetrates the upper bracket 120 laterally. Specifically, the shaft insertion hole 125 represent holes which are formed on the step 122a of the side wall 122 and the step 123a of the side wall 123 at the positions opposed to each other. A shaft 162 described below is inserted through the shaft insertion hole 125.

As shown in FIGS. 3, 5A and 5B, the lock member 160 is composed of: the lock pin 161; a shaft 162 which is placed in parallel with the lock pin 161 and which is inserted through the shaft insertion hole 125 which penetrates the upper bracket 120 laterally; and a connection part 167 which connects the lock pin 161 with shaft 162 and which abuts and separates from the side wall 122 of the upper bracket 120 according to the pushing-in and pulling-out movement of the lock pin 161.

These lock pin 161, shaft 162 and connection part 167 are integrally configured in an approximately J-shape. That is, the lock member 160 is formed from one metal rod by bending.

Figure 6:
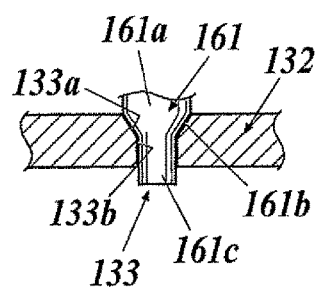
FIG. 6 is a cross-sectional view showing shapes of a lock pin and lock hole in a pushed-in state.

As shown in FIGS. 5A, 5B and 6, the lock pin 161 includes a shaft body 161a, a taper 161b which is provided at the tip of the shaft body 161a and which narrows in diameter toward the tip of the lock pin 161 in the axis direction, and a shaft tip 161c which is provided at the tip of the taper 161b and which is adapted to have a smaller diameter than the shaft body 161a. In short, the tip of the lock pin 161 narrows in diameter in a stepwise manner.

Corresponding to such configuration of this lock pin 161, the hole wall of each lock hole 133 is composed of a tapered support 133a which receives the taper 161b of the lock pin 161 and a tip support 133b which receives the shaft tip 161c.

When the lock pin 161 is pushed into the lock hole 133, the taper 161b of the lock pin 161 abuts the tapered support 133a of the hole wall of the lock hole 133, as well as the shaft tip 161c abuts the tip support 133b.

As shown in FIGS. 2, 3, 5A and 5B, the shaft 162 penetrates at least the upper bracket 120 laterally, and has a length enough to extend laterally beyond the side walls 122 and 123.

Further, a biasing member 165 is provided to the shaft 162, and biases the shaft 162 in such a direction that the connection part 167 abuts the side wall 122 of the upper bracket 120 as well as the lock pin 161 is pushed into the lock hole 133.

In the embodiment, a coil spring is employed as the biasing member 165, and is fitted on the shaft 162 Specifically, the coil spring 165 is fitted on the part of the shaft 162 which is extended from the side wall 123, in which the shaft 162 is inserted from the side wall 122 through the shaft insertion hole 125 so as to protrude from the side wall 123.

More specifically, the coil spring 165, which is the biasing member, is provided to the shaft 162 in such a manner that the biasing direction of the coil spring 165 agrees with the axis of the shaft 162. That is, it is advantageous that since the axis of the shaft 162 is coordinated with the biasing direction of the coil spring 165, the shaft 162 easily move in the biasing direction of the coil spring 165.

Further, a push nut 166 is fitted and fixed to the shaft 162, where the coil spring 165 is provided between the push nut 166 and the side wall 123.

That is, the push nut 166 is provided as a retainer which prevents the coil spring 165 from falling off from the shaft 162. Furthermore, it can prevent the shaft 162 from coming off from the shaft 125, even if the shaft itself is moved back and forth along the shaft insertion hole 125.

As shown in FIGS. 5A and 5B, a stroke of the shaft 162 in the direction opposite to the biasing direction of the coil spring 165 is adapted to be shorter than such a stroke that the lock pin 161 falls off from the through hole 124.

Specifically, in a state where the lock pin 161 is inserted through the through hole 124 and lock hole 133, the shaft tip 161c can be pulled out of the lock hole 133 and pushed into the lock hole 133 while the shaft body 161a is kept penetrating through the through hole 124.

Further, as described above, the step 122a is formed on the side wall 122, and the through hole 124 is formed on the step 122a. The through hole 124 is accordingly located outside by the protruded length of the step 122a with respect to the other part of the side wall 122 than the part of the step 122a.

That is, the through hole 124 is located closer to the base end (connection part 167 of the shaft body 161) of the lock pin 161 than to the tip (shaft tip 161c).

Bushes 163 and 164 are respectively fitted in the holes on the side wall 122 and side wall 123 which constitutes the shaft insertion hole 125 so that the shaft 162 can move back and forth smoothly.

Further, the button 61 is provided at the opposite end of the shaft 162 to the end with the connection part 167. For unlocking, this button 61 is pushed in, and the shaft 162 thus moves the lock pin 161 in such a direction that it is pulled out from the lock hole 133.

Specifically, the shaft 162 works as an interlock which connects the lock pin 161 with button 61 and moves in conjunction with the movement of the button 61.

Further, after the button 61 is pushed in so as to operate the lock pin 161 through the shaft 162 which moves in conjunction with the movement of the button 61, the biasing member 165 can bring the shaft 162 back to the original position. That is, since the button 61 and shaft 162 moves together, the button 61 can be brought back to the original position as well as the shaft 162. The lock pin 161 can also be brought back to the original position accordingly. This enables to operate the lock pin 161 with the button 61 repeatedly.

As shown in FIGS. 2, 5A and 5B, the connection part 167 includes flexion parts 167a and 167a in which the lock member 160 is formed in an approximately J-shape so that the lock pin 161 and shaft 162 are integrally provided at their respective ends, and a straight part 167b which is provided between the flexion parts 167a and 167a.

Here, if the connection part 167 has such a shape as to include the flexion parts 167a and 167a as above, the flexion parts 167a and 167a may get stuck with the edges of through hole 124 and shaft insertion hole 125 respectively, when the lock pin is inserted through the through hole 124 and the shaft 162 is inserted through the shaft insertion hole 125. In order to prevent this, a convex 122b is provided to the step 122a of the upper bracket 120. As shown in FIGS. 5A and 5b, the convex 122b protrudes outward, and abuts the straight part 167b of the connection part 167 at least at a point when the lock pin 161 is inserted in the lock hole 133.

In the embodiment, this convex 122b is formed in a table shape on the step 122a by drawing or the like. It is however not limited thereto, and a blunt convex which is prominent from the surface of the step 122a or a lanced convex which is formed by lancing a part of the step 122a may be possible, for example.

In the embodiment, the lock member 160 has an approximately J-shape where the lock pin 161, shaft 162 and connection part 167 are formed integrally as described above. It is however not limited thereto, and may be modified without departing from the scope of the invention. For example, the parts 161, 162 and 167 may not be formed integrally, or a different mechanism may be employed.

Next, movement of the fore-aft position adjuster 100 as configured above will be described.

Figure 7A:
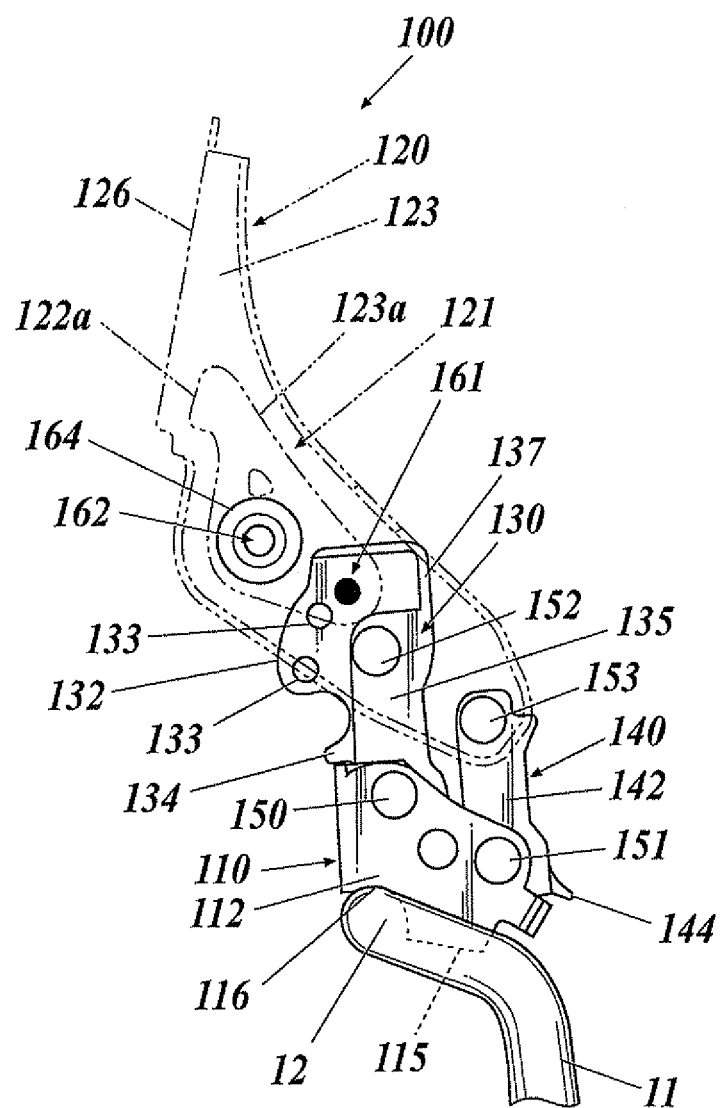
FIG. 7A is an explanatory view for describing movement of the fore-aft position adjuster shown in FIG. 2.
Figure 7B:
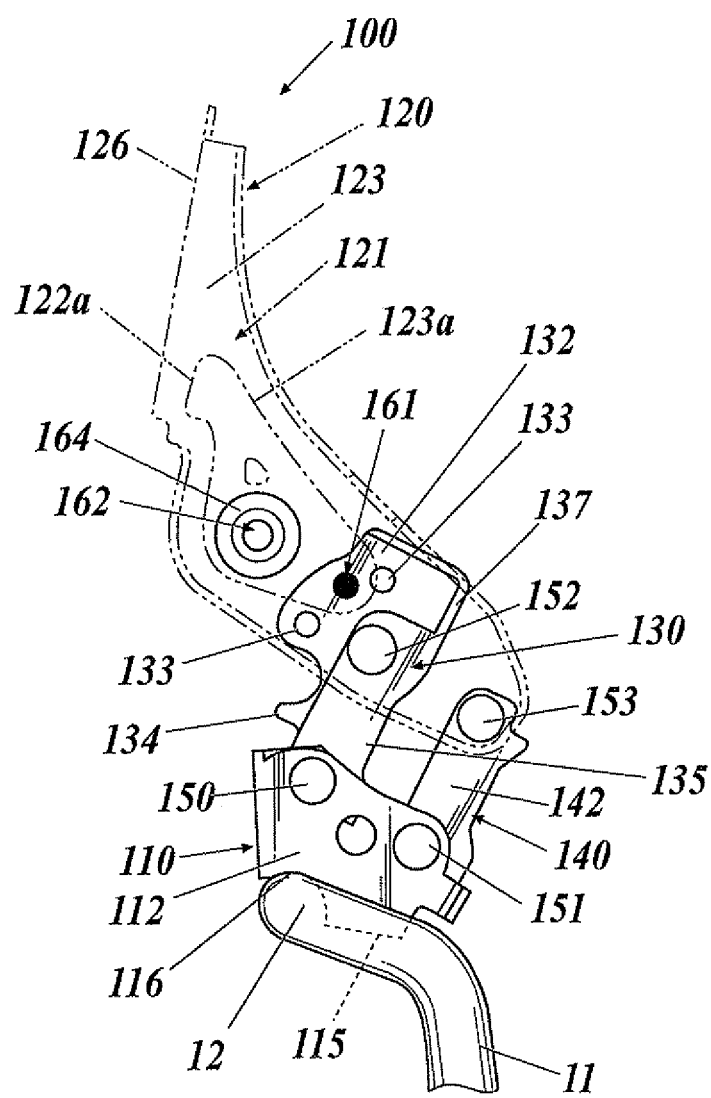
FIG. 7B is an explanatory view for describing movement of the fore-aft position adjuster shown in FIG. 2.
Figure 7C:
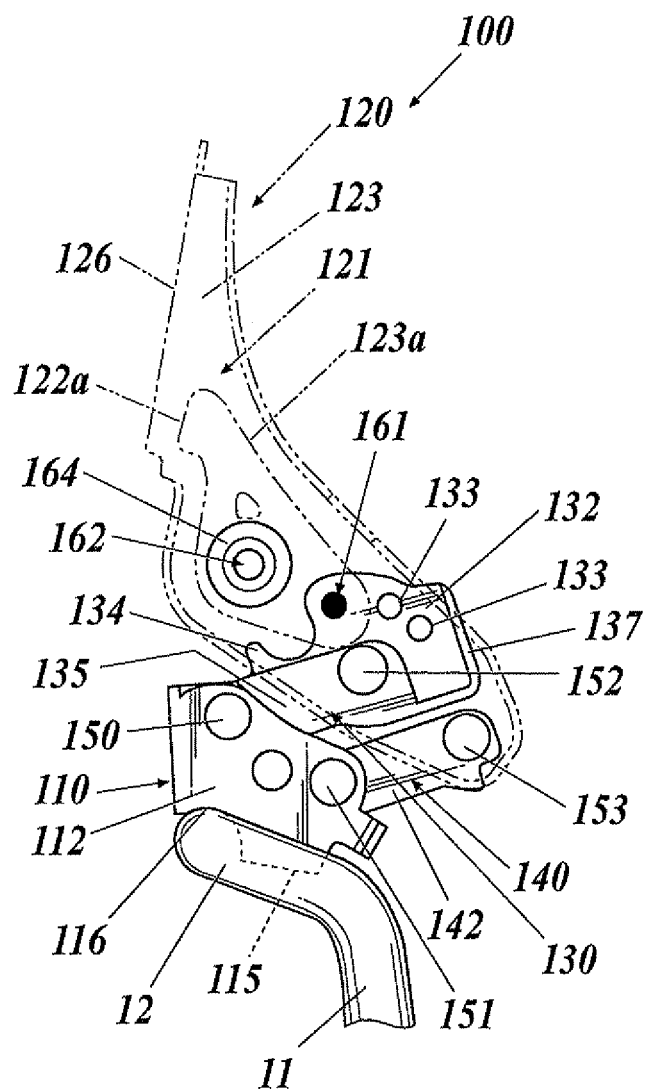
FIG. 7C is an explanatory view for describing movement of the fore-aft position adjuster shown in FIG. 2.

As shown in FIGS. 7A, 7B and 7C, the movement is based on the movement of the upper bracket 120 in the fore-aft direction which is associated with the rotation of the front link 130 and rear link 140.

Since the upper bracket 120 is pulled toward the lower bracket 110 by the coil spring 154, the state shown in FIG. 7C shows a normal position of the headrest whose position is to be adjusted.

At this normal position, the front link 130 and rear link 140 are located at the rearmost ends of their range of rotation. Further, the front fixed part 126 of the upper bracket 120 is located in the forefront of the fore-aft position adjuster 100 in the horizontal direction, and the rear end of the bracket body 121 is located at the backmost position of the fore-aft position adjuster 100 in the horizontal direction. Further, the stopper 144, which is provided on the center wall 143 of the rear link 140, abuts the lower wall 155 of the lower bracket 110.

Further, the lock pin 161 of the lock member 160 is inserted in the foremost lock hole 133 among the plurality of the lock holes 133 which are formed on the lock plate 132.

Next, let it move from the state shown in FIG. 7C to the state shown in FIG. 7B.

That is, as shown in FIG. 5B, pull out the lock pin 161 of the lock member 160 from the lock hole 133 while it remains inserted through the through hole 124 so as to unlock the lock.

Subsequently, let the front link 130 and rear link 140 rotate forward (upward) so as to move the upper bracket 120 upward.

Then, when the front link 130 and rear link 140 rotates and the lock pin 161 thus reaches a position of a center lock hole 133 of the plurality of lock holes 133 . . . , push in this lock pin 161 to the center lock hole 133 as shown in FIG. 5A.

Since the lock pin 161 is biased by the coil spring 165 in such a direction that it is pushed into the lock hole 133, once the upper bracket 120 is moved in the unlocked state and the lock pin 161 thus reaches the position of the next lock hole 133, the lock pin 161 is then automatically pushed into this next lock hole 133 by the biasing force.

When the lock pin 161 is automatically pushed into the next lock hole 133 by the biasing force, the shaft tip 161c of the lock pin 161 slides along the tapered support 133a of the lock hole 133 to the tip support 133b. That is, the tapered support 133a can be used as a guide for pushing in the lock pin 161 to the lock hole 133.

Subsequently, let it move from the state shown in FIG. 7B to the state shown in FIG. 7A.

That is, unlock the lock member 160 and then let the upper bracket 120 move forward.

Then, let the front link 130 and rear link 140 rotate until the lock pin 161 reaches the position of the rearmost lock hole 133 of the plurality of lock holes 133 . . . , and push in the lock pin 161 to this rearmost lock hole 133.

In this state, the stopper 134, which is provided on the side wall 131 of the front link 130, abuts the front wall 113 of the lower bracket 110, and the front link 130 and rear link 140 are positioned at the foremost ends of their ranges of rotation. Accordingly, the front end of the upper bracket 120 is also positioned at the foremost position.

Further, not only the movement from the state shown in FIG. 7C to the state shown in FIG. 7B to the state shown in FIG. 7A, but also the opposite movement or direct movement from the state shown in FIG. 7C to the state shown in FIG. 7A is possible.

In view of the foregoing, the upper bracket 120 is adjustable in fore-aft position among the state shown in FIG. 7A, state shown in 7B and state shown in FIG. 7C. Accordingly, the inner cover 20, which the front fixed part 126 of the upper bracket 120 is fixed to, is also adjustable in fore-aft position according to the movement of the upper bracket 120. Eventually, the headrest itself is adjustable in fore-aft position.

According to the embodiment, the fore-aft position of the displaceable body is adjustable only by engaging the engaging part with the plurality of the engaged parts which are provided along the trajectory of the engaging part. Furthermore, since the engaging part is configured to engage with the engaged part from the lateral position, it does not require, for example, a conventional long shaft provided along the fore-aft direction of the headrest. As a result, it can be avoided that the headrest gets long, i.e. thick in the fore-aft direction.

In more detail, since the upper bracket 120 can be moved in the fore-aft direction according to the rotation of the front and rear links 130 and 140, the inner cover 20 of the head rest which is fixed to the upper bracket 120 can also be moved in the fore-aft direction.

Further, the lock pin 161 remains inserted through the through hole 124 which is provided on the rotational trajectory of the plurality of lock holes 133 . . . while its tip is pushed into and pulled out from the plurality of lock holes 133 . . . . Thus, while the lock pin 161 is inserted in one of the plurality of the lock holes 133 . . . , the fore-aft movement of the upper bracket 120 is locked by holding the rotation of the front link 130 and rear link 140. While the lock pin 161 is out of the plurality of lock holes 133 . . . , the locked fore-aft movement of the upper bracket 120 is unlocked by allowing the front link 130 and rear link 140 to rotate.

In this way, the simple and lightweight headrest fore-aft position adjuster can be composed without using relatively large parts which correspond to the size of the headrest as well as many processed parts with holes, grooves and the like.

Further, by pushing in the shaft 162 in a direction of compressing the coil spring 165 along the shaft insertion hole 125, the lock pin 161 is operably moved in a direction of pulling it out from the lock hole 133 as well as the connection part 167 is operably moved in a direction of separating it from the side wall 122 of the upper bracket 120. Further, since the shaft 162 is biased by the coil spring 165, when the push-in operation along the shaft insertion hole 125 is stopped, the lock pin 161 is pushed into the lock hole 133 as well as the connection part 167 abuts the side wall 122 of the upper bracket 120.

Further, since the shaft 162 penetrates the upper bracket 120 laterally and is also biased by the coil spring 165, the shaft 162 can be prevented from falling off from the upper bracket 120, and the lock mechanism 160 itself can be thus prevented from falling off from the upper bracket 120.

Further, since the connection part 167 abuts the side wall 122 of the upper bracket 120, the connection part 167 can be used as a stopper which prevents the lock pin 161 biased by the coil spring 165 from being pushed in unnecessarily deep to the plurality of lock holes 133 . . . .

Further, since the lock member 160 can be relatively a small component which is composed of the lock pin 161, shaft 162 and connection part 167, it can contribute to simplification and weight reduction of the fore-aft position adjuster 100.

Further, since the stroke of the shaft 162 is adapted to be shorter than such a stroke that the lock pin 161 falls off from the through hole 124, the lock pin 161 can be reliably prevented from falling off from the through hole 124 even if the lock pin 161 operably moves in such a direction that the lock pin 161 falls off from the through hole 124. Further, the step 122a protrudes outward from the side wall 122 of the upper bracket 120, and the through hole 124 is formed on the step 122a. Thus, when the lock pin 161 is displaced in a direction of removing it from through hole 124, the through hole 124 is located closer to a base end of the lock pin 161 than to its tip. In this way, the lock pin 161 can be reliably prevented from falling off from the through hole 124.

Further, when the lock pin 161 is pushed in the lock hole 133, the taper 161b of the lock pin 161 abuts the tapered support 133a of the hole wall of the lock hole 133 as well as the shaft tip 161c abuts the tip support 133b. In this way, the lock pin 161 can be reliably pushed into the lock hole 133, as well as rattle or noise can be prevented.

Further, since the shaft tip 161c of the lock pin 161 abuts the tip support 133b of the hole wall of the lock hole 133, when the lock pin 161 is subject to force in a torsional direction, for example, the tip support 133b can support the lock pin 161 which is to displace in the torsinoal direction. That is, when the shaft tip 161c is pulled out from the tip support 133b, it is required to pull it out along the axis direction of the shaft tip 161c. Even if the lock pin 161 is subject to the force in the torsional direction, the lock pin 161 is resistant to falling off from the lock hole 133.

Further, since the coil spring 154 is provided between the upper bracket 120 and lower bracket 110 and biases the upper bracket 120 toward the lower bracket 110, the upper bracket 120 is pulled toward the lower bracket 110 even during the fore-aft movement. Therefore, for example, noise of the members contacting to each other can be suppressed.

Further, since the lock pin 161, shaft 162 and connection part 167 are formed integrally, the number of parts can be reduced compared to the case where they are not integrally formed, as well as a process like connecting the lock pin 161 to the shaft 162 with the connection part 167 can be omitted.

Further, since the straight part 167b of the connection part 167 abuts the convex 122b when the lock pin 161 is pushed in the lock hole 133, the flexion parts 167a and 167a of the connection part 167 can be separated from the step 122a of the upper bracket 120. In this way, it can be reliably prevented, for example, that the flexion parts 167a and 167a stuck at an edge of the through hole 124 or shaft insertion hole 125, which may happen in the absence of the convex 122b.

Further, since the convex 122b is provided on the step 122a of the upper bracket 120 and protrudes outward, the rigidity of the surrounding step 122a of the convex 122b can be improved.

On the other hand, in terms of reducing the number of parts, it has been desired to integrate the lock mechanism with the mechanism which allows the headrest to move in the fore-aft direction as much as possible.

However, if a member of the mechanism which allows the fore-aft movement is integrated with a member of the lock mechanism, the integrated member has to perform movement for the fore-aft movement of the headrest as well as movement for locking and unlocking the fore-aft movement. That is, this member may be subject to repetitive external forces more frequently compared to the case where these members are not integrated with each other.

For this reason, it has been desired to develop a technique which enables to improve the rigidity of the integrated member or to improve efficiency of the fore-aft movement of the headrest and the lock operation. In other words, it has been desired to develop a headrest fore-aft position adjuster which enables to integrate the lock mechanism with the mechanism of moving the headrest in the fore-aft direction as much as possible, and thus to reduce the number of the parts.

On this respect, as described above, the headrest fore-aft position adjuster 100 of the embodiment has such a configuration that: the upper link 130 and rear links 140 have an approximately U-shape cross section with openings 130a and 140a; at least the front link 130 is placed with the opening 130a facing forward; and the lock mechanism includes the lock plate 132 which is integrally provided at the upper end of the side wall 131 of the upper link 130 and which the plurality of the lock holes 133 are formed on and the lock pin 161 which protrudes from the upper bracket 120 toward the lock plate 132 of the upper link 130 and which is pushed into and pulled out from the plurality of the lock holes 133.

According to the fore-aft position adjuster 100 as configured above, the upper link 130 and rear link 140 are formed in an approximately U-shape in the cross section with the openings 130a and 140a. Therefore, the rigidity of the front link 130 and rear link 140 can be improved. Since the front link 130 is so rigid, even when it is integrally provided with the lock plate 132 which constitutes the lock mechanism, it is resistant to breakage compared to a case where a simple plate link not having the improved rigidity is employed. Further, since the front link 130 is integrally provided with the lock plate 132, the upper bracket 120 can be positioned stepwise in fore-aft position with respect to the lock plate 132 only by pushing in the lock pin 161 to the plurality of lock holes 133 . . . which are formed on the lock plate 132, as well as the upper bracket 120 is allowed to move in the fore-aft direction only by pulling out the lock pin 161 from the lock hole 133. Therefore, the fore-aft movement of the headrest and the locking action can be effectively operated. In this way, the number of the parts can be reduced at least with respect to the lock plate 132.

On the other hand, a long shaft is used in a conventional fore-aft position adjuster so that the headrest is movable in a large extent in both forward and backward directions. Accordingly, the size of the headrest frame is also large in the fore-aft direction.

However, in recent years, in terms of weight reduction, there has been a desire of downsizing a headrest to the extent that comfort and safety can be ensured. In other words, it has been desired to develop a fore-aft position adjuster which enables to downsize a headrest to the extent that comfort and safety can be ensured.

In the respect, as described above, the headrest fore-aft position adjuster 100 of the embodiment has such a configuration that: the pivot connection between the lower bracket 110 and front link 130 is located higher than the pivot connection between the lower bracket 110 and rear link 140; the pivot connection between the upper bracket 120 and front link 130 is located higher than the pivot connection between the upper bracket 120 and rear link 130, the upper bracket 120 is provided obliquely along the arrangement of the pivot connections to the front link 130 and rear link 140 and includes the bracket body 121 whose front end overhangs forward over the pivot connection between the upper bracket 120 and front link 130 when the front link 130 and rear link 140 are positioned at the rearmost ends of their ranges of rotation and the front fixed part 126 which is integrally provided at the front end of the bracket body 121 and which is fixed on the inner wall 31 of the inner cover 20.

According to the fore-aft position adjuster 100 as configured above, the pivot connection between the lower bracket 110 and front link 130 is located higher than the pivot connection between the lower bracket 110 and rear link 140, and the pivot connection between the upper bracket 120 and front link 130 is located higher than the pivot connection between the upper bracket 120 and rear link 140. Thus, the pivot connections between the brackets 110 and 120 and the links 130 and 140 are aligned obliquely. When the front link 130 and rear link 140 are rotated, the bracket 120 where the front link 130 and rear link 140 are positioned at the foremost ends of their range of rotation is located obliquely upward and forward with respect to the bracket 120 where they are positioned at the rearmost ends. That is, since the upper bracket 120 is allowed to move obliquely upward and forward with respect to the headrest pillar 10, the front fixed part 126, which is integrally provided to the bracket body 121 of the upper bracket 120, is accordingly allowed to move in the same direction with the inner cover 20 on which the front fixed part 126 is fixed. Therefore, it is not required, for example, to enlarge the headrest in the fore-aft direction in order to allow the headrest to move in a large extent in the fore-aft direction as before, and the headrest can thus be downsized in the fore-aft direction compared to conventional ones.

Further, since the front end of the bracket body 121 overhangs forward over the pivot connection between the front bracket 120 and front link 120, it gets to overhang forward as the front link 130 and rear link 140 rotate from the rearmost ends to foremost ends of their ranges of rotation. Since the front fixed part 126 accordingly overhang forward, the headrest itself is allowed to overhang forward. Further, since the fore-aft position of the upper bracket 120 can be set stepwise with the lock mechanism, the fore-aft position of the headrest can also be adjusted with this lock mechanism.

This enables to downsize the headrest to the extent that the comfort and safety can be ensured. Also, since the inner cover does not go downward beyond the position where the front link and rear link are located at the rearmost ends of their ranges of rotation, an occupant's head can be reliably supported.

Second Embodiment

Next, a second embodiment will be described with reference to the drawings. For ease of description, only configuration which is different from the above-described first embodiment will be described.

A headrest fore-aft position adjuster of the embodiment includes: a displaceable body (upper bracket 220) which receives load of an occupant's head and which displaces in the fore-aft direction with respect to a headrest pillar; and a lock mechanism which locks and unlocks the displaceable body at a plurality of positions along the fore-aft direction. The lock mechanism includes an engaging part (lock pin 271) which displaces integrally with the displaceable body in the fore-aft direction, and a plurality of engaged parts (lock holes 241*b*) which are provided along a trajectory of the engaging part and which the engaging part is engaged with in a locked state. The engaging part is configured to engage with the engaged parts from a lateral position.

Hereinafter, the embodiment will be described in more detail.

As shown in FIGS. 8 to 10D, the fore-aft position adjuster 200 of the embodiment includes: a lower bracket 210 which is fixed to the headrest pillar 10; an upper bracket 220 which functions as the displaceable body and which is fixed to the inner cover 20; front and rear links 230 and 240 which are placed approximately in parallel with each other and each pivotally connected with the lower bracket 210 and upper bracket 220 and which allows the upper bracket 220 to move along the fore-aft direction of a vehicle seat; and a lock mechanism which locks and unlocks the upper bracket 220 at a plurality of positions along the fore-aft direction.

The lower bracket 210 includes a pair of side walls 211 and 212 which are opposed to each other, and a lower wall 215 which is provided between the lower ends of these side walls 211 and 212.

The upper bracket 220 includes: a bracket body 221 which includes a pair of approximately rectangular side walls 222 and 223 opposed to each other across the upper wall 221*a*; and front fixed parts 226 and 226 which are integrally provided at the front ends of the side walls 222 and 223 and which are fixed on the inner wall of the front cover 30 of the inner cover 20.

The front link 230 and rear link 240 are each formed in an approximately U-shape in the cross section with openings 230*a* and 240*a*. These front link 230 and rear link 240 are placed with their respective openings 230*a* and 240*a* facing each other.

The rear link 240 is formed in an approximately U-shape in the cross section, and thus includes a pair of side walls 241 and 242 which are opposed to each other, and a center wall 243 which is integrally provided between the rear ends of these side walls 241 and 242. A stopper 242*a* is integrally provided on the side wall 242 of the rear link 240, and protrudes forward. The stopper 242*a* regulates the forward and backward rotation of the front link 230 and rear link 240 by abutting the front link 230.

A bead 236*a* is formed in the center portion of the front link 230 in order to increase the rigidity.

Further, as shown in FIGS. 8, 10A, 10B, 10C and 10D, a pivot connection 250 between the lower bracket 210 and front link 230 and a pivot connection 251 between the lower bracket 210 and rear link 240 are aligned in the horizontal direction.

Further, a pivot connection 252 between the upper bracket 220 and front link 230 and a pivot connection 253 between the upper bracket 220 and rear link 240 are aligned in the horizontal direction.

As shown in FIGS. 8 to 10D, the lock mechanism includes: a plurality of lock holes 241*b* . . . which are provided on the side wall 241 of the front link 240 opposed to the upper bracket 220 along the rotational direction of the rear link 240 and which functions as the engaged parts; a through hole 224 which is provided on the side wall 222 of the upper bracket 220 opposed to the rear link 240, specifically on the rotational trajectory of the plurality of the lock holes 241*b* . . . according to the rotation of the rear link 240; and a lock member 270 which includes at least a lock pin 271 as the engaging part whose tip is pushed into and pulled out from the plurality of the lock holes 241*b* . . . while the lock pin 271 remains inserted through the through hole 224.

The lock mechanism also includes a lock plate 241*a* which is integrally provided at the upper end of the side wall 241 of the rear link 240 and on which the plurality of lock holes 241*a* . . . are formed.

The lock plate 241*a* is formed in a shape wider than the side wall 241 of the rear link 240 and overhanging forward over the front end of the side wall 241. On the lock plate 241*a*, the plurality of lock holes 241*b* . . . are formed from one end to the other end of this lock plate 241*a* in the width direction, as well as they are aligned along the rotational direction of the rear link 240.

In the embodiment, four lock holes 241*b* are provided on the lock plate 241*a*.

Figure 9A:
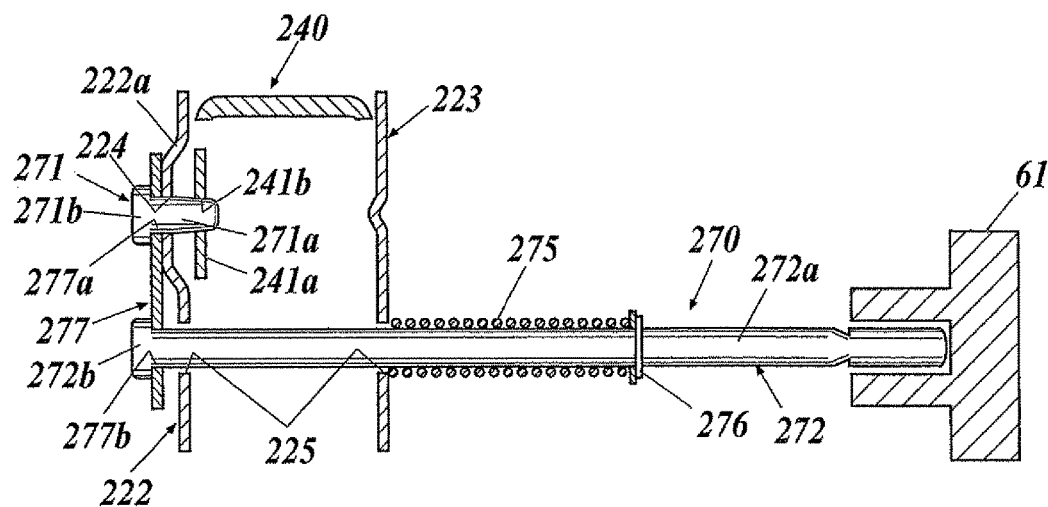
FIG. 9A is a cross-sectional view showing an example of a lock mechanism in a locked state.
Figure 9B:
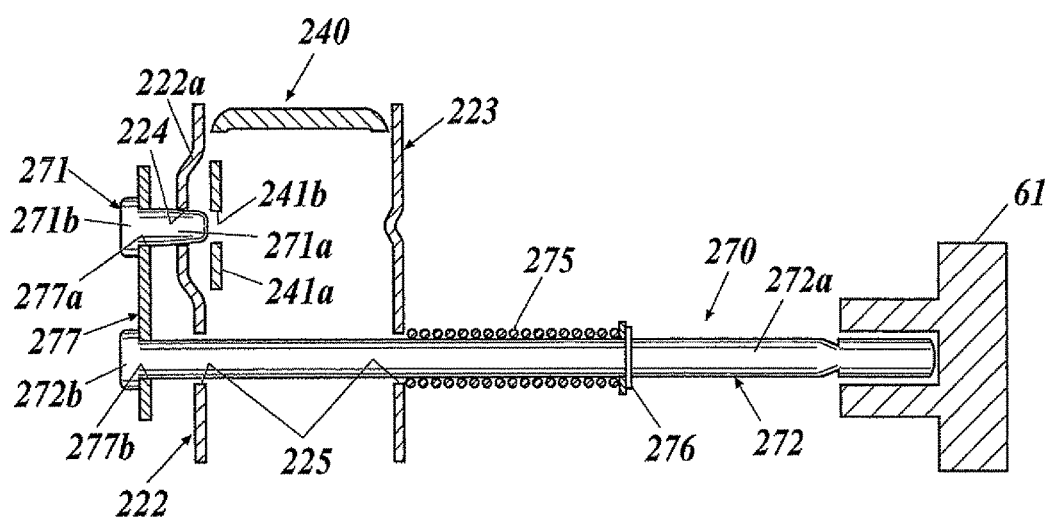
FIG. 9B is a cross-sectional view showing an example of a lock mechanism in an unlocked state.

As shown in FIGS. 9A and 9B, the through hole 224 is formed on the side wall 222 of the bracket body 221 of the upper bracket 220, and penetrates the side wall 222 in the thickness direction.

At the part where the through hole 224 is formed, the side wall 222 includes a step 222*a* which protrudes outward in a table shape. The step 222*a* is formed from the side wall 222 by drawing or the like. In the embodiment, no step is formed on the side wall 233 which is opposed to the side wall 222. Further, a shaft insertion hole 225 is formed on the upper bracket 220.

The lock member 270 is composed of: the lock pin 271; a shaft 272 which is placed in parallel with the lock pin 271 and which is inserted through a shaft insertion hole 225 which penetrates the upper bracket 220 laterally; and a connection part 277 which connects the lock pin 271 with shaft 272 and which abuts and separates from the side wall 222 of the upper bracket 220 according to the push-in and pull-out operation of the lock pin 271.

As shown in FIGS. 9A and 9B, the lock pin 271 includes a shaft body 271*a* and a head 271*d* which has a larger diameter than the shaft body 271*a*.

Although not shown in the figure, the lock pin 271 may be provided with a taper and a shaft tip on its tip. The lock holes 241*b* may be each formed with a tapered support and a tip support, accordingly.

The shaft 272 includes a shaft body 272*a* and a head 272*d* which has a larger diameter than the shaft body 272*a*. Further, a coil spring 275 is provided to the shaft 272 as a biasing member. Furthermore, the coil spring 275 is prevented from falling off by a push nut 276.

In more detail, the coil spring 275, which is the biasing member, is provided to the shaft 272 in such a manner that the biasing direction of the coil spring 275 agrees with the axis of the shaft 272. That is, it is advantageous that since the axis of the shaft 272 can be coordinated with the biasing direction of the coil spring 275, the shaft 272 easily move in the biasing direction of the coil spring 275.

Also in the embodiment, a stroke of the shaft 272 in the direction opposite to the biasing direction of the coil spring 275 is adapted to be shorter than such a stroke that the lock pin 271 falls off from the through hole 224.

Further, the button 61 is provided on the opposite end of the shaft 272 from the end with the connection part 277. For unlocking the lock, this button 61 is pushed in, and the shaft 272 thus moves the lock pin 271 in a direction of pulling out it from the lock hole 241*b*.

Specifically, the shaft 272 of the embodiment also functions as an interlock which connects the lock pin 271 with button 61 and moves in conjunction with the movement of the button 61.

Further, after the button 61 is pushed in so as to operate the lock pin 271 through the shaft 272 which moves in conjunction with the movement of the button 61, the biasing member 275 of the embodiment can also bring the shaft 272 back to the original position. That is, since the button 61 and shaft 272 moves together, the button 61 can be brought back to the original position together with the shaft 272. The lock pin 161 can also be brought back to the original position accordingly. This enables to operate the lock pin 271 with the button 61 repeatedly.

Figure 8:
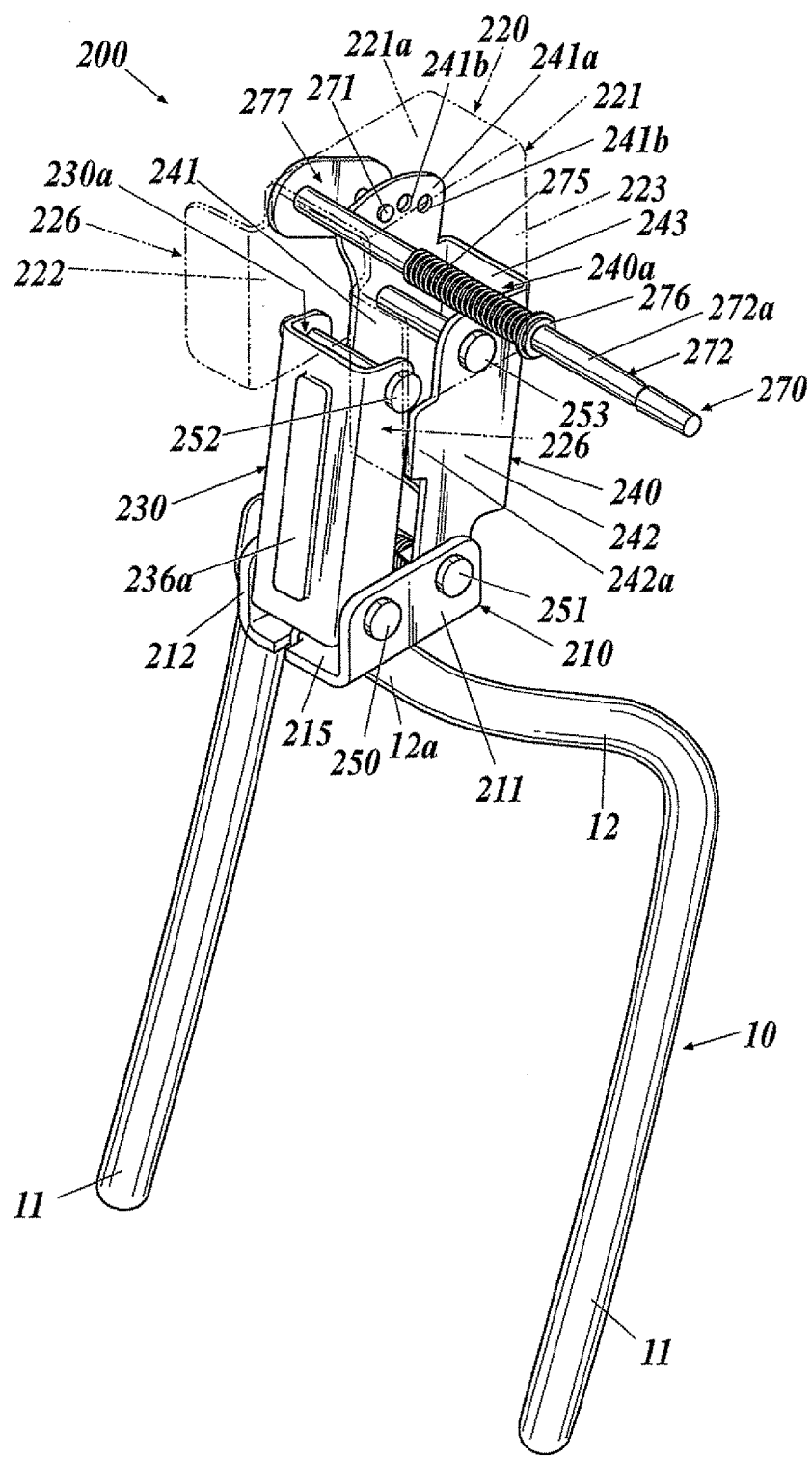
FIG. 8 is a perspective view showing another example of a fore-aft position adjuster.

As shown in FIGS. 8, 9A and 9B, the connection part 277 is formed in a plate, and a pin hole 277a for inserting the lock pin 271 and a shaft insertion hole 277b for inserting the shaft 272 are provided thereon and penetrate the connection part 277 in the thickness direction.

Next, movement of the fore-aft position adjuster 200 as configured above will be described.

As shown in FIGS. 10A, 10B, 10C and 10D, the movement is based on fore-aft movement of the upper bracket 220 which is associated with rotation of the front link 230 and rear link 240.

Figure 10A:
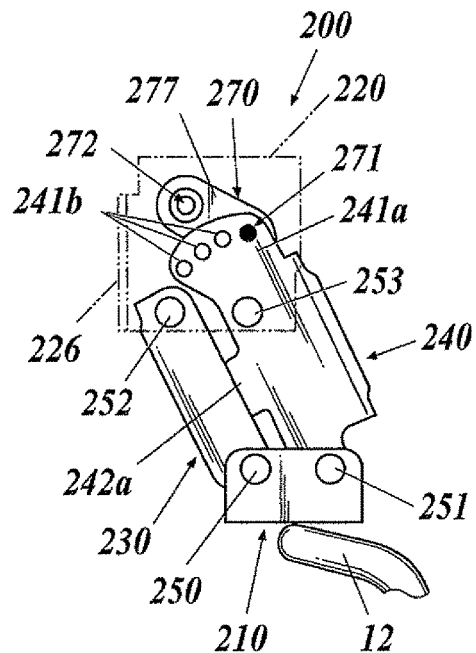
FIG. 10A is an explanatory view showing movement of the fore-aft position adjuster shown in FIG. 8.

Firstly, in FIG. 10A, the lock pin 271 is pushed in the rearmost lock hole 241b of the plurality of the lock holes 241b which are formed on the lock plate 241a.

In this state, the stopper 242a abuts the front link 230, and the front link 230 and rear link 240 are positioned at the foremost ends of their ranges of rotation. Accordingly, the front end of the upper bracket 220 is also positioned at the foremost position.

Subsequently, let it move from the state shown in FIG. 10A to the state shown in FIG. 10B.

That is, as shown in FIG. 9B, pull out the lock pin 271 of the lock member 270 from the lock hole 241b while keep it penetrating the through hole 224 so as to unlock the lock.

Subsequently, let the front link 230 and rear link 240 rotate backward (upward) so as to move the upper bracket 220 backward.

Then, when the front link 230 and rear link 240 rotates and the lock pin 271 thus reaches a position of the second rearmost lock hole 241b of the plurality of the lock holes 241b . . . , push in this lock pin 271 to this second lock hole 241b as shown in FIG. 9A.

Since the lock pin 271 is biased by the coil spring 275 in such a direction that it is pushed into the lock hole 241b, once the upper bracket 220 is moved in the unlocked state and the lock pin 161 thus reaches the position of the next lock hole 241b, this lock pin 271 is then automatically pushed into this next lock hole 241b by the biasing force.

Subsequently, when let it move from the state shown in FIG. 10B to the state shown in FIG. 10C, unlock the lock of the lock member 270 and let the upper bracket 220 to move backward.

Then, when the front link 230 and rear link 240 rotates and the lock pin 271 thus reaches a position of the third rearmost lock hole 241b of the plurality of the lock holes 241b . . . , push in this lock pin 271 to this third lock hole 241b.

Subsequently, when let it move from the state shown in FIG. 10B to the state shown in FIG. 10C, unlock the lock of the lock member 270 and let the upper bracket 220 to move backward.

Then, when the front link 230 and rear link 240 rotates and the lock pin 271 thus reaches a position of the foremost lock hole 241b of the plurality of the lock holes 241b . . . , push in this lock pin 271 to this foremost lock hole 241b.

In this state, the rear link 240 abuts the stopper 242a, and the front link 230 and rear link 240 are positioned at the rearmost ends of their ranges of rotation. Accordingly, the rear end of the upper bracket 220 is also positioned at the rearmost position.

Figure 10B:
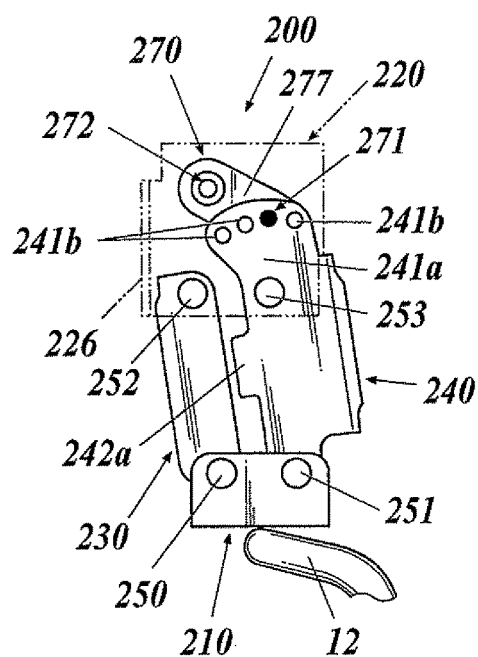
FIG. 10B is an explanatory view showing movement of the fore-aft position adjuster shown in FIG. 8.
Figure 10C:
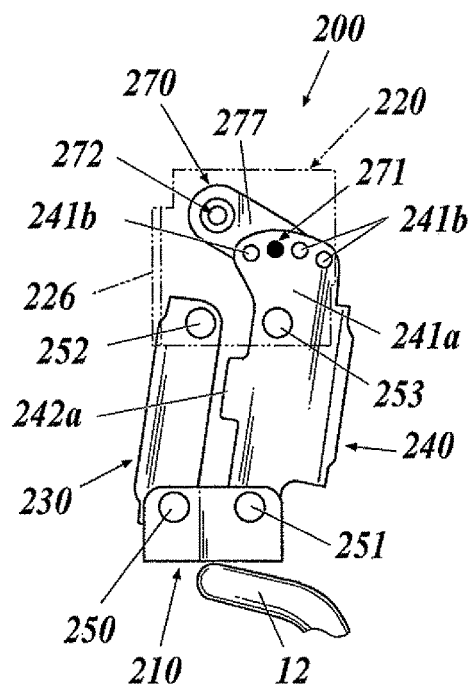
FIG. 10C is an explanatory view showing movement of the fore-aft position adjuster shown in FIG. 8.
Figure 10D:
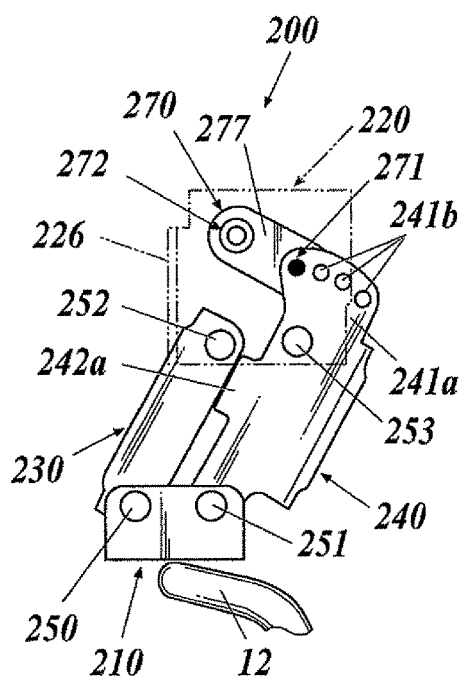
FIG. 10D is an explanatory view showing movement of the fore-aft position adjuster shown in FIG. 8.
Figure 11:
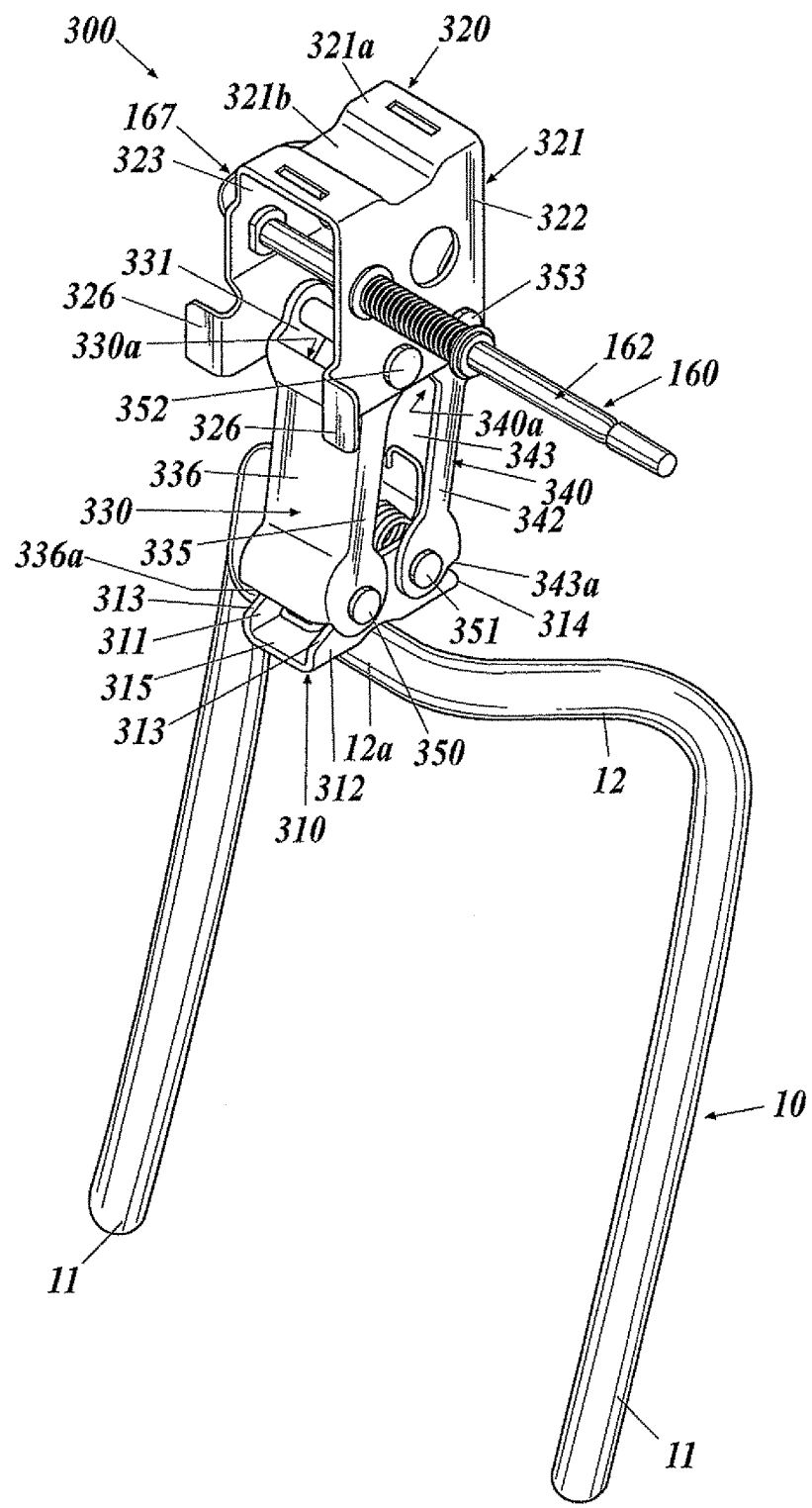
FIG. 11 is a perspective view showing another example of a fore-aft position adjuster.

Further, as described above, not only the movement from the state shown in FIG. 10A to the state shown in FIG. 10B to the state shown in FIG. 10C to the state shown in FIG. 10D, but also the opposite movement or direct movement from the state shown in FIG. 10A to the state shown in FIG. 10D is possible.

In view of the foregoing, the upper bracket 220 is adjustable in fore-aft position among the state shown in FIG. 10A, state shown in 10B, state shown in FIG. 10C and state shown in FIG. 10C. Accordingly, the inner cover 20, which the front fixed parts 226 and 226 of the upper bracket 220 are fixed to, is also adjustable in fore-aft position according to the movement of the upper bracket 220. Eventually, the headrest itself is adjustable in fore-aft position.

According to the embodiment, as with the first embodiment, it is advantageous that the simple and lightweight headrest fore-aft position adjuster can be composed without using relatively large parts which correspond to the size of the headrest as well as many processed parts with holes, grooves and the like.

Third Embodiment

Next, a third embodiment will be described with reference to the drawings. For ease of description, only configuration which is different from the above-described first and second embodiments will be described.

A headrest fore-aft position adjuster of the embodiment includes: a displaceable body (upper bracket 320) which receives load of an occupant's head and which displaces in the fore-aft direction with respect to a headrest pillar; and a lock mechanism which locks and unlocks the displaceable body at a plurality of positions along the fore-aft direction. The lock mechanism includes an engaging part (lock pin 161) which displaces integrally with the displaceable body in the fore-aft direction, and a plurality of engaged parts (lock holes 341b) which are provided along the trajectory of the engaging part and which the engaging part is engaged with in a locked state. The engaging part is configured to engage with the engaged parts from a lateral position.

Hereinafter, the embodiment will be described in more detail.

As shown in FIGS. 11, 12A, 12B, 12C and 12D, the fore-aft position adjuster 300 of the embodiment includes: a lower bracket 310 which is fixed to the headrest pillar 10; the upper bracket 320 which functions as the displaceable body and which is fixed to the inner cover 20; front and rear links 330 and 340 which are placed approximately in parallel with each other and each pivotally connected with the lower bracket 310 and upper bracket 320 and which allows the upper bracket 320 to move along the fore-aft direction of a vehicle seat; and a lock mechanism which locks and unlocks the upper bracket 320 at a plurality of positions along the fore-aft direction.

The lower bracket 310 includes: a pair of side walls 311 and 312 which are opposed to each other; a lower wall 315 which is integrally provided between the lower ends of the side walls 311 and 312; and stopper receivers 313 and 314 which are formed by cutting off upper edges of front and rear side ends of the side walls 311 and 312 in a concave shape and which receives front and rear stoppers 336a and 343a described below.

The upper bracket 320 includes: a bracket body 321 which includes a pair of approximately rectangular side walls 322 and 323 opposed to each other across the upper wall 321a; and front fixed parts 326 and 326 which are integrally provided at the front ends of the side walls 222 and 223 and which are fixed to the inner wall of the front cover 30 of the inner cover 20.

On the upper wall 321a, a concave 321b is formed between the side walls 322 and 323 in order to improve the rigidity of the upper bracket 320.

The front link 330 and rear link 340 are each formed in an approximately U-shape in the cross section with openings 330a and 340a. These front link 330 and rear link 340 are placed with their respective openings 330a and 340a facing each other.

The front link 330 is formed in an approximately U-shape in the cross section, and thus includes a pair of side walls 331 and 335 which are opposed to each other, and a center wall 336 which is integrally provided between the front ends of these side walls 331 and 335.

Further, the rear link 340 is also formed in an approximately U-shape in the cross section, and thus includes a pair of side walls 341 and 342 which are opposed to each other, and a center wall 343 which is integrally provided between the rear ends of these side walls 341 and 342.

The lower end of the center wall 336 of the front link 330 bulges out forward, and the lower end of this bulge functions as a front stopper 336a which abuts the front stopper receiver 313 of the lower bracket 310 when the front link 330 and rear link 340 are positioned at the foremost ends of their ranges of rotation.

Further, the lower end of the center wall 343 of the rear link 340 also bulges backward, and the lower end of this bulge functions as a rear stopper 343a which abuts the rear stopper receiver 314 of the lower bracket 310 when the front link 330 and rear link 340 are positioned at the rearmost ends of their ranges of rotation.

Further, as shown in FIGS. 11, 12A, 12B, 12C and 12D, a pivot connection 350 between the lower bracket 310 and front link 330 and a pivot connection 351 between the lower bracket 310 and rear link 340 are aligned in the horizontal direction.

Further, a pivot connection 352 between the upper bracket 320 and front link 330 and a pivot connection 353 between the upper bracket 320 and rear link 340 are aligned in the horizontal direction.

The lock mechanism includes: a plurality of lock holes 341b which are provided on the side wall 341 of the front link 340 opposed to the upper bracket 320 along the rotational direction of the rear link 340 and which functions as the engaged parts; a through hole 324 which is provided on the side wall 322 of the upper bracket 320 opposed to the rear link 340, specifically on the rotational trajectory of the plurality of the lock holes 341b . . . according to the rotation of the rear link 340; and a lock member 160 which includes at least a lock pin 161 as the engaging part whose tip is pushed into and pulled out from the plurality of the lock holes 341b . . . while the lock pin 161 remains inserted through the through hole 324.

The embodiment employs a so-called approximately J-shaped member as the lock mechanism 160, which is as same as the above-described configuration of the first embodiment. Thus, detailed description thereto is omitted.

Further, the configuration is as same as the above-described first embodiment regarding a button 61 which is used to operate this lock pin 161 of the lock member 160, a shaft 162 which moves the lock pin 161 in conjunction with the button 61 and a biasing member 165 which is provided on the same axis with the shaft 162. Thus, detailed description thereto is omitted.

Further, as shown in FIGS. 12A, 12B, 12C and 12D, this lock mechanism includes a lock plate 341a which is integrally provided at the upper end of the side wall 341 of the rear link 340, and on which the plurality of lock holes 341b are formed.

The lock plate 341a is wider than the side wall 341 of the rear link 340, and overhangs forward over the front end of the side wall 341. On the lock plate 341a, the plurality of lock holes 341b . . . are formed from one end to the other end of the lock plate 341a in the width direction, as well as they are aligned along the rotational direction of the rear link 340.

In the embodiment, four lock holes 341b are provided on the lock plate 341a.

The through hole 324 is formed on the side wall 322 of the bracket body 321 of the upper bracket 320, and penetrates the side wall 322 in the thickness direction.

At the part where the through hole 324 is formed, the side wall 322 has a step which protrudes outward in a table shape. The step is formed from the side wall 322 by drawing or the like. Further, a shaft insertion hole 325 is formed on the upper bracket 320.

Next, movement of the fore-aft position adjuster 300 as configured above will be described.

As shown in FIGS. 12A to 12D, the movement is based on fore-aft movement of the upper bracket 320 according to rotation of the front link 330 and rear link 340.

Figure 12A:
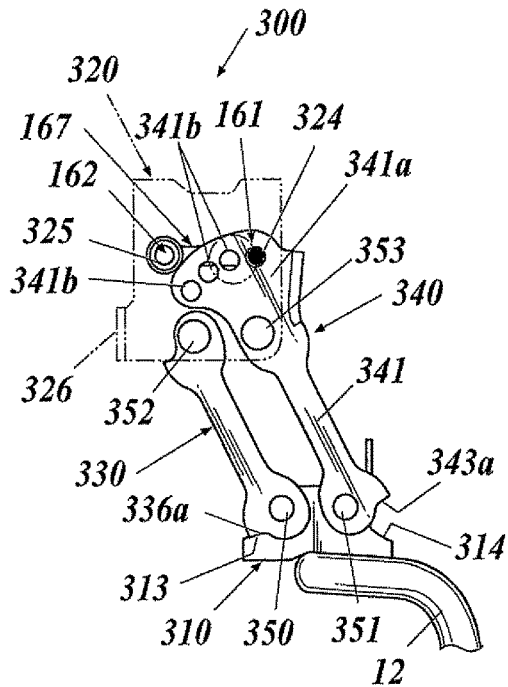
FIG. 12A is an explanatory view showing movement of the fore-aft position adjuster shown in FIG. 11.

First, in FIG. 12A, the lock pin 161 is pushed in the rearmost lock hole 341b of the plurality of the lock holes 341b . . . which are formed on the lock plate 341a.

In this state, the front stopper 336a abuts the stopper receiver 313 of the lower bracket 310, and the front link 330 and rear link 340 are positioned at the foremost ends of their ranges of rotation. Accordingly, the front end of the upper bracket 320 is also positioned at the foremost position.

Subsequently, let it move from the state shown in FIG. 12A to the state shown in FIG. 12B.

That is, pull out the lock pin 161 of the lock member 160 from the lock hole 341b while keep it penetrating the through hole 324 so as to unlock the lock (for example, see FIG. 5B).

Subsequently, let the front link 330 and rear link 340 rotate backward (upward) so as to move the upper bracket 320 backward.

Then, when the front link 330 and rear link 340 are rotated and the lock pin 161 thus reaches a position of the second rearmost lock hole 341b of the plurality of the lock holes 341b . . . , push in the lock pin 161 into this second lock hole 341b (For example, see FIG. 5A).

Figure 12B:
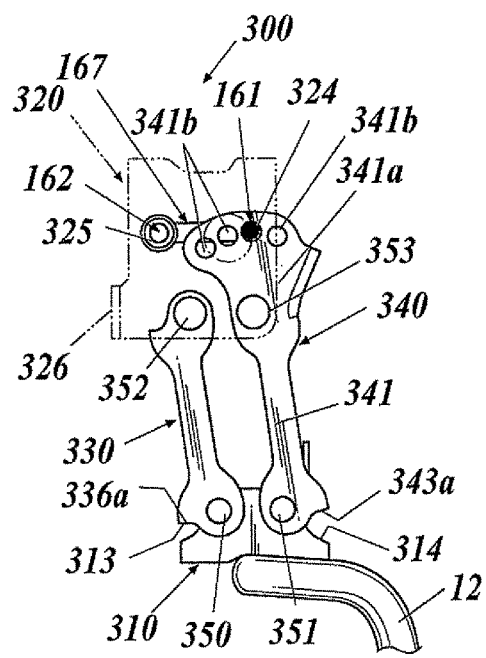
FIG. 12B is an explanatory view showing movement of the fore-aft position adjuster shown in FIG. 11.
Figure 12C:
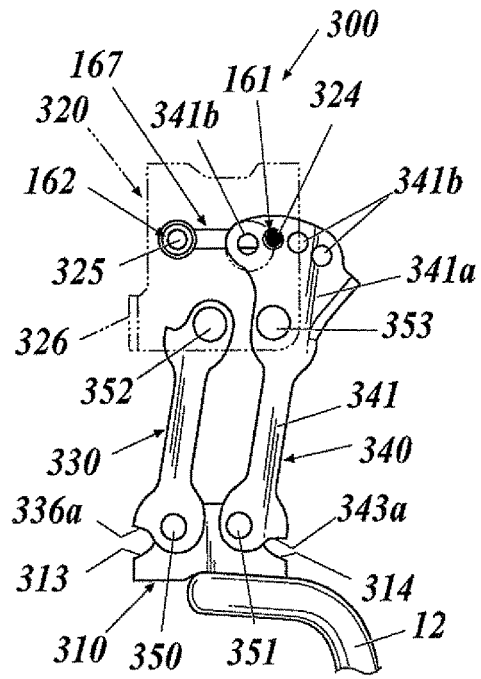
FIG. 12C is an explanatory view showing movement of the fore-aft position adjuster shown in FIG. 11.
Figure 12D:
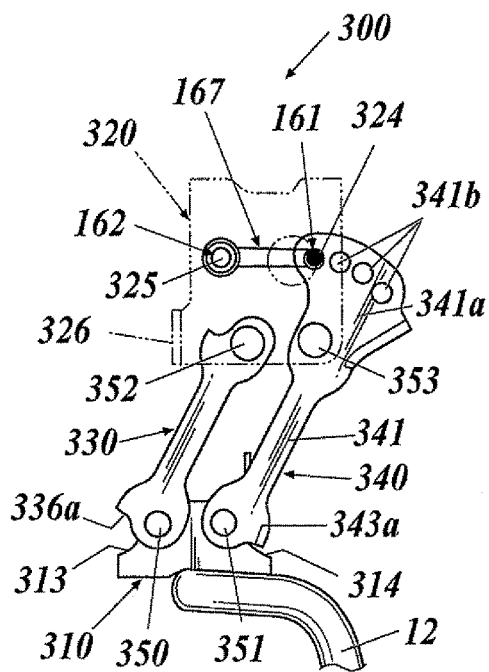
FIG. 12D is an explanatory view showing movement of the fore-aft position adjuster shown in FIG. 11.

By unlocking the lock of the lock member 160 and then letting the upper bracket 320 move backward as described above, it is possible to let it move from the state shown in FIG. 12B to the state shown in FIG. 12C or from the state shown in FIG. 12C to the state shown in FIG. 12D.

In the state shown in FIG. 12D, the rear stopper 343a abuts the stopper receiver 314 of the lower bracket 310, and the front link 330 and rear link 340 are positioned at the rearmost ends of their ranges of rotation. Accordingly, the rear end of the upper bracket 320 also positioned at the rearmost position.

Further, not only the movement from the state shown in FIG. 12A to the state shown in FIG. 12B to the state shown in FIG. 12C to the state shown in FIG. 12D, but also the opposite movement or direct movement from the state shown in FIG. 12A to the state shown in FIG. 12D is possible.

In view of the foregoing, the upper bracket 320 is adjustable in fore-aft position among the state shown in FIG. 12A, state shown in FIG. 12B, state shown in FIG. 12C and state shown in FIG. 12D. Accordingly, the inner cover 20, which the front fixed parts 326 and 326 of the upper bracket 320 are fixed to, is also adjustable in fore-aft position according to the movement of the upper bracket 320. Eventually, the headrest itself is adjustable in fore-aft position.

According to the embodiment, as with the first embodiment, it is advantageous that the simple and lightweight headrest fore-aft position adjuster can be composed without using relatively large parts which correspond to the size of the headrest as well as many processed parts with holes, grooves and the like.

Fourth Embodiment

Next, a fourth embodiment of the present invention will be described with reference to the drawings. For ease of description, only configuration which is different from the above-described first and third embodiments will be described.

A headrest fore-aft position adjuster of the embodiment includes: a displaceable body (upper bracket 420) which receives load of an occupant's head and which displaces in the fore-aft direction with respect to a headrest pillar; and a lock mechanism which locks and unlocks the displaceable body at a plurality of positions along the fore-aft direction. The lock mechanism includes an engaging part (lock pin 461) which displaces integrally with the displaceable body in the fore-aft direction, and a plurality of engaged parts (lock holes 441b) which are provided along a trajectory of the engaging part and which the engaging part is engaged with in a locked state. The engaging part is configured to engage with the engaged parts from a lateral position.

Hereinafter, the embodiment will be described in more detail.

As shown in FIGS. 13 to 15D, the fore-aft position adjuster 400 of the embodiment includes: a lower bracket 410 which is fixed to the headrest pillar 10; the upper bracket 420 which functions as the displaceable body and which is fixed to the inner cover 20; front and rear links 430 and 440 which are placed approximately in parallel with each other and each pivotally connected with the lower bracket 410 and upper bracket 420 and which allows the upper bracket 420 to move along the fore-aft direction of a vehicle seat; and a lock mechanism which locks and unlocks the upper bracket 420 at a plurality of positions along the fore-aft direction.

The lower bracket 410 includes a pair of side walls 411 and 412 which are opposed to each other and a lower wall 415 which is integrally provided between the lower ends of the side walls 411 and 412.

The upper bracket 420 includes: a bracket body 421 which includes a pair of approximately rectangular side walls 422 and 423 opposed to each other across an upper wall 421a; and the front fixed part 426 which is provided at the front end of the bracket body 421 and which are fixed to the inner wall of the front cover 30 of the inner cover 20.

The front fixed part 426 is not integrated with the bracket body 421 but configured as a separate member. Further, the bracket body 421 includes fixed parts 421c and 421c which are integrally formed with the front end of the side walls 422 and 423 and which are fixed to the front fixed part 426.

On the upper wall 421a, a concave 421b is formed between the side walls 422 and 423 in order to improve the rigidity of the upper bracket 420.

The front link 430 and rear link 440 are each formed in an approximately U-shape in the cross section with openings 430a and 440a. These front link 430 and rear link 440 are placed with their respective openings 430a and 440a facing each other.

The front link 430 is formed in an approximately U-shape in the cross section, and thus includes a pair of side walls 431 and 435 which are opposed to each other and a center wall 436 which is integrally provided between the front ends of these side walls 431 and 435.

Further, the rear link 440 is also formed in an approximately U-shape in the cross section, and thus includes a pair of side walls 441 and 442 which are opposed to each other, and a center wall 443 which is integrally provided between the rear ends of these side walls 441 and 442.

A front stopper 436a is provided at the lower end of the center wall 436 of the front link 430. The front stopper 436a protrudes downward and abuts the lower wall 415 of the lower bracket 410 when the front link 430 and rear link 440 are positioned at the foremost ends of their ranges of rotation.

Further, a rear stopper 443a is also provided at the lower end of the center wall 443 of the rear link 440. The rear stopper 443a protrudes downward and abuts the lower wall 415 of the lower bracket 410 when the front link 430 and rear link 440 are positioned at the rearmost ends of their ranges of rotation.

Further, as shown in FIGS. 13, 15A, 15B, 15C and 15D, a pivot connection 450 between the lower bracket 410 and front link 430 and a pivot connection 451 between the lower bracket 410 and rear link 440 are aligned in the horizontal direction.

Further, a pivot connection 452 between the upper bracket 420 and front link 430 and a pivot connection 453 between the upper bracket 420 and rear link 440 are aligned in the horizontal direction.

The lock mechanism includes: the plurality of lock holes 441b which are provided on the side wall 441 of the front link 440 opposed to the upper bracket 420 along the rotational direction of the rear link 440 and which functions as the engaged part; a through hole 424 which is provided on the side wall 422 of the upper bracket 420 opposed to the rear link 440, specifically on the rotational trajectory of the plurality of the lock holes 441b . . . according to the rotation of the rear link 440; and a lock member 460 which includes at least a lock pin 461 as the engaging part whose tip is pushed into and pulled out from the plurality of the lock holes 441b . . . while the lock pin 461 remains inserted through the through hole 424.

Figure 13:
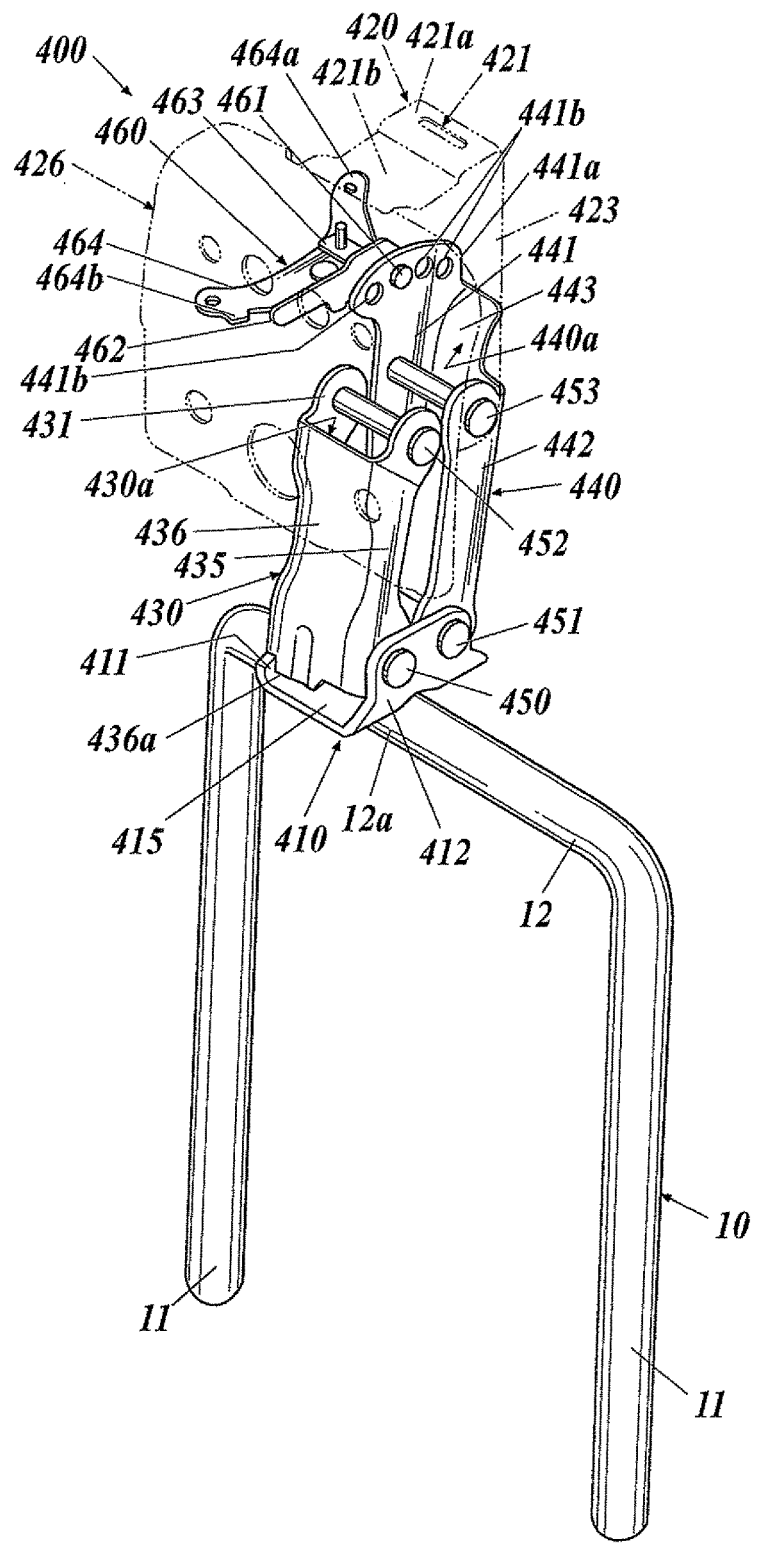
FIG. 13 is a perspective view showing another example of a fore-aft position adjuster.
Figure 15A:
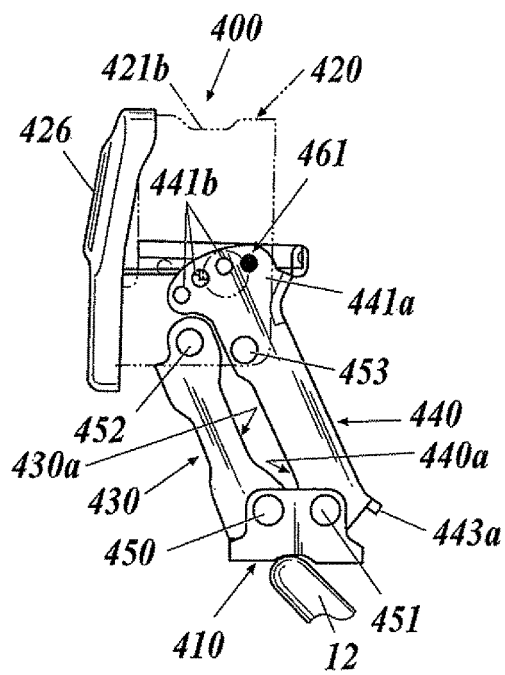
FIG. 15A is an explanatory view showing movement of the fore-aft position adjuster shown in FIG. 13.
Figure 15B:
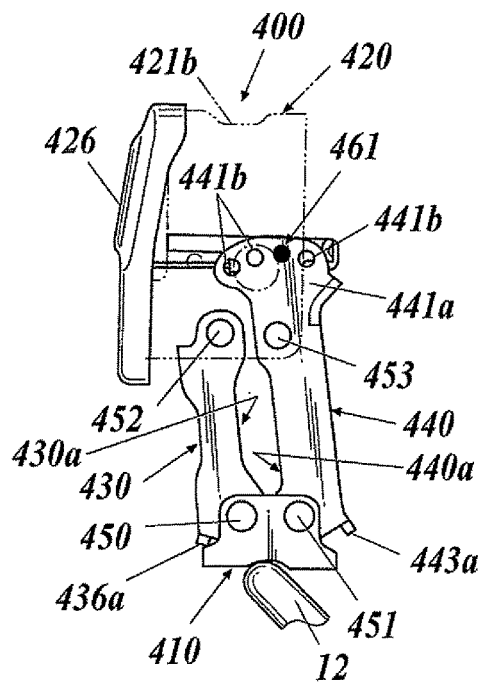
FIG. 15B is an explanatory view showing movement of the fore-aft position adjuster shown in FIG. 13.
Figure 15C:
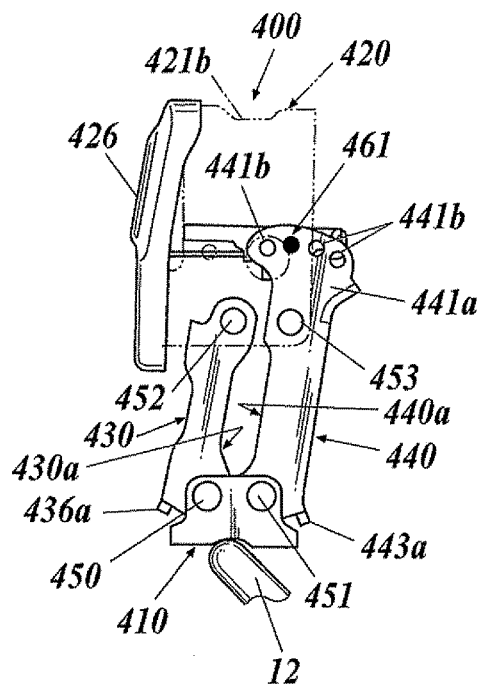
FIG. 15C is an explanatory view showing movement of the fore-aft position adjuster shown in FIG. 13.
Figure 15D:
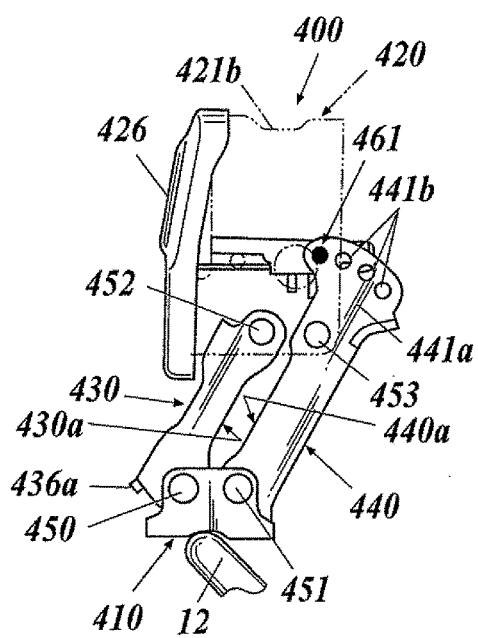
FIG. 15D is an explanatory view showing movement of the fore-aft position adjuster shown in FIG. 13.

Further, as shown in FIGS. 13 and 15D, this lock mechanism includes a lock plate 441a which is integrally formed at the upper end of the side wall 441 of the rear link 440 and on which the plurality of lock holes 441b are formed.

The lock plate 441a is wider than the side wall 441 of the rear link 440, and overhangs forward over the front end of the side wall 441. On the lock plate 441a, the plurality of lock holes 441b . . . are formed from one end to the other end of the lock plate 441a in the width direction, as well as they are aligned along the rotational direction of the rear link 440.

In the embodiment, four lock holes 441b are provided on the lock plate 441a.

Figure 14A:
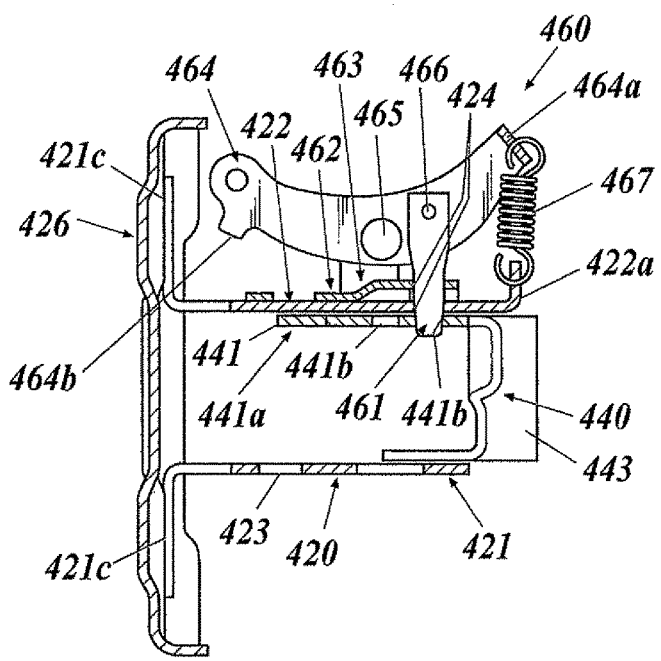
FIG. 14A is a cross-sectional view showing an example of a lock mechanism in a locked state.
Figure 14B:
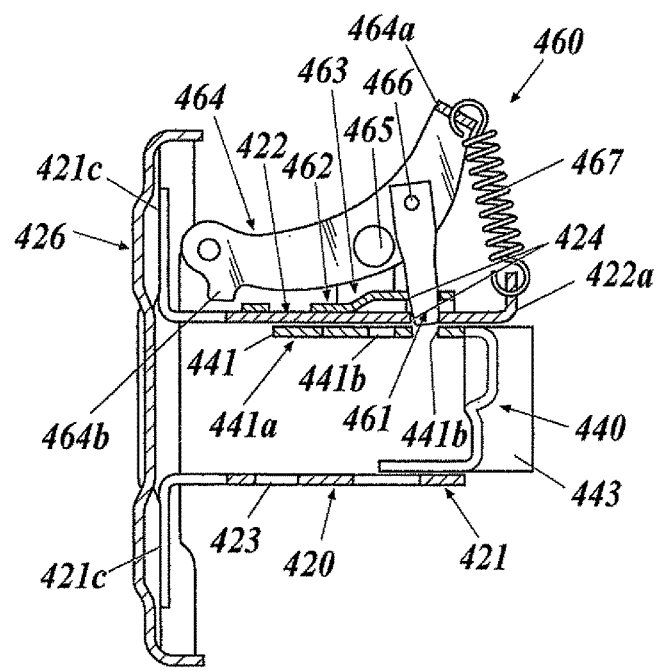
FIG. 14B is a cross-sectional view showing an example of a lock mechanism in an unlocked state.

As shown in FIGS. 13, 14A and 14B, the lock member 460 includes: the lock pin 461; a step member 462 which is attached to the side wall 422 and which protrudes outward in a table shape from the surface of the side wall 422 of the upper bracket 420; a pole 463 which is provided on the surface of the side wall 422 and which protrudes outward; a lever link 464 which is pivotally connected with the pole 463 and which holds the lock pin 461; and a biasing member 467 such as coil spring which biases the lever link 464 in such a direction that the lock pin 461 is pushed into the through hole 424 and lock holes 441b.

Here, as shown in FIGS. 14A and 14B, the through hole 424 penetrates the side wall 422 of the bracket body 421 of the upper bracket 420 and the step member 462. In more detail, the through hole 424 represents holes which are formed on the side wall 422 and step 462 respectively at the positions opposed to each other.

Further, the pole 463 and lever link 464 are configured to rotate with respect to each other on a pivot connection 465 such as rivet.

Further, the lever link 464 and lock pin 461 are configured to rotate with respect to each other on a pivot connection 466 such as rivet.

Further, at the rear end of the side wall 422, a mount 422a is integrally provided, to which one end of the biasing member 467 is attached. At the rear end of the lever link 464, a mount 464a is integrally provided, to which the other end of the biasing member 467 is attached.

Further, as shown in FIG. 14A, the lever link 464 is formed in such a curved shape that the pivot connection 465 is adjacent to the upper bracket 420 and the front and rear ends are both separated away from the upper bracket 420 in a state where the lock pin 461 is pushed in the lock hole 441b.

Further, a stopper 464b is integrally formed on the front end of this lever link 464, and abuts the side wall 422 of the upper bracket 420 when the front end is pushed in toward the upper bracket 420.

Figure 16:
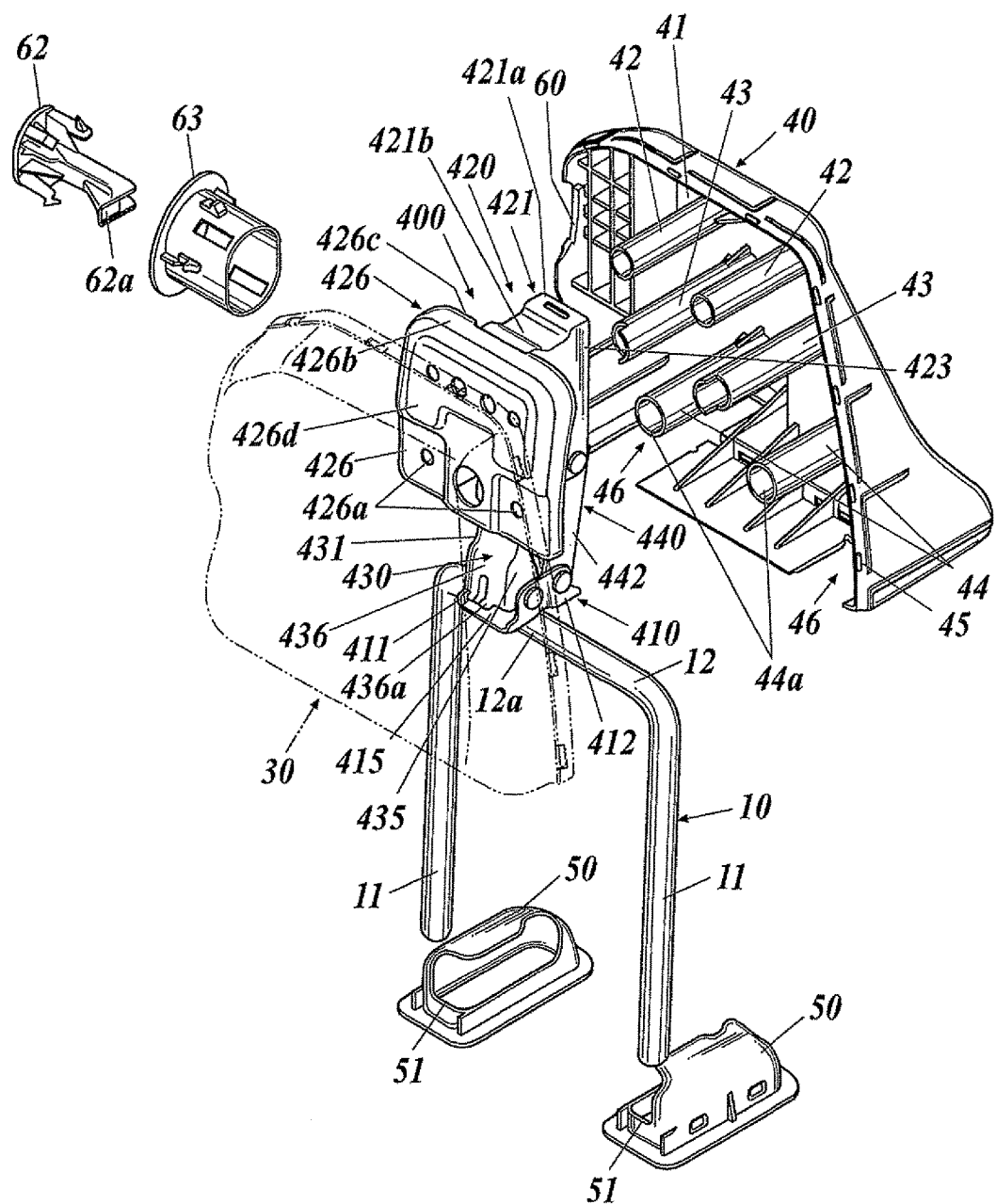
FIG. 16 is an exploded view of an inner cover which houses the fore-aft position adjuster shown in FIG. 13.
Figure 17:
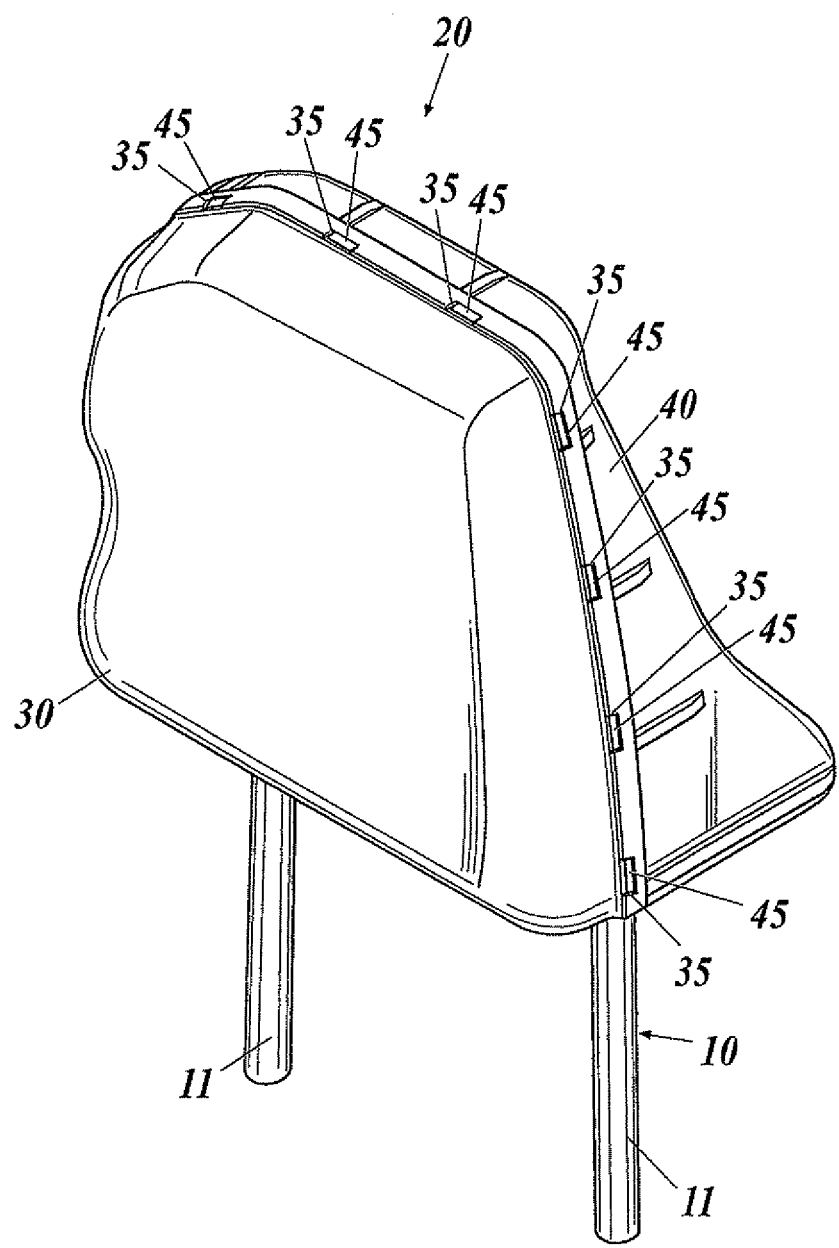
FIG. 17 is a perspective view showing an outer appearance of an inner cover.

As shown in FIG. 16, this front end of the lever link 464 is pushed in by use of a button 62 which is provided to the inner cover 20 of the headrest. This button 62 includes an abutting part 62a which protrudes toward the front end of the lever link 464 so as to abut this front end.

In more detail, the lever link 464 connects the lock pin 461 with the button 62 as well as functions as an interlock which moves in conjunction with movement of the button 62.

Further, the biasing member 467 can bring back the lever link 464 to the original position after the button 62 is pushed in so as to operate the lock pin 461 through the lever link 464 which moves in conjunction with the movement of the button 62. That is, since the button 62 moves in conjunction with the lever link 464, the button 62 can be brought back to the original position together with the lever link 464. The lock pin 461 can be brought back to the original position accordingly. This enables to operate the lock pin 461 with the button 62 repeatedly.

Next, movement of the fore-aft position adjuster 400 as configured above will be described.

First, movement of lock member 460 is based on rotation of the lever link 464 pivoted on the pivot connection 465.

That is, as shown in FIG. 14B, when the front end of the lever link 464 is pushed in by use of the button 62, the lever link 464 turns on the pivot connection 465 and the rear end of the lever link 464 thus separates from the side wall 422 of the upper bracket 420. Along with this, the lock pin 461 is pulled out from the lock hole 441b while it turns on the pivot connection 466.

On the contrary, as shown in FIG. 14A, when the pushing-in of the button 62 is stopped, the rear end of lever link 464 is pulled toward the side wall 422 by the biasing member 467. Along with this, the lock pin 461 is pushed into the lock hole 441b while it turns on the pivot connection 466.

At this moment, the lock pin 461 is kept penetrating the thorough hole 424 while its tip is operated to be pushed into and pulled out from the lock hole 441b. Further, even if the front end of the lever link 464 is pushed in hard, the lock pin 461 can be reliably prevented from falling off from the through hole 424 since the stopper 464b abuts the side wall 422.

Although not shown in the figure, the lock pin 461 may be provided with a taper and a shaft tip on its tip. The lock holes 441b may be each formed with a tapered support and a tip support accordingly.

As shown in FIGS. 15A to 15D, the movement of the fore-aft position adjuster 400 including the lock member 460 is based on fore-aft movement of the upper bracket 420 according to rotation of the front link 430 and rear link 440.

First, in FIG. 15A, the lock pin 461 is pushed in the rearmost lock hole 441b of the plurality of lock holes 441b which is formed on the lock plate 441a.

In this state, the front stopper 436a abuts the lower wall 415 of the lower bracket 410, and the front link 430 and rear link 440 are positioned at the foremost ends of their ranges of rotation. Accordingly, the front end of the upper bracket 420 is also positioned at the foremost position.

Subsequently, let it move from the state shown in FIG. 15A to the state shown in FIG. 15B.

That is, as shown in FIG. 14B, pull out the lock pin 461 of the lock member 460 from the lock hole 441b while keep it penetrating the through hole 424 so as to unlock the lock.

Subsequently, let the front link 430 and rear link 440 rotate backward (upward) so as to move the upper bracket 420 backward.

Then, when the front link 430 and rear link 440 are rotated and the lock pin 461 thus reaches a position of the second rearmost lock hole 441b of the plurality of the lock holes 441b . . . , push the lock pin 161 into this second lock hole 441b as shown in FIG. 14A.

By unlocking the lock of the lock member 460 and then letting the upper bracket 420 move backward as described above, it is possible to let it move from the state shown in FIG. 15B to the state shown in FIG. 15C or from the state shown in FIG. 15C to the state shown in FIG. 15D.

In the state shown in FIG. 15D, the rear stopper 443a abuts the lower wall 415 of the lower bracket 410, and the front link 430 and rear link 440 are positioned at the rearmost ends of their ranges of rotation. Accordingly, the rear end of the upper bracket 420 is also positioned at the rearmost position.

Further, not only the movement from the state shown in FIG. 15A to the state shown in FIG. 15B to the state shown in FIG. 15C to the state shown in FIG. 15D, but also the opposite movement or direct movement from the state shown in FIG. 15A to the state shown in FIG. 15D is possible.

In view of the foregoing, the upper bracket 420 is adjustable in fore-aft position among the state shown in FIG. 15A, state shown in FIG. 15B, state shown in FIG. 15C and state shown in FIG. 15D. Accordingly, the inner cover 20, which the front fixed part 426 of the upper bracket 420 is fixed to, is also adjustable in fore-aft position according to the movement of the upper bracket 420. Eventually, the headrest itself is adjustable in fore-aft position.

According to the embodiment, as with the first embodiment, it is advantageous that the simple and lightweight headrest fore-aft position adjuster can be composed without using relatively large parts which correspond to the size of the headrest as well as many processed parts with holes, grooves and the like.

Next, structure of the inner cover 20 which houses the fore-aft position adjuster 400 will be described.

By the way, conventional fore-aft position adjusters require a long shaft in order to ensure a sufficient moving distance of a headrest in the fore-aft direction. However, if such long shaft is used, it is also required to upsize an inner cover which houses the fore-aft position adjuster. Since the inner cover is so large, there is a large distance between opposed inner walls of the inner cover. Thus, they may not be able to ensure strength against external force which is applied to the inner cover, or they may not be able to reliably transfer the external force to a seat frame of a vehicle seat. For this reason, it has been desired to develop such a technique that enables to ensure sufficient strength against external force which is applied to an inner cover as well as to reliably transfer the external force to a seat frame.

In this respect, the inner cover 20 of the embodiment houses the fore-aft position adjuster 400 which adjusts the fore-aft position of the headrest, and is dividedly formed as a front cover 30 which is located at the front side of the vehicle seat in the fore-aft direction and a rear cover 40 which is located at the rear side;

the fore-aft position adjuster 400 includes the upper bracket 420 which is fixed to the front cover 30, and a fore-aft movement mechanism (which represents the above-described parallel linkage mechanism) which allows the upper bracket 420 to move in the fore-aft direction;

the upper bracket 420 includes the front fixed part 426 which is located at the front end of the upper bracket 420 and which is held in the state of abutting the inner wall 31 of the front cover 30; and the rear cover 40 includes a pressing unit which presses the front fixed part 426 against the inner wall 31 of the front cover 30 when the front cover 30 and rear cover 40 are coupled to each other.

Figure 21:
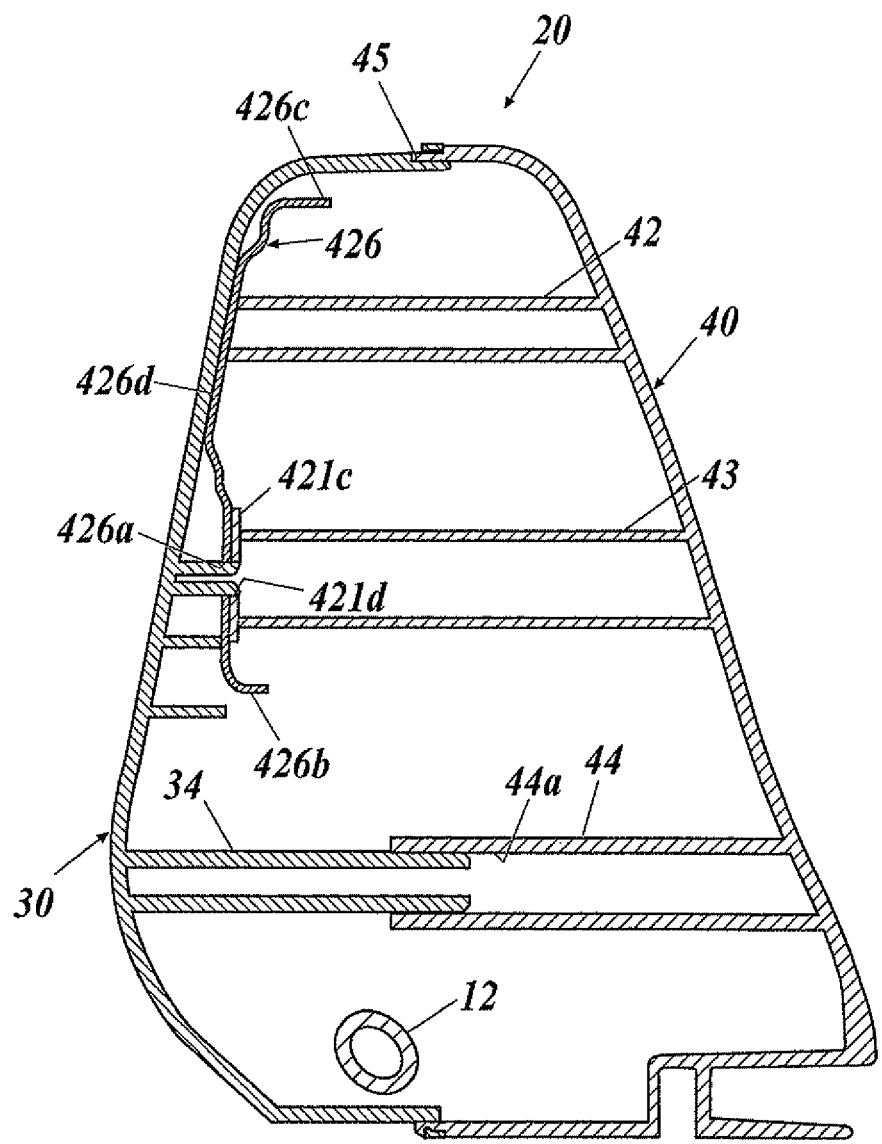
FIG. 21 is a cross-sectional view showing a state where a rear cover presses a front fixed part which is fixed on the inner wall of a front cover

Further, as shown in FIGS. 16 and 21, the pressing unit is pressing bosses 42 and 43 which protrude from an inner wall 41 of the rear cover 40 toward the front cover 30 and whose tip abuts the front fixed part 426.

Figure 18:
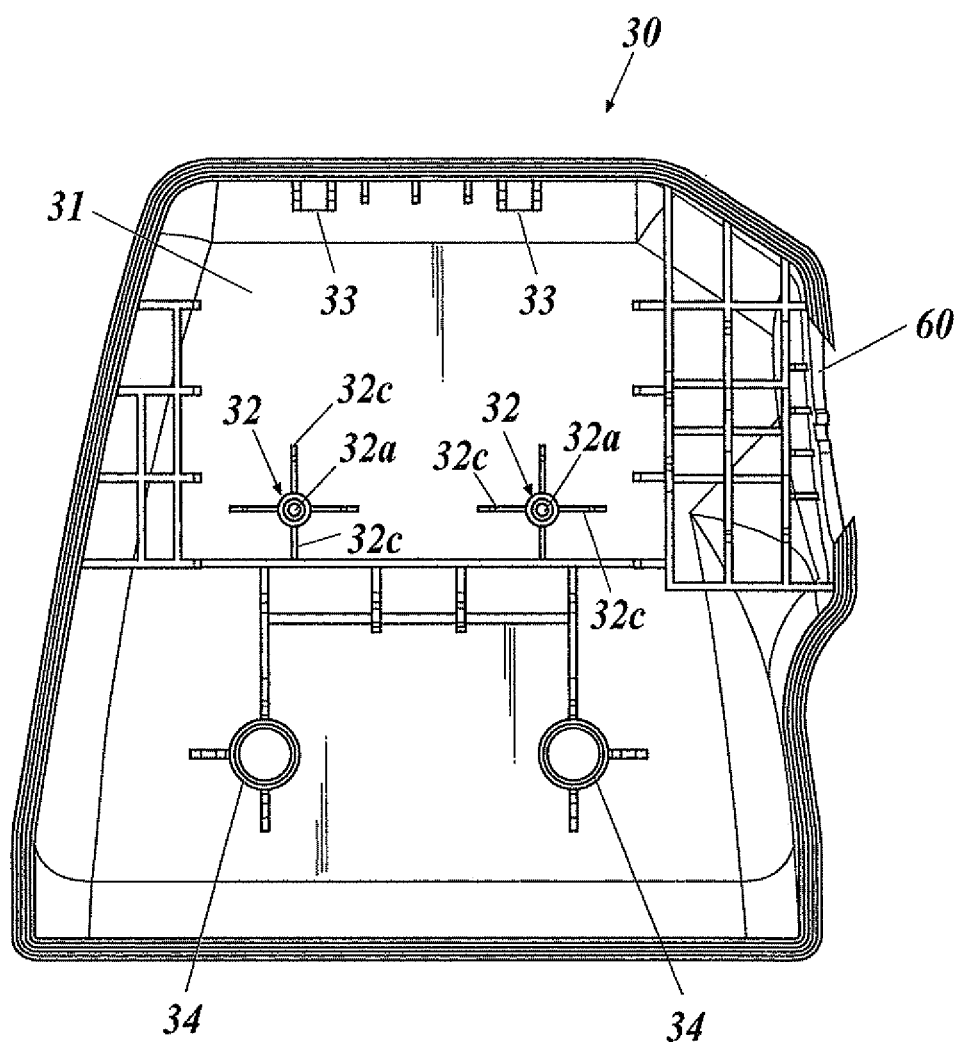
FIG. 18 is a front view showing a front cover.
Figure 20:
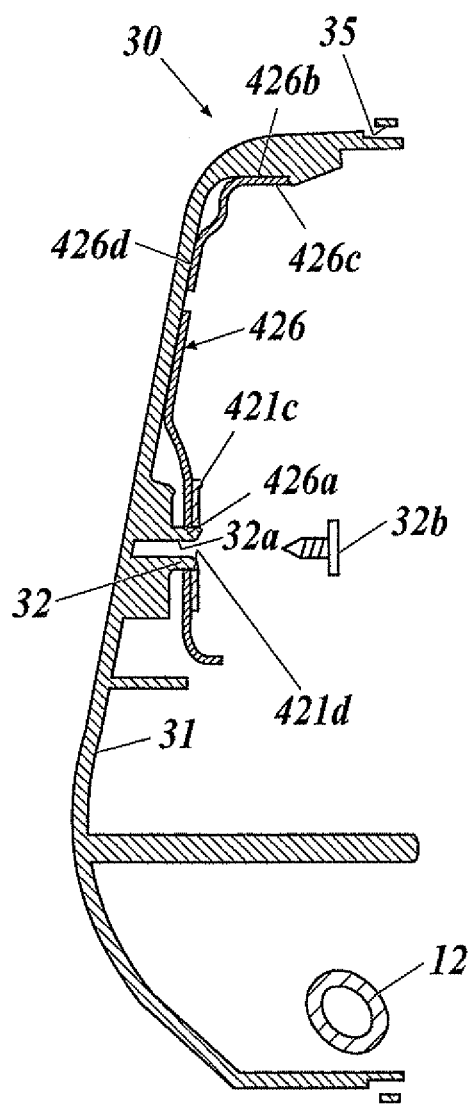
FIG. 20 is a cross-sectional view showing a state where a front fixed part is fixed on the inner wall of a front cover.

Further, as shown in FIGS. 16, 18 and 20, a protrusion 32 is formed on the inner wall 31 of the front cover 30, and protrudes toward the front fixed part 426 which abuts the inner wall 31; and An insertion hole 426a which the protrusion 32 is inserted in is formed on the front fixed part 426.

Figure 19:
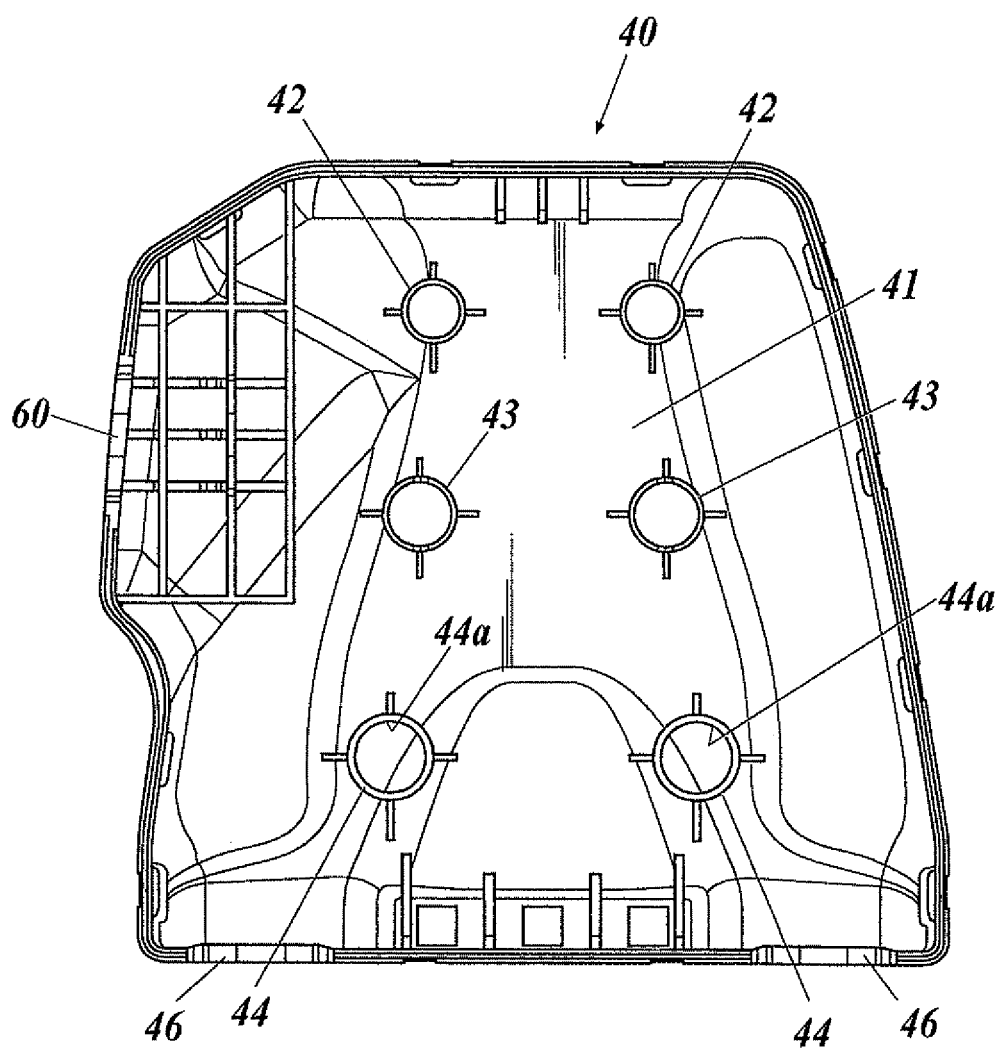
FIG. 19 is a front view showing a rear cover.

Further, as shown in FIGS. 18, 19 and 21, the front cover 30 includes a first positioning boss 34 which protrudes from the inner wall 31 of this front cover 30 toward the rear cover 40;

the rear cover 40 includes a second positioning boss 44 which protrudes from the inner wall 41 of the rear cover 40 toward the front cover 30; and the first positioning boss 34 and second positioning boss 44 are placed to be opposed to each other, and of these first positioning boss 34 and second positioning boss 44, one boss (second positioning boss 44) is formed with an insertion hole 44a which receives insertion of the other boss (first positioning boss 34) along the axis direction of one boss.

Further, of the front cover 30 and rear cover 40, one cover (rear cover 40) includes a plurality of engaging hooks 45 which protrude toward the other cover (front cover 30) and which are provided along the rim of one cover, and the other cover includes a plurality of engaged parts 35 with which the plurality of engaging hooks 45 engage and which are provided along the rim of the other cover.

As shown in FIGS. 20 and 21, in the upper bracket 420, insertion holes 421d and 421d are formed on the fixed parts 421c and 421c, and receive insertion of the protrusions 32 and 32 which protrude from the inner wall 31 of the front cover 30.

On the front fixed part 426, the insertion holes 426a and 426a are formed, and receive insertion of the protrusions 32 and 32 which protrude from the inner wall 31 of the front cover 30. The insertion holes 426a and 426a are adapted to agree with the insertion holes 421d and 421d which are formed on the fixed part 421c and 421c of the bracket body 421

Further, the front fixed part 426 is formed in an approximately rectangular shape in a front view.

Further, a peripheral wall 426b is integrally formed at the rim of the front face of the front fixed part 426, and protrudes backward. In the peripheral wall 426b, a part corresponding to the upper end of the front fixed part 426 is an upper end latch 426 which is caught by a catch 33 (described below) formed on the inner wall 31 of the front cover 30.

Further, the front fixed part 426 includes an abutting face 426d which is provided on the front face thereof and which abuts the inner wall 31 of the front cover 30 in accordance with the inclination angle and shape of the inner wall 31.

On the other hand, as shown in FIGS. 16 to 21, the inner cover 20 has such a configuration that, of the dividedly formed front cover 30 and rear cover 40, the rear cover 40 includes the plurality of engaging hooks 45 which protrudes toward the front cover 30 and which are provided along the rim of this rear cover 40, and the front cover 30 includes the plurality of engaged parts 35 which engages with the engaging hooks 45 . . . and which are provided along this rim of the front cover 30.

With such configuration, the plurality of engaging hooks 45 . . . can be engaged with the plurality of the engaged parts 35 . . . when the headrest pillar 10 is attached to the fore-aft position adjuster 400 and this fore-aft position adjuster 400 is housed. Therefore, the front cover 30 and rear cover 40 can be coupled to each other reliably and firmly.

The protrusions 32 and 32 are formed on the inner wall 31 of the front cover 30, and protrude toward the front fixed part 426 which abuts the inner wall 31.

These protrusions 32 and 32 are inserted in the insertion holes 426a and 426a which are formed on the front fixed part 426 and the insertion holes 426a and 426a which are formed on the fixed part 421c and 421c of the bracket body 421.

The protrusions 32 are formed in a cylindrical shape, and provided with screw holes 32a which opens backward. These screw holes 32a are so adapted that screws 32b are screwed after the protrusions 32 are inserted into the insertion holes 426a and insertion holes 421d, and these screws 32 can thus fix the front fixed part 426 and the fixed parts 421c of the bracket body 421.

Further, the protrusions 32 are enhanced in strength by flanges 32c which are provided at four sides.

Since such protrusions 32, 32 are formed on the inner wall 31 of the front cover 30, these protrusions 32, 32 can be used as the positioning unit to attach the front fixed part 426 to the inner wall 31 of the front cover 30. Therefore, the front fixed part 426 can be accurately attached to the inner wall 31 of the front cover 30 at a predetermined attachment position. Further, the protrusions 32 and 32 can be used as the positioning unit not only for the front fixed part 426 but also for the bracket body 421 including the fixed parts 421c and 421c.

Further, as shown in FIGS. 18 and 20, on the inner wall 31 of the front cover 30, the catch 33 is formed at a part corresponding to the upper end (ceiling) of the front cover 30. The catch 33 protrudes downward and catches the upper end latch 426c of the front fixed part 426.

Further, as shown in FIGS. 16, 19 and 21, the rear cover 40 includes pressing bosses 42 and 43 as a pressing unit to press the front fixed part 426 against the inner wall 31 of the front cover 30 when the front cover 30 is coupled with the rear cover 40. The bosses 42 and 43 protrude from the inner wall 41 of the rear cover 40 toward the front cover 30, and their tips abut the front fixed part 426.

The pressing bosses 42 and 42 which are located at the upper side are adapted to have such a length that gaps are left between them and the inner wall 31 of the front cover 30 by the thickness of the front fixed part 426.

The pressing bosses 43 and 43 which are located below these pressing bosses 42 and 42 are adapted to have a length considering the positions of the front fixed part 426 and the fixed parts 421c and 421c of the bracket body 421 with respect to the inner wall 31 of the front cover 30.

Since the pressing unit is the pressing bosses 42 and 43 which protrude from the inner wall 41 of the rear cover 40 toward the front cover 30 and whose tips abut the front fixed part 426, the front fixed part 426 can be fixed to the inner wall 31 of the front cover 30 more reliably by letting the tips of these pressing bosses 42 and 43 abut the front fixed part 426 when the front cover 30 and rear cover 40 are coupled to each other.

Further, as shown in FIGS. 16, 18, 19 and 21, the front cover 30 includes the first positioning bosses 34 and 34 which protrude from the inner wall 31 of the front cover 30 toward the rear cover 40, and the rear cover 40 includes the second positioning bosses 44 and 44 which protrude from the inner wall 41 of the rear cover 40 toward the front cover 30.

The first positioning bosses 34 and 34 and second positioning bosses 44 and 44 are placed to be opposed to each other. Of these first positioning bosses 34 and 34 and second positioning bosses 44 and 44, the second positioning bosses 44 and 44 includes the insertion holes 44a and 44a which are formed along the axis direction of these second positioning bosses 44 and 44 and which receive insertion of the first positioning bosses 34 and 34.

By inserting the first positioning bosses 34 into the insertion holes 44a formed on the second positioning bosses 44, positioning can be performed in coupling the front cover 30 and rear cover 40. In this way, the front cover 30 and rear cover 40 can be accurately coupled to each other.

Further, as shown in FIG. 16, bottom slits 46 and 46 are formed on the bottom face of the inner cover 20 at the positions corresponding to the positions of side pillars 11 and 11 of the headrest pillar 10.

The side pillars 11 and 11 are inserted through these bottom slits 46 and 46, and bottom face covers 50 with a slit 51 which allows the fore-aft movement of the headrest are fitted in each of these bottom slits 46 and 46. The bottom face covers 50 and 50, which are fitted in the bottom slits 46 and 46, are formed symmetrical in the lateral direction.

Further, as shown in FIGS. 16, 18 and 19, a button mount hole 60 to attach the button 62 is formed on the side face of the inner cover 20.

This button mount hole 60 is formed in such a way that a concave formed on the front cover 30 and a concave formed on the rear cover 40 are placed to face each other when the front cover 30 and rear cover 40 are coupled with each other.

The button 62 is attached to this button mount hole 60. Further, the button 62 is held in the button mount hole 60 by a decoration 63 which holds the button 62 as well as decorates the surrounding of the button 62.

According to the inner cover 20 as configured above, when the front cover 30 and rear cover 40 are coupled with each other, the pressing bosses 42 and 43, which protrude from the inner wall 41 of the rear cover 40 toward front cover 30, can press the front fixed part 426, which is held in the state of abutting the inner wall 31 of the front cover 30, against the inner wall 31 of the front cover 30. Therefore, the upper bracket 420 can be reliably fixed to the front cover 30, as well as the front cover 30 and rear cover 40 can be joined to each other through the pressing bosses 42 and 43.

In this way, for example, not only external force applied to the front cover 30 can be transferred to the seat frame through the fore-aft position adjuster 400, headrest pillar 10 and the like, but also external force applied to the rear cover 40 can be transferred firstly to the front cover 30 through the pressing bosses 42 and 43 and then to the seat frame. Therefore, external force applied to the inner cover 20 from different directions can reliably be transferred to the seat frame. Further, since pressing bosses 42 and 43 can be interpositioned between the inner wall 31 of the front cover 30 and the opposing inner wall 41 of the rear cover 40, sufficient strength can be ensured against external force applied to the inner cover 20.

The fore-aft position adjuster which is housed in the inner cover 20 of the embodiment is not limited to the above-described fore-aft position adjuster 400.

Fifth Embodiment

Next, a fifth embodiment will be described with reference to the drawings.

By the way, regarding techniques which enable to adjust not only the height of a headrest with a headrest pillar but also the fore-aft position thereof, it is known that such techniques are disclosed in JP 2000-225036 (hereinafter, prior art 1), JP 2000-342379 (hereinafter, prior art 2) and the like. In prior art 1, ratchet teeth to adjust the angle of a headrest frame are formed in a relatively large ratchet member, and this ratchet member is allowed to move integrally with the headrest frame. Therefore, the headrest may become large in the fore-aft direction due to the size of the ratchet member. In prior art 2, in a left bracket, a ratchet lever engages with an upturned arc-shaped ratchet from above. Furthermore, inside a casing, a movable area is secured for front and rear links, and a mechanism to move an inertial weight is provided. Therefore, the whole configuration of a headrest may become large. For this reason, it has been desired to develop a technique which enables to avoid a headrest from increasing in size.

In this respect, a headrest fore-aft position adjuster of the embodiment includes: a displaceable body (headrest frame 509) which receives load of an occupant's head and which displaces in the fore-aft direction with respect to a headrest pillar; and a lock mechanism which locks and unlocks the displaceable body at a plurality of positions along the fore-aft direction. The lock mechanism includes: an engaging part (engaging part 540) which displaces integrally with the displaceable body in the fore-aft direction; and a plurality of engaged parts (a plurality of engaging teeth 536 . . . and a plurality of concave grooves 537 . . . ) which are provided along a trajectory of the engaging part and which the engaging part is engaged with in a locked state. The engaging part is configured to engage with the engaged parts from the lateral position.

Hereinafter, the embodiment will be described in more detail.

Figure 22:
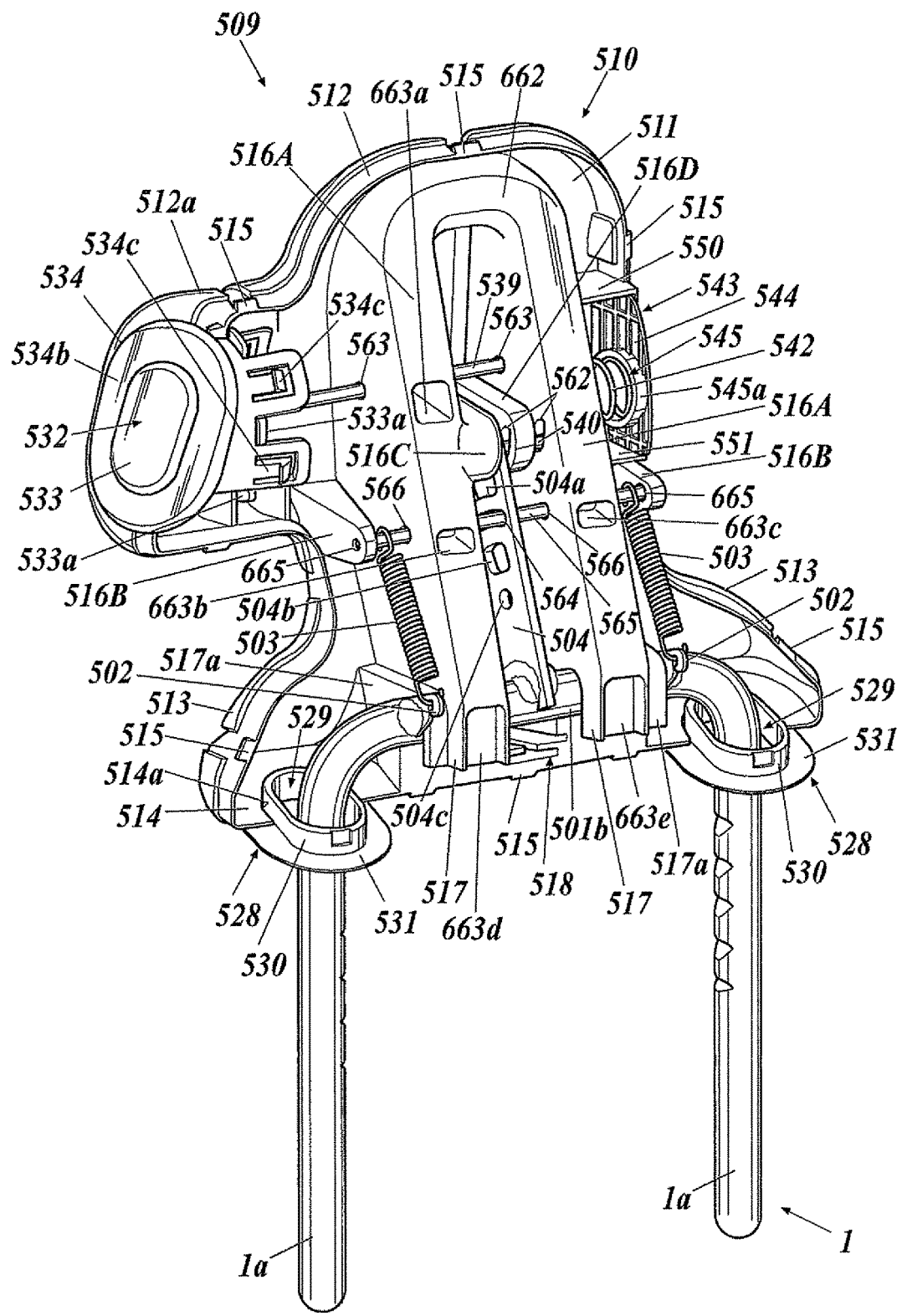
FIG. 22 is a rear perspective view showing a front part of a headrest frame.
Figure 23:
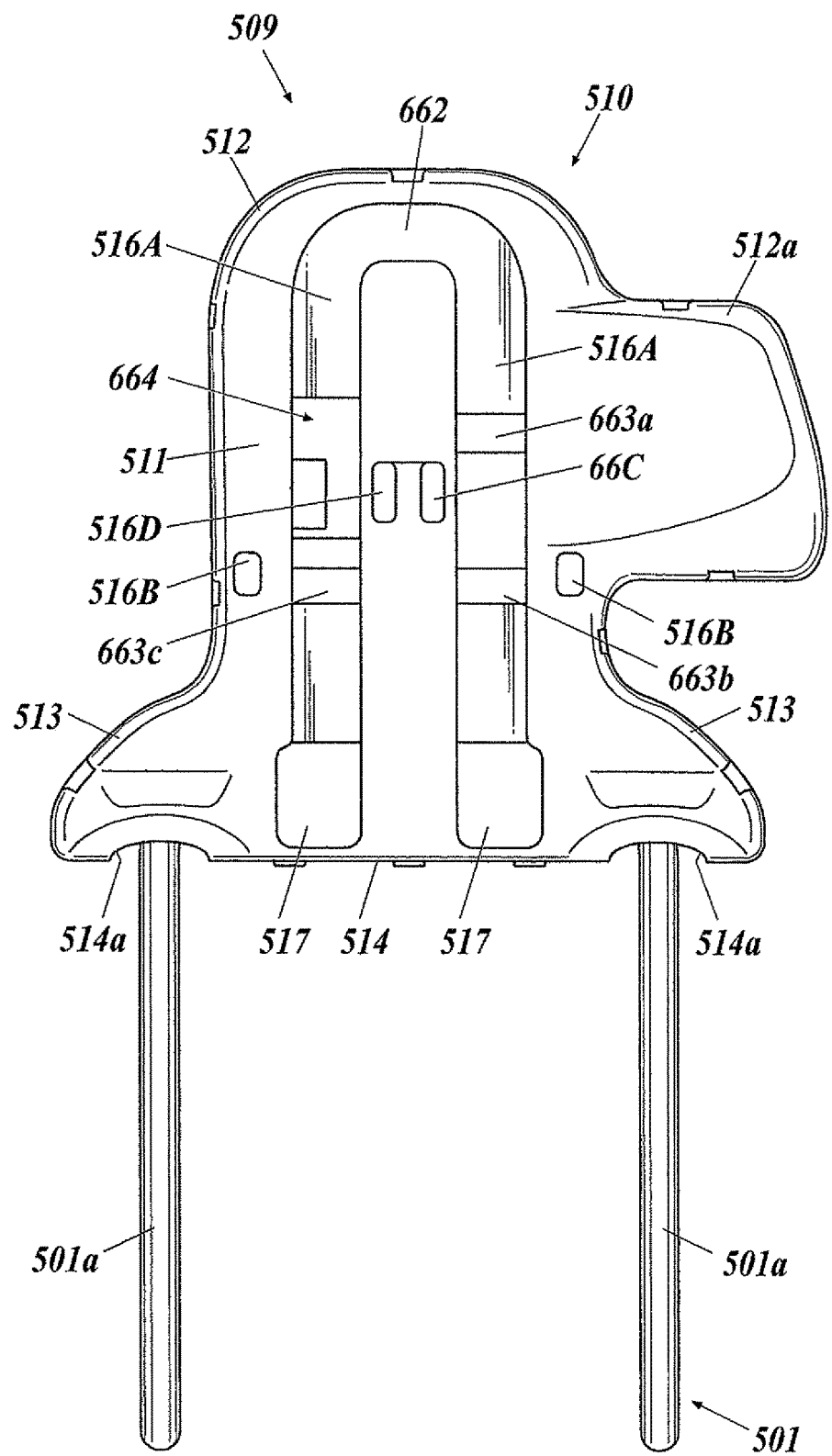
FIG. 23 is a front view showing a front part of a headrest frame.
Figure 24:
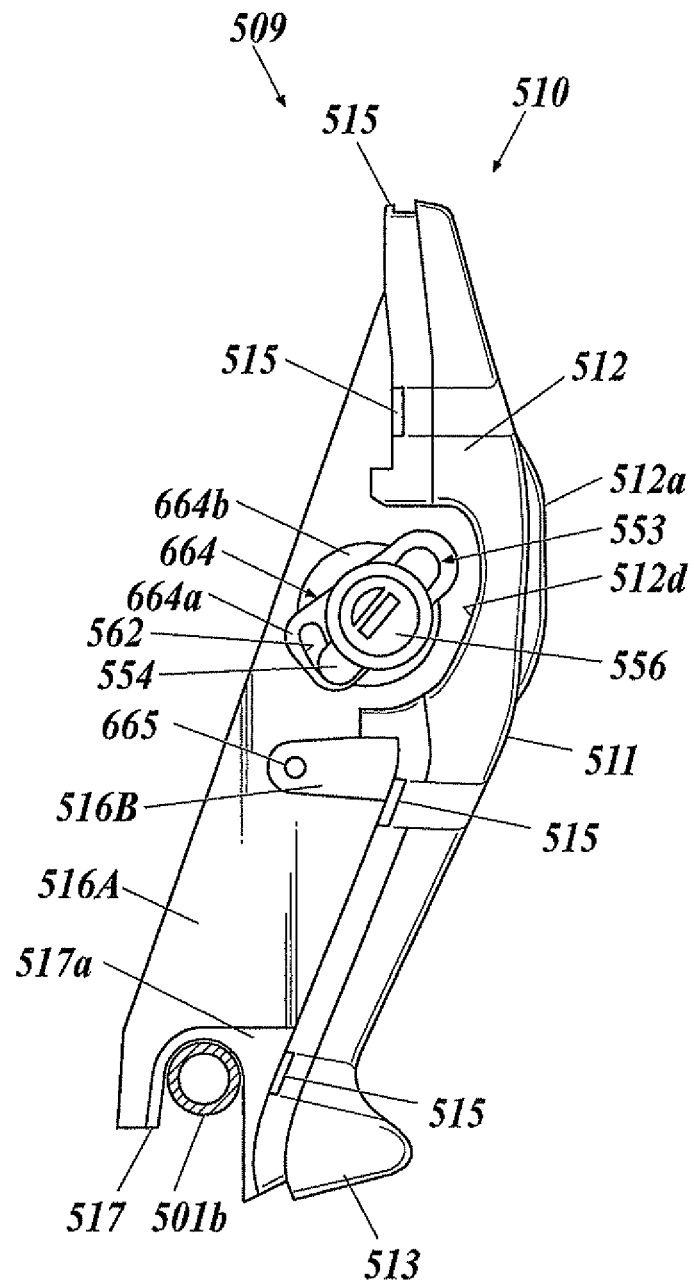
FIG. 24 is a left side view showing a front part of a headrest frame.

In the embodiment, reference numeral 1 represents the headrest pillar which constitutes the headrest. As shown in FIGS. 22 to 24, this headrest pillar 501 includes a pair of poles 501a and 501a which are laterally separated from each other, and a lateral shaft 501b which is provided between the upper ends of the pair of poles 501a ad 501a.

These pair of poles 501a and 501a and lateral shaft 501b are formed integrally, and the intermediate portions between these pair of poles 501a and 501a and the lateral shaft 501b have a curved shape.

Further, of the pair of poles 501a and 501a and lateral shaft 501b, at least lateral shaft 501b has a precisely circular cross section.

Figure 28:
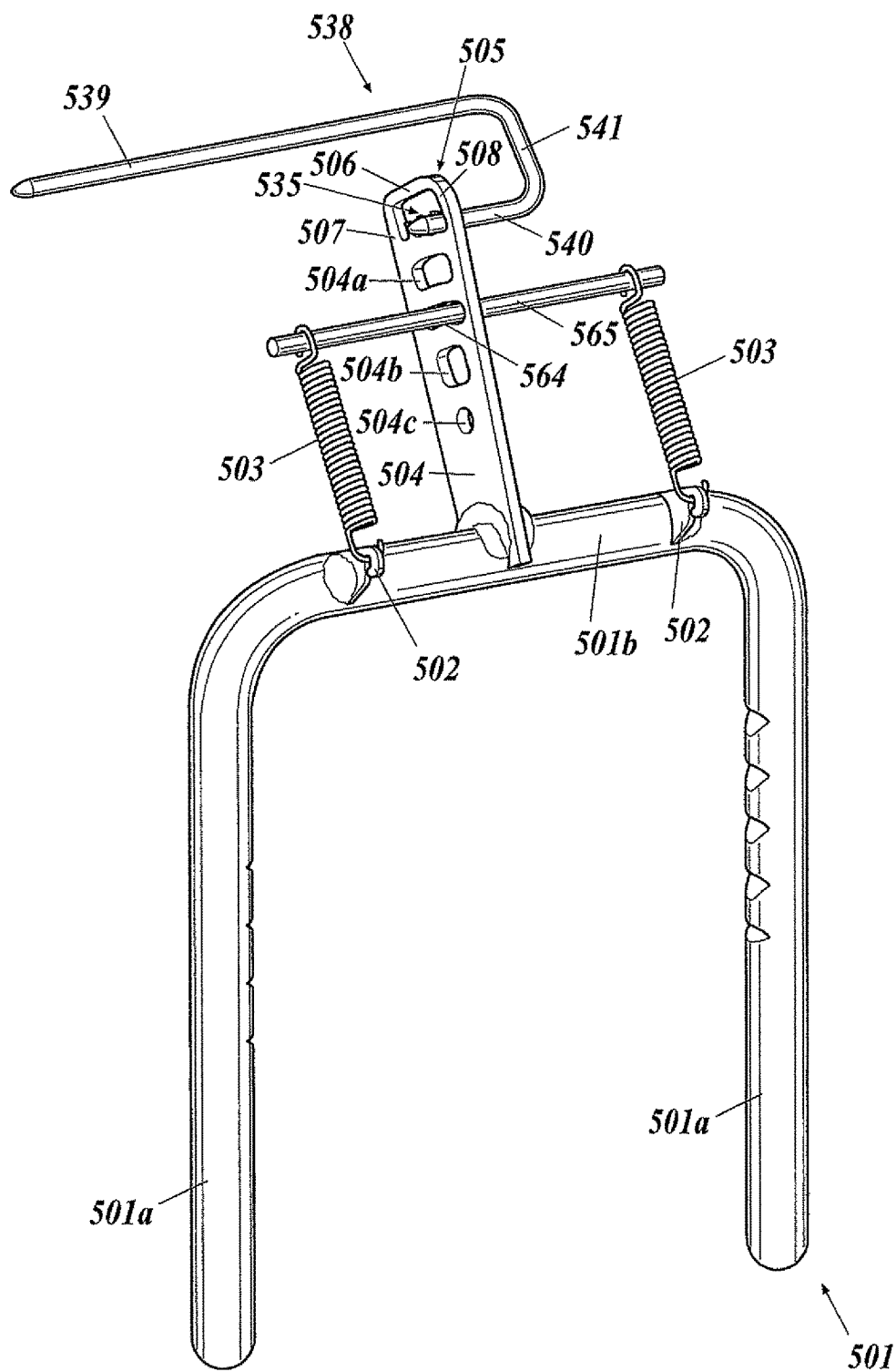
FIG. 28 is a rear perspective view showing a motion mechanism which is housed in a headrest frame.
Figure 29:
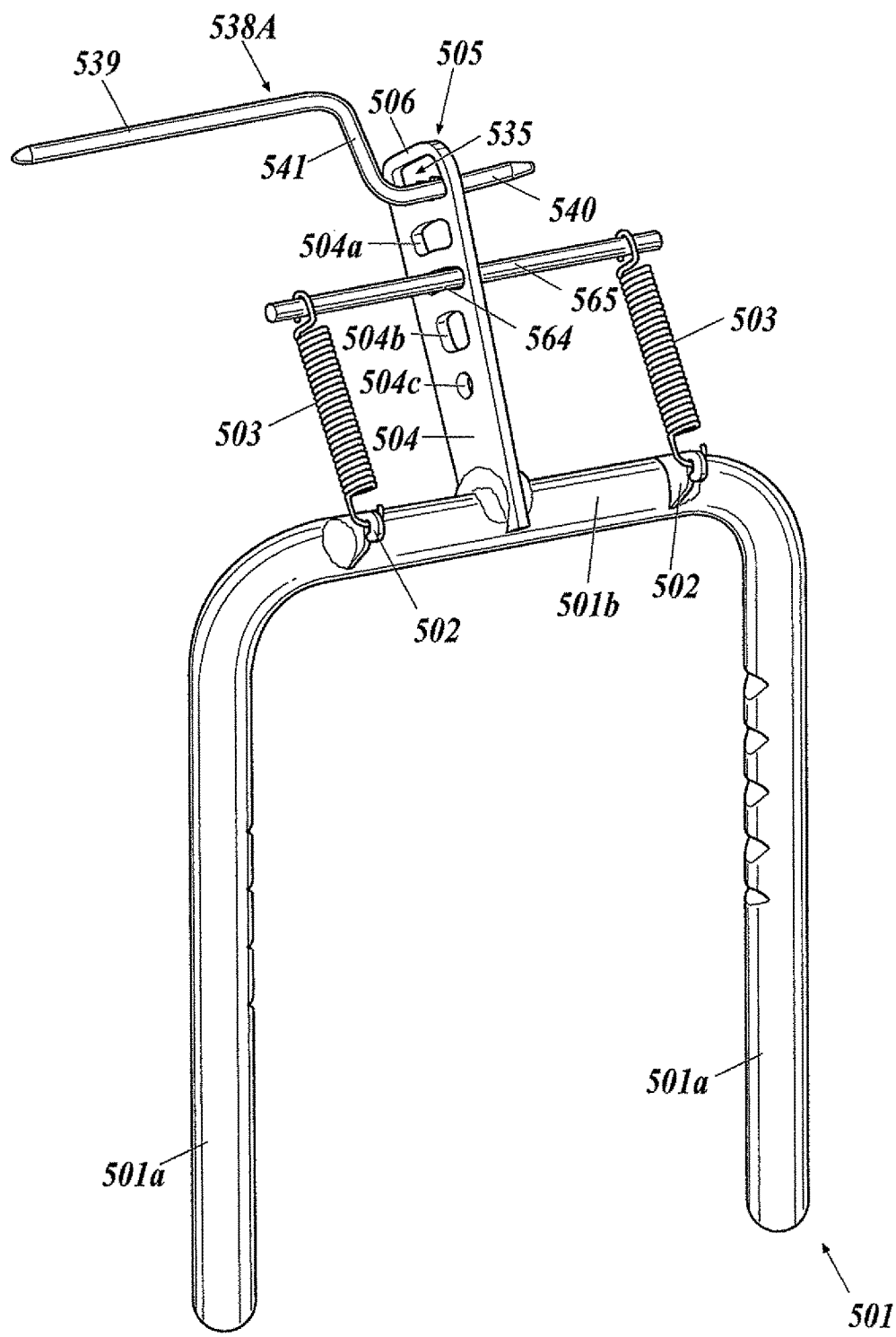
FIG. 29 is a rear perspective view showing a motion mechanism which has a different configuration from the motion mechanism shown in FIG. 28.

Further, as shown in FIGS. 28 and 29, the lateral shaft 501b supports a lock bracket 504. The lock bracket 504 is a member which constitutes the lock mechanism, and its base end is fixed to the lateral shaft 501b in such a manner that it protrudes upward and is inclined forward.

The lock bracket 504 is a metal plate which is thin in the lateral direction and long in the vertical direction, in which a ratchet 535 is formed at a tip end 505.

Further, it is provided to the lateral shaft 501b in such a manner that an arched shaft holder is formed at its base end and it grasps the lateral shaft 501b. Further, this base end is firmly joined and fixed to the lateral shaft 501b by welding or the like.

Further, as shown in FIGS. 22, 28, 38A to 38D and the like, slotted holes 504a and 504b are formed on the lock bracket 504 at positions closer to the headrest pillar 501 than the ratchet 535, and are adapted to be shorter than the fore-aft length of the ratchet 535.

One slotted hole 504a is placed below the ratchet 535, while the other slotted hole 540b is placed below a guide concave 564 which is formed at a position closer to the headrest pillar 501 than one slotted hole 504a. Further, a precise circular hole 504c is further formed below the other slotted hole 540b. These one and the other slotted holes 504a and 504b and hole 504c penetrate the lock bracket 504 laterally.

Further, these one and the other slotted holes 504a and 504b and hole 504c are adapted in such a manner that lower holes are shorter in the fore-aft direction. Specifically, one slotted hole 504a has the longest fore-aft length, the other slotted hole 504b is the second, and then the hole 504c.

Further, mounts 502 and 502 to which a plurality of biasing members 503 and 503 are attached are fixed on the lateral shaft 501b.

The plurality of biasing member 503 and 503 are provided between the headrest frame 509 and the lateral shaft 501b of the headrest pillar 501, and bias the headrest frame 509 toward the lateral shaft 501b. These biasing members 503 are composed of coil springs.

The mounts 502 and 502 are formed in a hook shape, and can hook the lower ends of the lateral shaft 501b-side ends of the biasing members 503 and 503, which are coil springs. They are located at both lateral sides of the lock bracket 504 with being separated from the lock bracket 504 by the same interval form the lock bracket 504. Accordingly, the lateral shaft 501b-side ends of the biasing members 503 and 503 are also located with being separated from each other in the longitudinal direction of the lateral shaft 501b.

The mounts 502 and 502 are firmly joined and fixed to the lateral shaft 501b by welding or the like. Further, these mounts 502 and 502 protrude obliquely upward and backward.

Further, as shown in FIGS. 22 to 27, the headrest frame 509, which constitutes the headrest and functions as the displaceable body, is attached to the lateral shaft 501b in an adjustable manner in the fore-aft position. The headrest frame 509 of the embodiment is rotatable in the fore-aft direction around the axis of the lateral shaft 501b of the headrest pillar 501 as its center of rotation.

Further, this headrest frame 509 receives an occupant's head, and is formed hollow. The headrest frame 509 is integrated with a resin such as urethane which forms a cushion pad.

Inside it, a movable mechanism which enables the headrest frame 509 to move with respect to the headrest pillar 501 is housed. That is, the headrest frame 509 covers the movable mechanism so as to reduce external load and impact to the movable mechanism as well as to prevent the resin of the cushion pad from leaking in.

Further, the headrest frame 509 includes a front part 510, back part 519, decoration rims 528 and 528 and button 532.

The front part 510 and back part 519 are configured to engage with each other by their rims, and have a fitting-in structure in which a plurality of engaging hooks 515 . . . which are placed along the rim of the front part 510 and a plurality of engaged concaves 525 . . . which are placed along the rim of the back part 519 are engaged with each other. These front part 510 and back part 519 are configured to form a hollow inside them when fitted and assembled together.

Since the front part 510 and back part 519 have the fitting-in structure, they can be reliably assembled together. To make the fitting-in easier at the time of assembly, a positioning unit may be provided between these front part 510 and back part 519.

The front part 510 is placed at the front side of the seat back in the fore-aft direction so as to receive an occupant's head directly, and holds the movable mechanism as shown in FIGS. 22, 28 to 32 and the like.

This front part 510 includes a front wall 511, peripheral wall 512, bulges 513 and 513, bottom wall 514, convexes 516 (convexes 516A, 516B, 516C and 516D), grasps 517 and 517 and the like. Further, as shown in FIG. 24 and the like, the front wall 511, peripheral wall 512, bulges 513 and 513 and bottom wall 514 are located in the front over the lateral shaft 501b.

The front wall 511 occupies most part of the front part 510 as shown in FIG. 23, and curves forward near the middle in the vertical direction as shown in FIG. 24.

The peripheral wall 512, bulges 513 and 513 and bottom wall 514 are integrally formed along the rim of the front wall 511.

The peripheral wall 512 is provided along the rims of the front wall 511 and bulges 513 and 513, and extends backward from these front wall 511 and bulges 513 and 513 so as to form a space which makes the headrest frame hollow.

Figure 27:
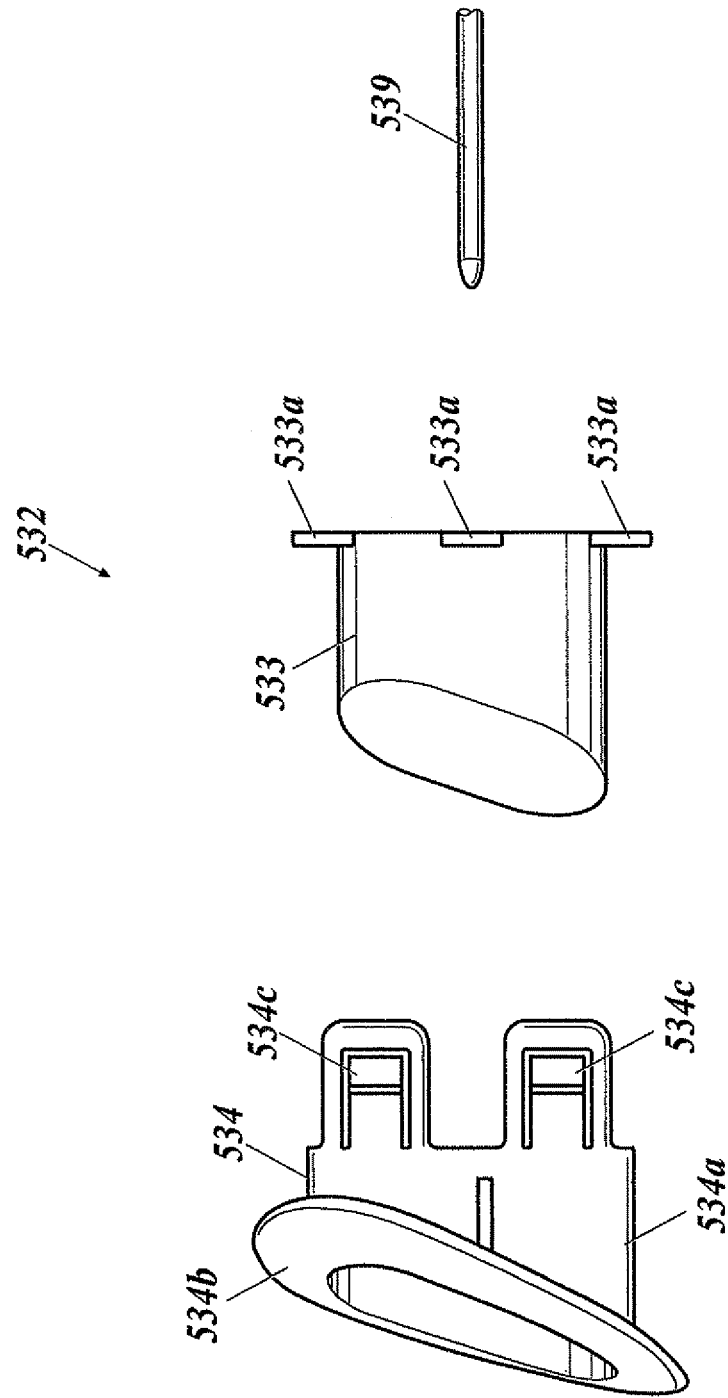
FIG. 27 is an exploded view of a button which is attached on to a headrest frame.

A button mount 512a to attach the button 532 as shown in FIG. 27 is integrally formed with this peripheral wall 512, and protrudes sideward. A cutoff 512b is formed on the protrusion end of the button mount 512a in order to fit a button holder 534 of the button 532 in the button mount 512a.

Further, a cutoff 512d is formed at the opposite side of the peripheral wall 512 from the button mount 512a. This cutoff 512d is for inserting a lock member 538 described below into the headrest frame 509.

As shown in FIGS. 22 and 23, the bulges 513 and 513 are provided at both lower lateral sides of the front part 510, and respectively bulges laterally outward and forward. The bulges 513 and 513 house the intermediate portions between the pole 501a and 501a and the lateral shaft 501b of the headrest pillar 501.

The bottom wall 514 is provided along the lower edges of the front wall 511 and bulges 513 and 513 and continuously to the peripheral wall 512, and thus forms the bottom face of the front part 510.

Cutoffs 514a and 514a are formed on this bottom wall 514, to which the decoration rims 528 and 528 as shown in FIG. 22 are fitted in.

The convex 516 is integrally formed on the front wall 511, and represents a plurality of convexes which protrudes backward from the back face of the front wall 511.

As the plurality of the convexes, convexes 516A and 516A, convexes 516B and 516B, convex 516C and convex 516D are provided on the back face of the front wall 511.

As shown in FIG. 22, the convexes 516A and 516A represent two convexes which are placed vertically on the back face of the front wall 511, and aligned in the lateral direction with an interval. These two convexes 516A and 516A are formed in an approximately the same size.

These two convexes 516A and 516A are provided in parallel with the movable mechanism, and a wall 660 of one convex 516A and a wall 661 of the other convex 516A are opposed to each other.

Further, these two convexes 516A and 516A are coupled to each other through a connection part 662 which intersects with these convexes 516A and 516A. In the embodiment, the connection part 662 couples the two convexes 516A and 516A at a position higher than the lock bracket 504. In more detail, their upper ends are coupled.

These two convexes 516A and 516A and connection part 662 are formed integrally, and intermediate portions between these two convexes 516A and 516A and the connection part 662 have a curved shape. That is, the two convexes 516A and 516A and connection part 662 are formed in an approximately inversed U-shape in an anterior view of the back face of the front part 510.

Figure 30:
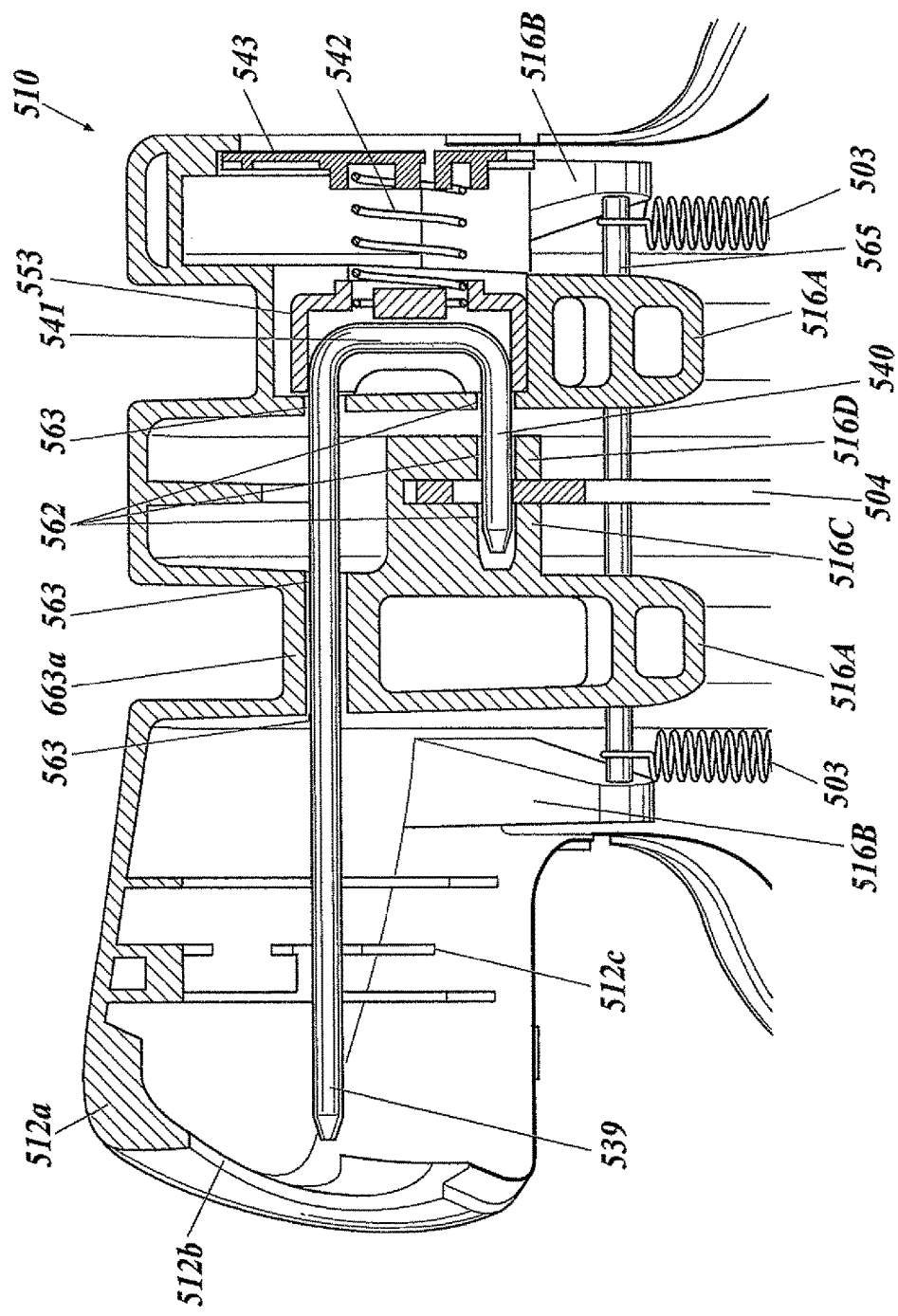
FIG. 30 is a cross-sectional view showing an attached state of a lock member.
Figure 31:
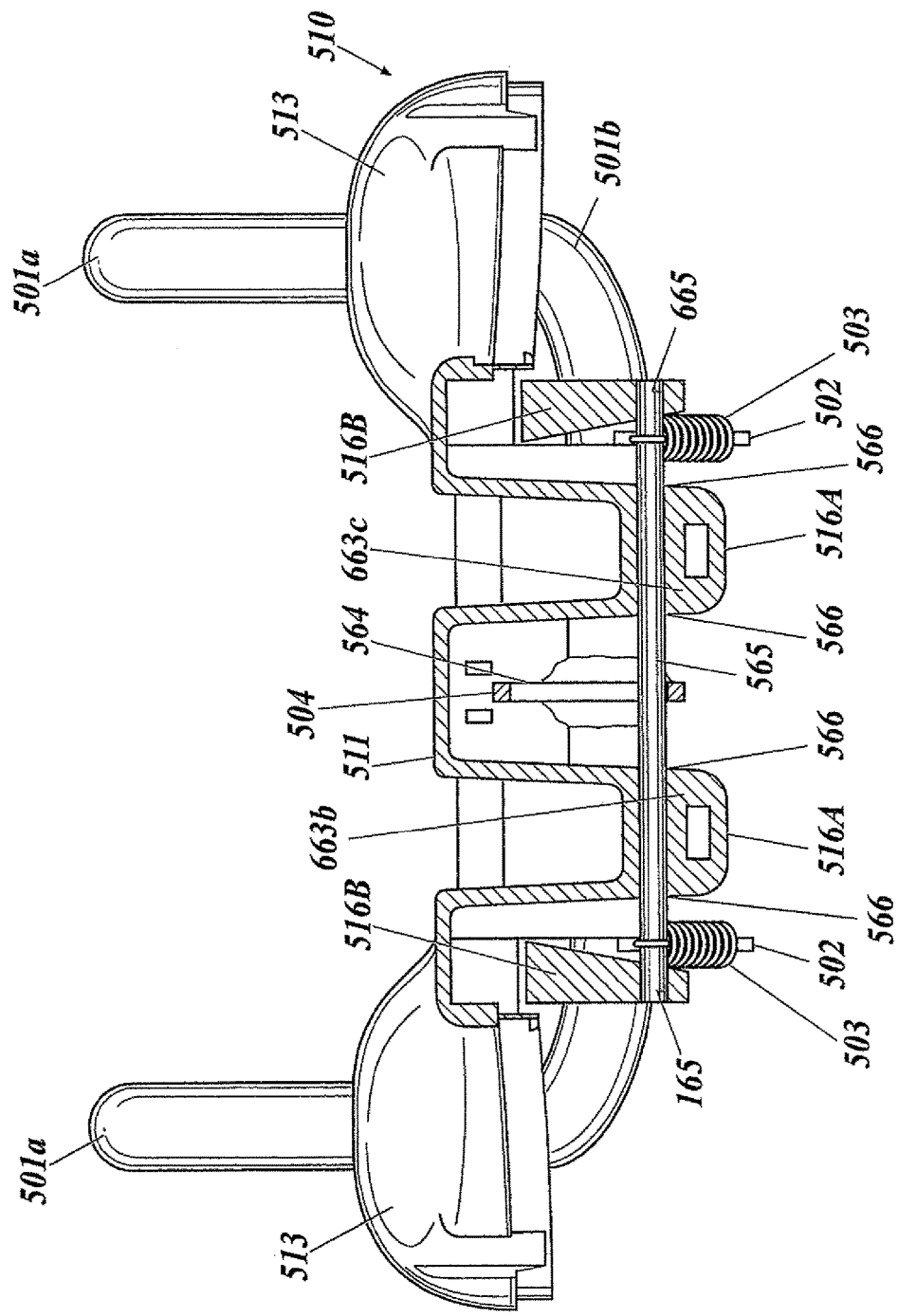
FIG. 31 is a cross-sectional view showing an attached state of a guide member.

Further, as described below, these convexes 516A and 516A include protrusions 663a to 663e which are integrally formed with these convexes 516A and 516A and protrude toward the movable mechanism as shown in FIGS. 30 and 31.

Figure 32:
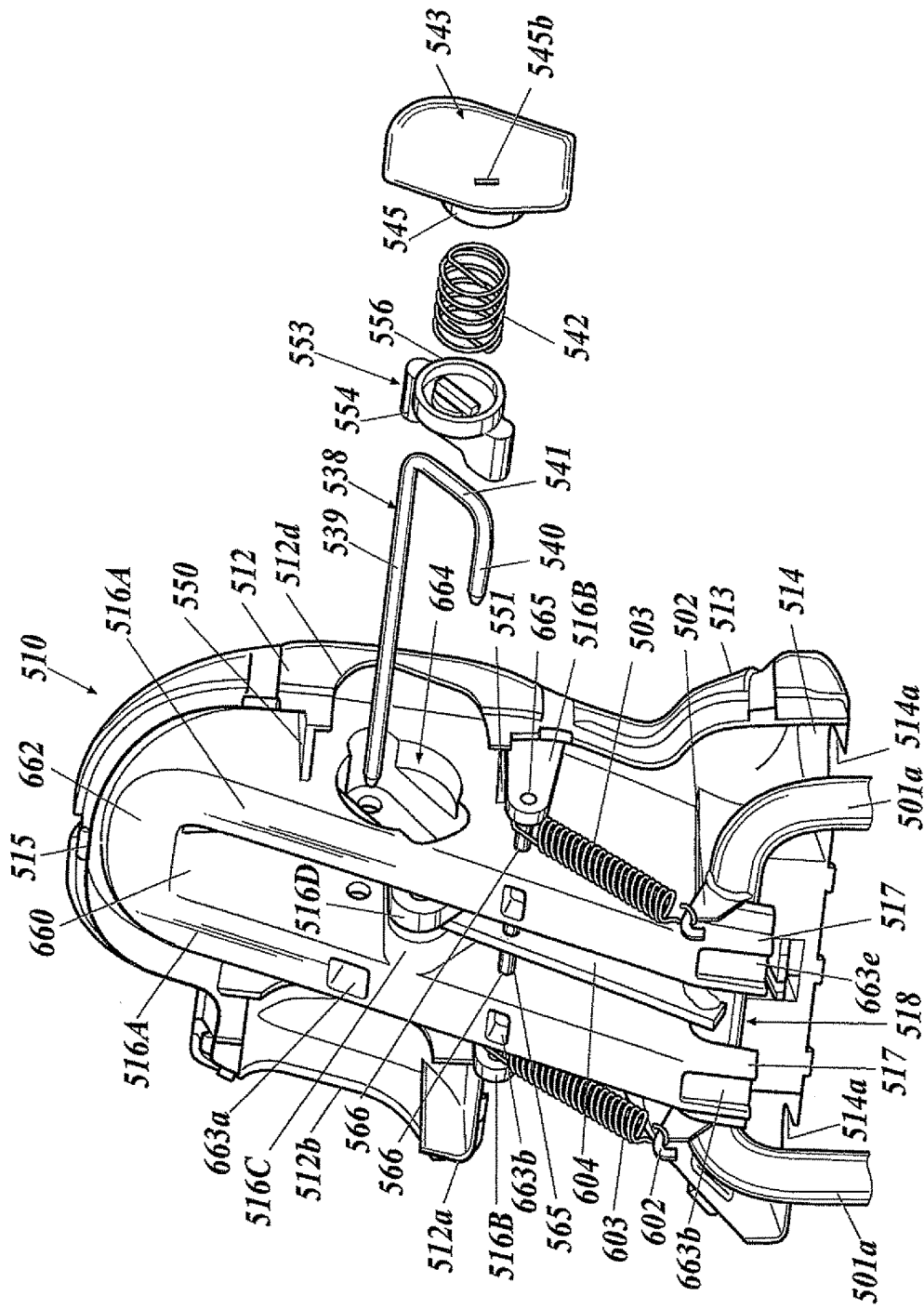
FIG. 32 is a rear perspective view showing a state where a lock member is attached on to a headrest frame.

As shown in FIGS. 22 and 32, the convexes 516B and 516B are placed separately at laterally outer positions than the two convexes 516A and 516A. Holes 665 and 665 are respectively formed on the tip ends of these convexes 516B and 516B, and penetrate them in the lateral direction. A guide member 565 described below is inserted through the holes 665 and 665.

The convexes 516C and 516D are provided side by side in the lateral direction between the opposed walls 660 and 661 of the two convexes 516A and 516A. The lock bracket 504 is provided between the convex 516C and the convex 516D. Engaging part slotted holes 562 are formed on each of these convexes 516C and 516D, which the engaging part 540 of the lock member 538 is inserted through. These engaging part slotted holes 562 and 562 are provided at both lateral sides of the ratchet 535 of the lock bracket 504.

The base ends of these convexes 516C and 516D are coupled to each other, and are also coupled to the front wall 511 and the two convexes 516A and 516A. As shown in FIG. 22, the convex 516C is placed at the side of one convex 516A, and the convex 516D is place at the side of the other convex 516A. The tip end of the convex 516D is placed separated from the tip end of the convex 516C as well as from the wall 661 of the convex 516A.

The convexes 516A and 516A and connection part 662, convex 516B and 516B, convex 516C and convex 516D are integrally formed with the front wall 511 in the production of the front part 510. Therefore, as shown in FIG. 23, concaves are respectively formed on the front face of the front wall 511 at the positions corresponding to these convexes and connection part 662.

As shown in FIGS. 22 and 24, grasps 517 and 517 is for grasping the lateral shaft 501b, and is provided at the lower end of the front part 510. Further, they are formed in an arched shape in the side view so as to be open downward, and these arched parts grasp the lateral shaft 501b. Since the grasps 517 and 517 grasp the lateral shaft 501b in such a way, the headrest frame 509 is rotatable in the fore-aft direction with respect to the lateral shaft 501b.

Further, these grasps 517 and 517 are coupled with the two convexes 516A and 516A. That is, the grasps 517 are placed under the convexes 516A, and these convexes 516A and grasp 517 are formed integrally.

As shown in FIG. 24, the grasps 517 and 517 extend downward below the lateral shaft 501b. Therefore, it is advantageous that the lateral shaft 501b can be grasped more reliably compared to a case where, for example, the grasps 517 and 517 do not extend downward.

Further, steps 517a and 517a are respectively formed in the grasps 517 and 517, and form steps outward on the outer lateral side faces of the grasps 517 and 517. Therefore, it is advantageous that the grasps 517 and 517 can be made thicker in the lateral direction, and can thus grasp the lateral shaft 501b more reliably.

Further, as shown in FIGS. 22 and 32, the grasps 517 and 517, which are integrally formed with the convexes 516A and 516A, include the protrusions 663d and 663e which are formed integrally with these grasps 517 and 517 and which protrude toward the lateral shaft 501b as the movable mechanism.

These protrusions 663d and 663e are apparently formed in a concave shape, however protrude from the back part 519-side faces of the grasps 517 and 517 toward the lateral shaft 501b as well as toward the inside of the grasps 517 and 517. Since the part where the protrusions 663d and 663e are formed has high rigidity, the lateral shaft 501b can be reliably supported and displacement of the lateral shaft 501b can be reliably regulated.

Further, the grasp 517 and 517 are placed closer to the center of the lateral shaft 501b than the mounts 502 and 502 which are attached to the lateral shaft 501b. Further, the outer ends of the grasps 517 and 517 are placed adjacent to the mounts 502 and 502. That is, since the grasps 517 and 517, which function as connectors of the headrest frame 509 with the lateral shaft 501b, are provided between the mounts 502 and 502, these mounts 502 and 502 can regulate the lateral position of the headrest frame 509 itself.

Further, not only when the grasps 517 and 517 are provided between the mounts 502 and 502, but also when the mounts 502 and 502 are provided between the grasps 517 and 517 conversely, such mounts 502 and 502 can also regulate the lateral position of the headrest frame 509.

Further, the interspace between one grasp 517 and the other grasp 517 is a lower opening 518 which is open downward.

In the assembly of the headrest, this lower opening 518 functions as an insertion opening into which the lock bracket 504 is inserted when the front part 510 is attached to the headrest pillar 501 on which the lock bracket 504 is fixed.

The back part 519 is placed at the rear side of the seat back in the fore-aft direction, and covers the movable mechanism which is held by the front part 510.

This back part 519 includes a rear wall 520, a peripheral wall 521, bulges 523 and 523, a bottom wall 524 and the like.

Figure 25:
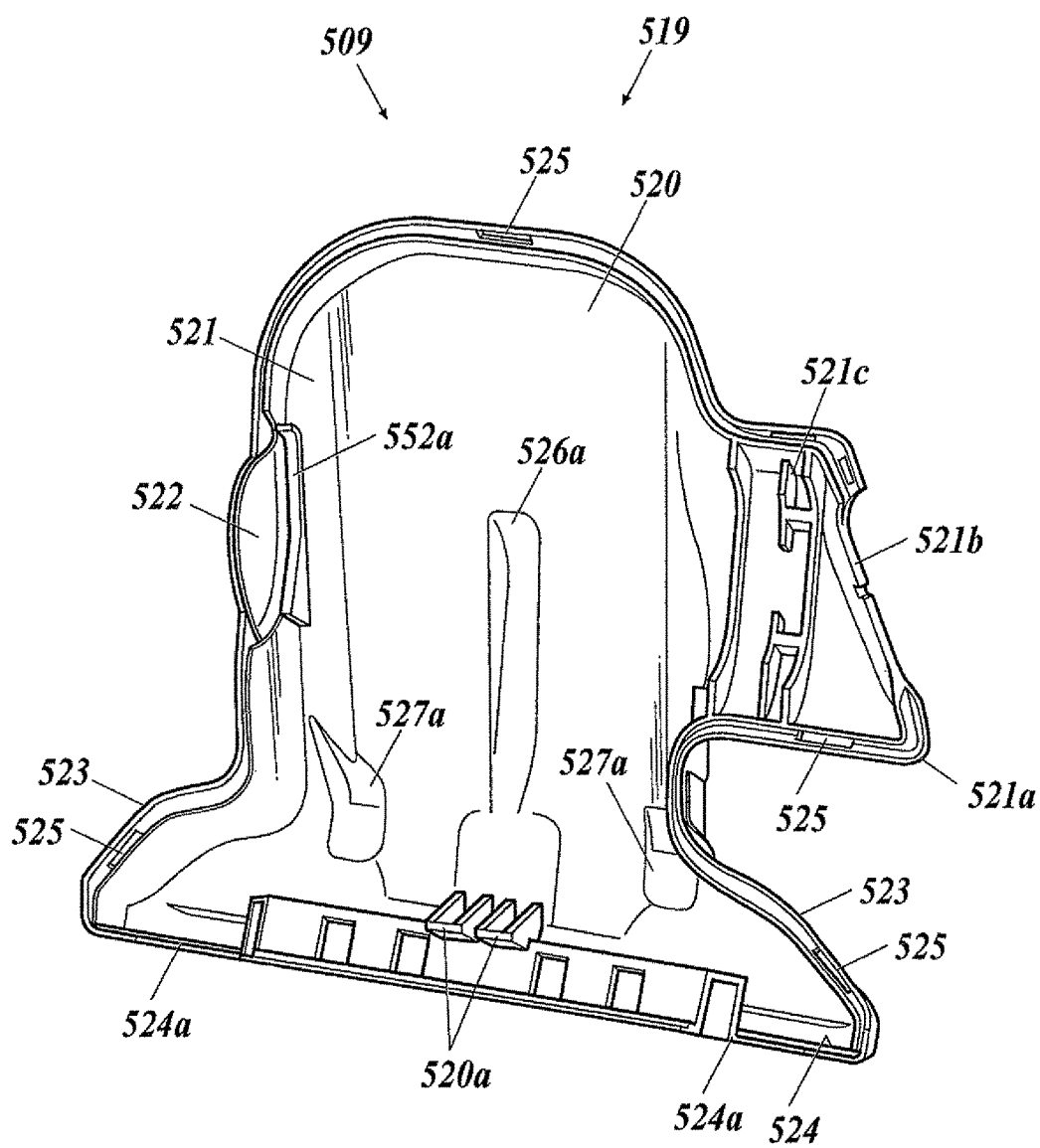
FIG. 25 is a front perspective view showing a back part of a headrest frame.
Figure 26:
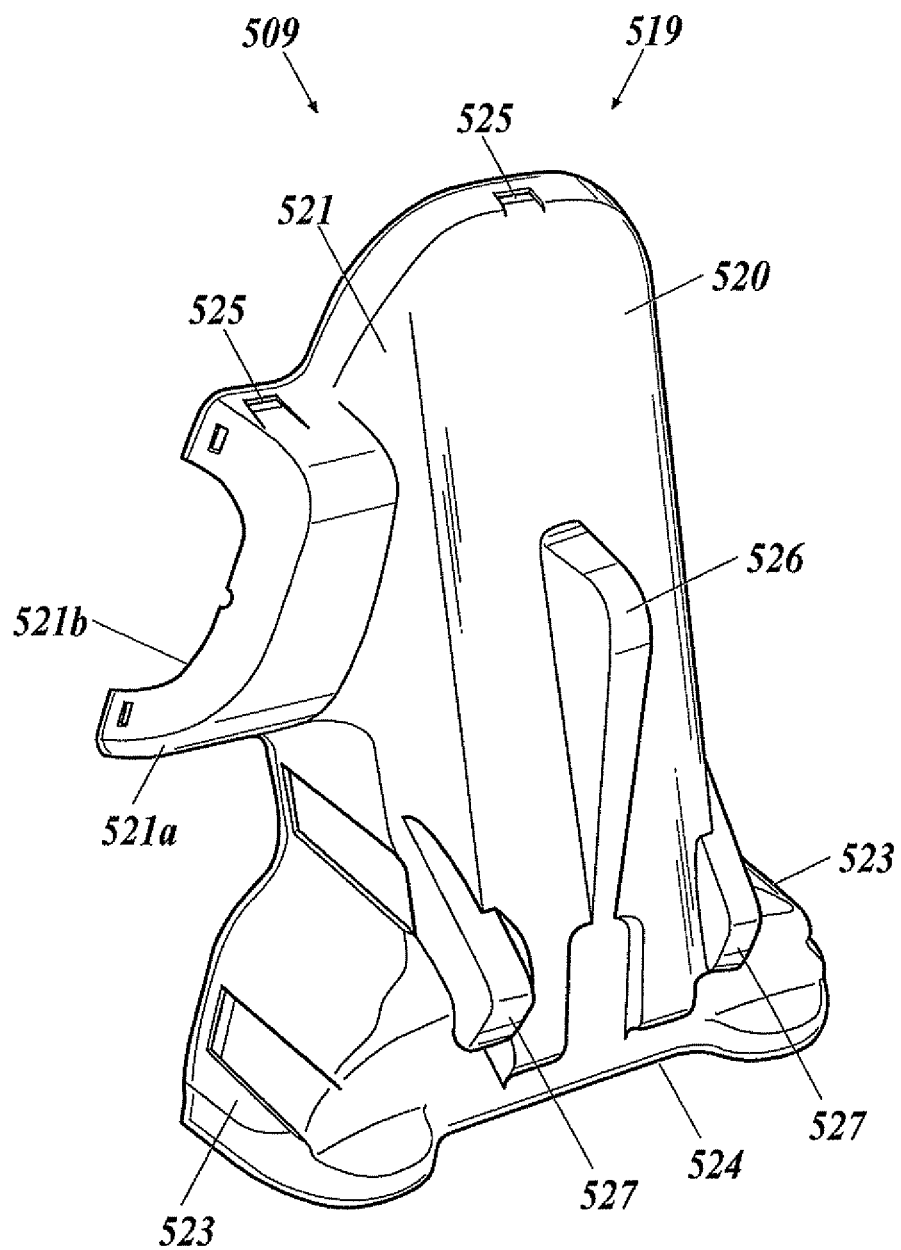
FIG. 26 is a rear perspective view showing a back part of a headrest frame.

As shown in FIGS. 25 and 26, the rear wall 520 occupies most part of the back part 519, and inclines forward along the convexes 516A and 516A of the front part 510.

The peripheral wall 521, bulges 523 and 523 and bottom wall 524 are integrally formed along the rim of the rear wall 520.

Further, a protrusion support 520a is provided at the lower center on the front face of the rear wall 520, and protrudes forward. This protrusion support 520a is inserted between the center part of the lateral shaft 501b and the bottom wall 514 of the front part 510 which is located below the lateral shaft 501b. This establishes such positional relationship that the lateral shaft 501b is sandwiched from below and above in combination with the grasps 517 and 517. In this way, the headrest frame 509 can be reliably prevented from falling off from the headrest pillar 501.

Further, as shown in FIG. 26, rear protrusion 526 is provided to the rear wall 520, and protrudes backward from the outer face of the rear wall. This rear protrusion 526 is provided at the center of the headrest frame 509 in the lateral direction. Therefore, compared to a case where, for example, the rear protrusion 526 is placed in a laterally deviated position from the lateral center of the headrest frame 509, a good lateral balance as well as advantage in the rigidity of the frame 509 are achieved.

As shown in FIG. 25, a concave 526a is formed on the inner side of the headrest frame 509 at the position corresponding to the rear protrusion 526. This concave 526a is a space where a part of the movable mechanism which displaces toward the rear wall 520 fits.

Further, as shown in FIG. 26, aside from the rear protrusion 526, rear protrusions 527 and 527 for the mounts 502 and 502 are provided to the rear wall 520.

As shown in FIG. 25, concaves 527a and 527a are respectively formed on the inner side of the headrest frame 509 at the positions corresponding to these rear protrusions 527 and 527, and mounts 502 and 502 are housed in these concaves 527a and 527a.

The peripheral wall 521 is provided along the rim of the rear wall 520 and bulges 523 and 523, and extends forward from these rear wall 520 and bulges 523 and 523 so as to form a space which makes the headrest frame hollow.

A button mount 521a to attach the button 532 as shown in FIG. 27 is integrally formed on this peripheral wall 521, and protrudes sideward. A cutoff 521b is formed on the protrusion end of the button mount 521a. The cutoff 521b is a part for fitting a button holder 534 of the button 532 into the button mount 521a.

Figure 36:
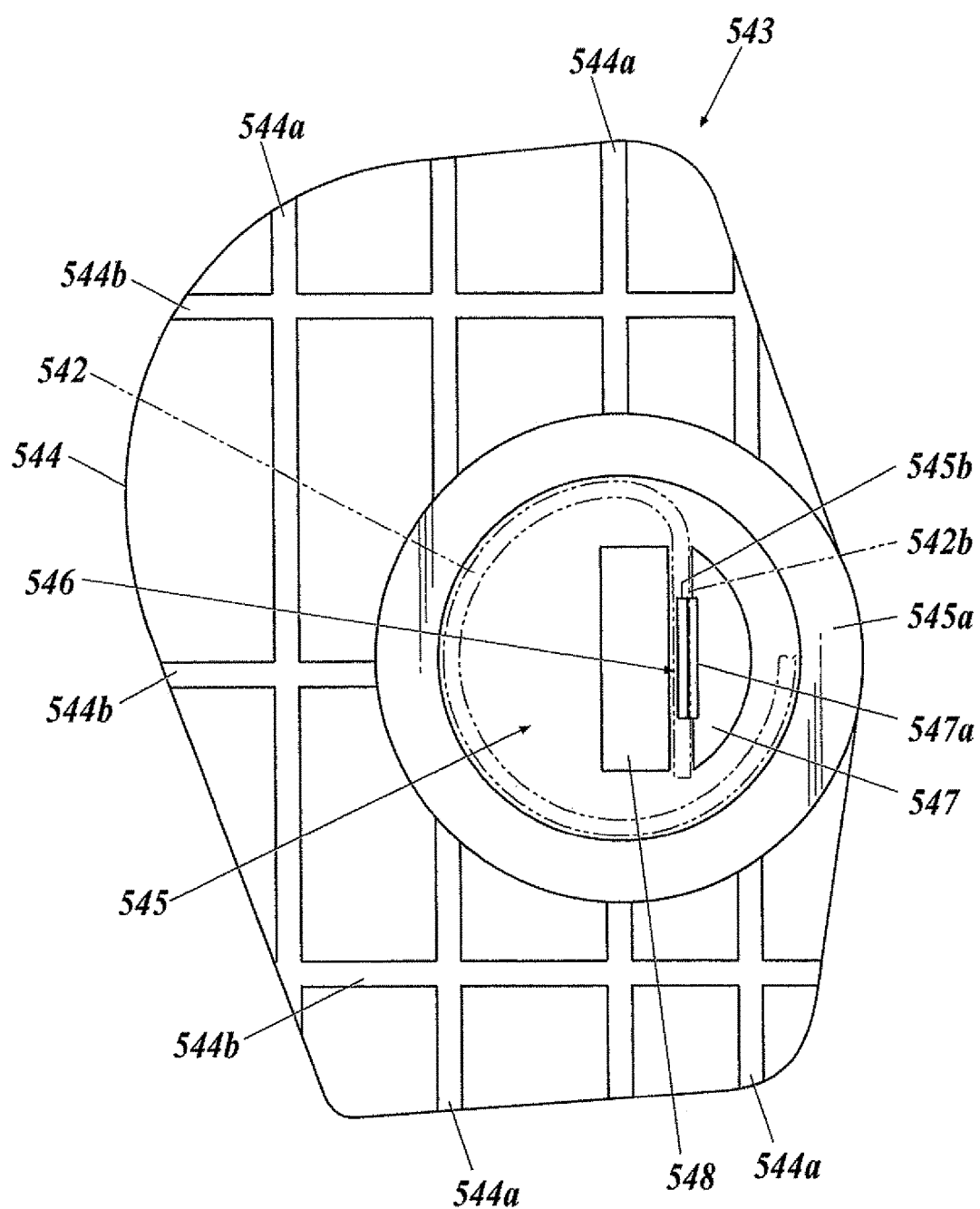
FIG. 36 is an enlarged view showing an other-end engaging member with which the other end of a biasing member is engaged.
Figure 37A:
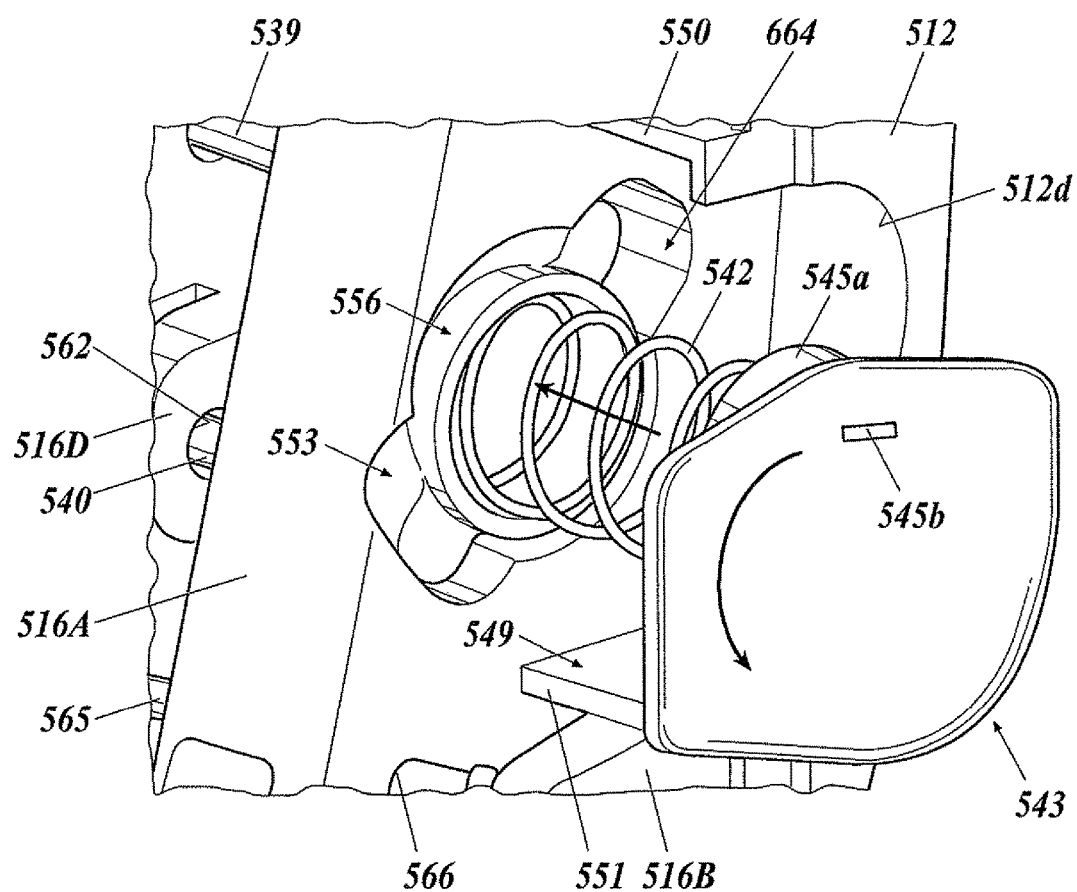
FIG. 37A is a view showing an attached state of an other-end engaging member.

Further, an abutting part 522 is integrally formed at the opposite side of the peripheral wall 512 from the button mount 521a. The abutting part 522 closes the cutoff 512d and abuts an other-end engaging member 543 as shown in FIGS. 36, 37A and 37B so as to restrict the other-end engaging member 543 from moving outward.

As shown in FIGS. 25 and 26, the bulges 523 and 523 are provided at both lower lateral sides of the back part 519, and respectively bulges laterally outward and backward. The bulges 523 and 523 house the intermediate portions between the pole 501a and 501a and the lateral shaft 501b of the headrest pillar 501.

The bottom wall 524 is provided continuously to the peripheral wall 521 along the lower rims of the rear wall 520 and bulges 523 and 523, and thus forms the bottom face of the back part 519.

Cutoffs 542a and 524a are formed on the bottom wall 524, to which the decoration rims 528 and 528 as shown in FIG. 22 are fitted in.

As shown in FIGS. 22 to 26, the decoration rims 528 and 528 are provided on the bottom walls 514 and 524 of the front part 510 and back part 519 which are fitted to each other. The decoration rims 528 and 528 are provided at the positions corresponding to the positions of the pair of poles 501a and 501a of the headrest pillar 501.

When the front part 510 and back part 519 are assembled together, the cutoffs 514a and 514a formed on the bottom wall 514 and the cutoffs 524a and 524a formed on the bottom wall 524 form two slotted openings on the bottom walls 514 and 524.

The decoration rims 528 and 528 are attached to these two slotted openings so that the rims of the slotted openings can be decorated.

The decoration rims 528 include slits 529 which the poles 501a are inserted through, peripheral walls 530 and flanges 531.

The slits 529 are formed in a slotted hole which is long in the fore-aft direction. These slits 529 prevent the decoration rims 528, which move along with rotation of the headrest frame 509 in the fore-aft direction, from contacting with the poles 501a. Therefore, the headrest can be rotated smoothly in the fore-aft direction.

The peripheral walls 530 are placed at the peripheries of the slits 529, and define the slits 529. The peripheral walls 530 are inserted and fitted in the slotted openings which are formed on the bottom walls 514 and 524.

The flanges 531 are integrally formed at the lower end of the peripheral walls 530, and abut the lower faces of the bottom walls 514 and 524.

That is, these flanges 531 have a larger diameter than the slotted openings which are formed on the bottom walls 514 and 524, and can thus prevent the decoration rims 528 from going from the slotted openings down into the headrest frame 509.

As shown in FIGS. 22 to 27, the button 532 is provided to the button mount 512a and 521a of the peripheral walls 512 and 521 of the front part 510 and back part 519 which are fitted to each other.

When the front part 510 and back part 519 are assembled together, the cutoff 512b formed in the button mount 512a and the cutoff 521b formed in the button mount 521a form a slotted opening on the protrusion end of the button mounts 512a and 521a.

The button 532 is then attached to the slotted opening, and the movable mechanism is operable with this button 532.

The button 532 is composed of a button body 533 and the button holder 534.

The button holder 534 includes a tube 534a in which the button 533 is inserted.

A flange 534b is provided at the periphery of the end of the tube 534a at the outer side of the headrest frame 509, and has a larger diameter than the slotted opening. Further, catches 534c are provided at the end of the tube 534a at the inner side of the headrest frame 509, and catches catch ribs 512c and 512c which are formed on an inner periphery of the button mounts 512a and 521a.

The button body 533 is a member to which the button 532-side end of the held part 539 of the lock mechanism described below is attached. The button body 533 is inserted in the tube 534a of the button holder 534, and is movable back and forth along the tube 534a.

Further, the button body 533 includes a stopper plate 533a which is blocked by the inner-side end of the tube 534a. In this way, the externally exposed end face of the button 533 is configured not to protrude over the flange 534b of the button holder 534.

Next, the movable mechanism which enables the movement of the headrest frame 509 with respect to the headrest pillar 501 will be described.

As shown in FIG. 28, the movable mechanism includes: the lock mechanism which locks the headrest frame 509 at a plurality of positions along the fore-aft direction with respect to the lock bracket 504; and a guide mechanism which guides the movement of the headrest frame 509 in the fore-aft direction. The movement of headrest frame 509 in the fore-aft direction represents the rotation in the fore-aft direction as described above, and the lock mechanism can lock the headrest frame 509 at a plurality of positions along the rotational direction.

The lock mechanism includes the ratchet 535, the lock mechanism 538, and a biasing unit which biases the lock mechanism 538 toward the ratchet 535 as well as toward the bottoms 537a of the concave grooves 537 of this ratchet 535. This lock mechanism has functions of not only locking the headrest frame 509 at predetermined positions, but also unlocking the lock.

The guide mechanism includes a guide concave 564 and a guide member 565.

Further, the headrest pillar 501, lock bracket 504 and headrest frame 509 are provided with configurations which are required to move the lock mechanism or guide mechanism or to improve the movement of the lock mechanism or guide mechanism.

Figure 39:
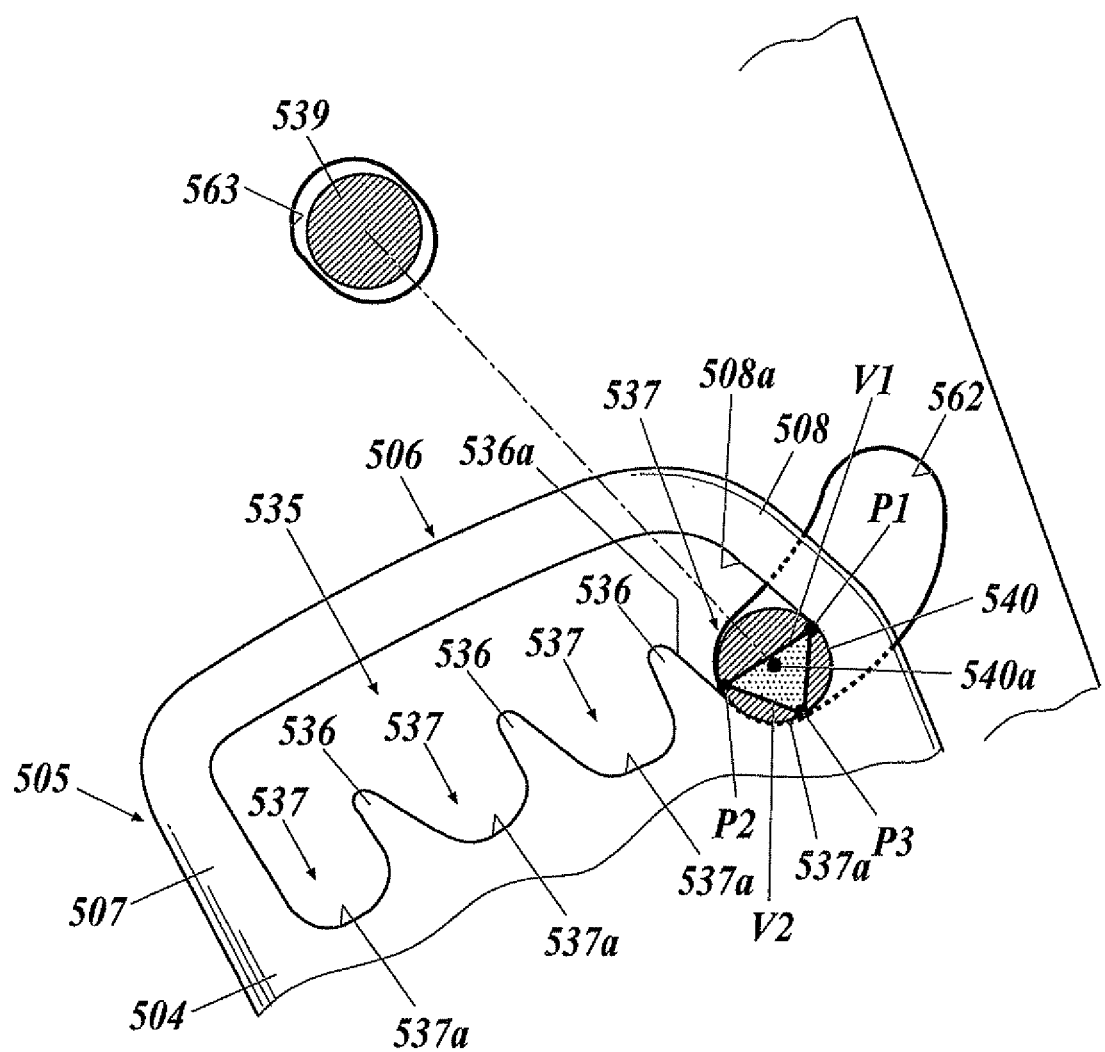
FIG. 39 is a view showing a relation between a lock member and ratchet.

As shown in FIGS. 28, 39 and the like, the ratchet 535 is formed at a tip end 505 of the lock bracket 504, and includes a plurality of engaging teeth 536 and a plurality of concave grooves 537 which are alternately placed along the moving direction of the headrest frame 509 and which function as the engaged part.

These plurality of engaging teeth 536 are inclined forward, and the plurality of concave groove 538 receives insertion of the lock member 538. That is, the lock member 538 is configured to be inserted in the concave grooves 537 so as to engage with the engaging teeth 536. That is, the ratchet 535 has a ratchet structure which permits the headrest frame 509 to move forward but restricts it from moving backward.

The concave grooves 537 also extends along the inclination of the engaging teeth 536, and include bottoms 537a which are the deepest points of the concave grooves 537 in the extending direction. The lock member 538 is adapted to be inserted deeply until it reaches these bottoms 537a of the concave grooves 537.

Further, as shown in FIG. 39, the lock bracket 504 includes a connection part 506 which is placed at a position closer to the protrusion tip of the lock bracket 504 than the ratchet 535 with being separated from the ratchet 535 and which connects the front and rear ends of the tip end 505 of the lock bracket 504 with each other.

This connection part 506 is integrally formed with the tip end 505 of the lock bracket 504, and includes a front end 507 which is provided at the front end of the tip end 505 of the lock bracket 504 and a rear end 508 which is provided at the rear end of the tip end 505.

The connection part 506 is supported by the front end 507 and rear end 508 so that it can be placed separated from the ratchet 535. That is, this connection part 506 is provided over the ratchet 535 in an arched shape.

Further, of the plurality of the engaging teeth 536 . . . , a rear end face 536a of the backmost engaging tooth 536 is opposed to the ratchet-side face 508a of the rear end 508 of the connection part 506, and this ratchet-side face 508a of the connection part 506 is provided along the rear end face 536a of the engaging tooth 536.

Figure 38A:
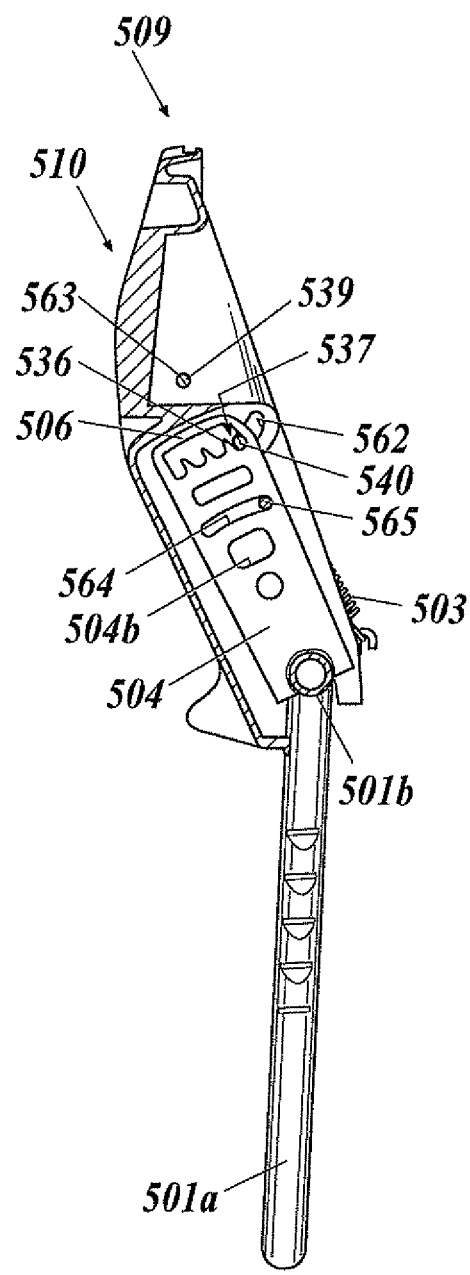
FIG. 38A is a view showing movement of a front part of a headrest frame.
Figure 38B:
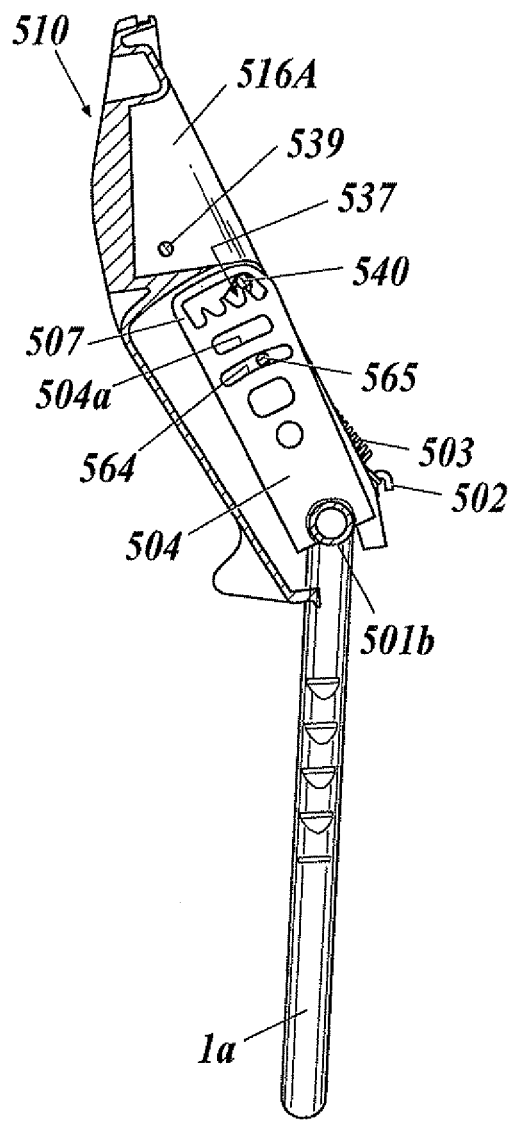
FIG. 38B is a view showing movement of a front part of a headrest frame.
Figure 38C:
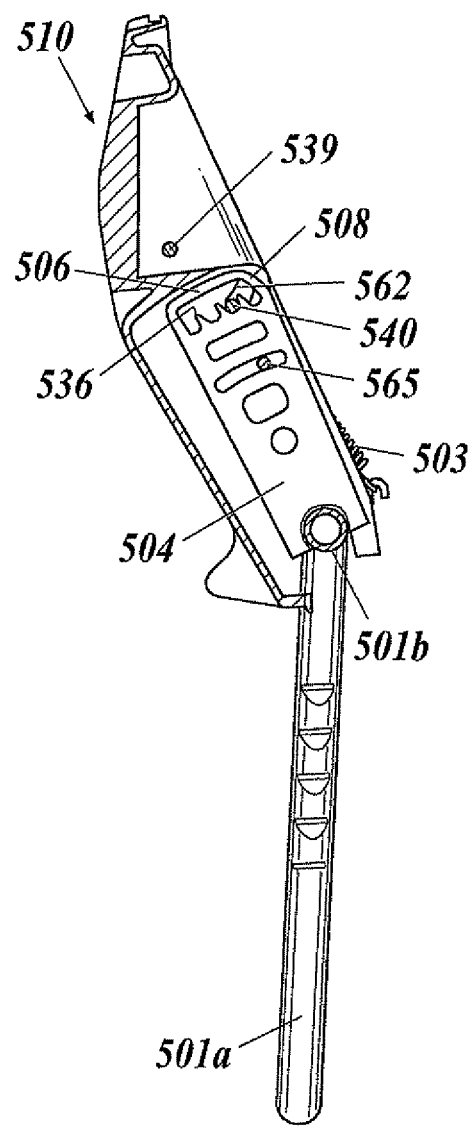
FIG. 38C is a view showing movement of a front part of a headrest frame.
Figure 38D:
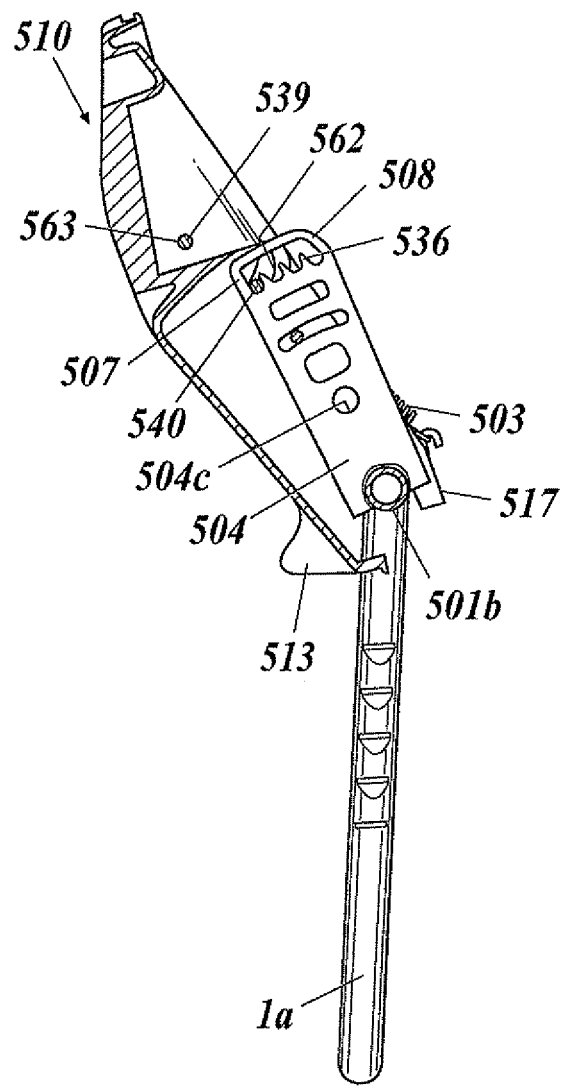
FIG. 38D is a view showing movement of a front part of a headrest frame.

Further, as shown in FIGS. 25, 26 and 38D, the rear end 508 of the connection part 506 is adapted to come closest to the back part 519 of the headrest frame 509 when the front part 510 of the headrest frame 509 is inclined forward the most, and the ratchet 535-side face of the rear end 508 of the connection part 506 is inclined forward corresponding to the plurality of engaging teeth 536 which are inclined forward.

Further, regarding the rear end 508 of the connection part 506, not only the ratchet 535-side face but also the back part 519-side face thereof is inclined forward, and the rear end 508 itself is thus inclined forward. Therefore, the rear end of the tip end 505 of the lock bracket 504 has a shape as if its edge were cut off. That is, since the rear end 508 of the connection part 506, which is adapted to come closest to the back part 519 of the headrest frame 509, can be prevented from protruding significantly toward the back face of the headrest frame 509 when the headrest frame 509 is inclined forward the most, the headrest can be prevented from increasing in size in the fore-aft direction, which can contribute to downsizing the headrest.

Further, the rear protrusion 526 of the rear part 519 is provided at the position facing this rear end 508 of the connection part 506. The rear end 508 of the connection part 506 and the rear end of the lock bracket 504 are inserted and housed in the concave 526a of the rear protrusion 526.

Figure 34:
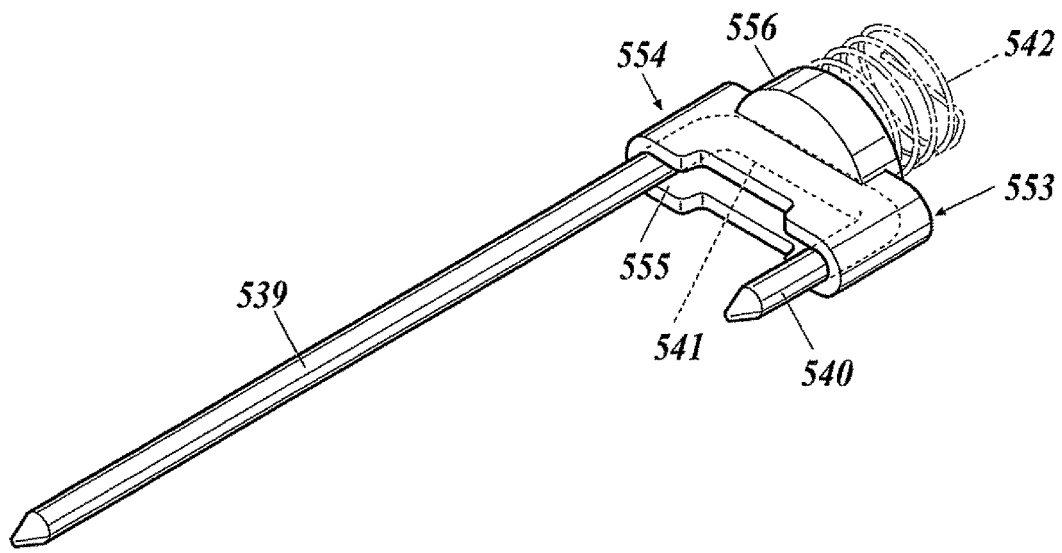
FIG. 34 is a perspective view showing a first engaging part with which a lock member is engaged.

As shown in FIGS. 28, 32, 34 and the like, the lock member 538 is composed of: the held part 539 which is held by the headrest frame 509 and which is placed along the lateral direction; the engaging part 540 which is placed in parallel with the held part 539 and which engages with the plurality of the engaging teeth 536 . . . and the rear end 508 of the connection part 506 according to the movement of the headrest frame 509; and an intermediate part 541 which connects the held part 539 with the engaging part 540.

In the embodiment, these held part 539, engaging part 540 and intermediate part 541 are integrally configured in an approximately J-shape. That is, the lock member 538 is formed from one metal rod by bending. Further, although the embodiment includes the intermediate part 541, it is only required to include at least the held part 539 and engaging part 540.

Further, the tips of the held part 539 and engaging part 540 are formed in a tapered shape.

Further, the held part 539 is a long part having a length from the vicinity of the button 532 to the vicinity of the other convex 516A, while the engaging part 540 is a short part having a length from the vicinity of the other convex 516A to the vicinity of the convex 516C.

Although the lock member 538 of the embodiment has an approximately J-shape, it is not limited thereto and may be a lock member 538A as shown in FIG. 29.

In the case of this lock member 538A, the insertion direction of the engaging part 540 to the ratchet 535 is different from that of the lock member 538 of the embodiment.

That is, this lock member 538A has such a configuration that the headrest frame 509 is unlocked by pulling out the engaging part 540 from the ratchet 535. With the lock member 538A which is operated in the direction of pulling out the engaging part 540, reliability of the operation can be improved.

Further, the held part 539 is attached to the button 533 at its button 532-side end, and is thus adapted to be movable along the lateral direction, i.e. its longitudinal direction with being held by the headrest frame 509 as the button 533 moves back and forth along the tube 534a of the button holder 534.

Accordingly, the engaging part 540 is also movable along the lateral direction, i.e. its longitudinal direction. By moving the engaging part 540, which is movable as described above, toward the ratchet 535 so as to engage it with the engaging teeth 536 and the rear end 508 of the connection part 506, the headrest frame 509 can be locked at a plurality of positions in the fore-aft direction with respect to the lock bracket 504.

Further, by moving the engaging part 540 toward the opposite side to the ratchet 535 so as to disengage it with the engaging teeth 536 and the rear end 508 of the connection part 506, the headrest frame 509 can be unlocked.

In more detail, the held part 539 connects the engaging part 540 with the button body 533, as well as functions as an interlock which moves in conjunction with the movement of the button body 533.

The engaging part 540 is placed along the lateral direction along with the held part 539, and moves toward the ratchet 535 so as to engage with the engaging teeth 536 and the rear end 508 of the connection part 506. Thus, the engaging part 540 is not only inserted in the ratchet 535, but also surrounded by the connection part 506. In this way, the lock member 538 which is inserted in the ratchet 535 can be regulated regarding its position in the upward, forward and backward directions by the connection part 506.

As shown in FIGS. 22, 30, 32 and 33, a held part slotted hole 563 is formed on each of the convexes 516A and 516A of the headrest frame 509, which the held part 539 is inserted through. These held part slotted holes 563 are respectively formed at the position where the held part 539 penetrates one convex 516A including the wall 660 in the lateral direction and the position where it penetrates the other convex 516A including the wall 661 in the lateral direction.

As shown in FIG. 39, the longitudinal direction of this held part slotted holes 563 is adapted to approximately agree with the depth direction of the plurality of the concave grooves 537 . . . . This is for permitting the tolerance of the held part 539 and engaging part 540 of the lock member 538, which is mass-produced in a factory or the like.

That is, there may be variation in the positional relation between the held part 539 and engaging part 540 through the intermediate part 541, for example, they are widen in a V-shape or narrowed in an inverted V-shape. Since the longitudinal direction of this held part slotted holes 563 approximately agree with the depth direction of the plurality of the concave grooves 537 . . . , such variation can be permitted.

Further, as shown in FIG. 22, the held part 539 is inserted through the held part slotted holes 563 formed on the convexes 516A and 516A, and is thus double-supported by these convexes 516A and 516A. In particular, it is advantageous that since it is double-supported between one wall 660 and the other wall 661 of these convexes 516A and 516A, a part which is subject to the most load in the held part 539 can be reliably supported.

Further, as shown in FIGS. 23 and 30, one convex 516A includes the protrusion 663a which is integrally formed with this convex 516A and which protrudes toward the held part 539 of the movable mechanism.

As shown in FIG. 22, this protrusion 663a is integrally formed with the convex 516A in the production of the headrest frame 509, and a concave is accordingly formed on the back part 519-side face of the convex 516A at the position corresponding to the protrusion 663a. As shown in FIG. 23, it protrudes from a concave which is formed on the front face of the front wall 511 corresponding to the convex 516A.

Further, a hole is formed on the protrusion 663a, which the held part 539 is inserted through. This hole is adapted in an approximately the same shape as the held part slotted hole 563, and is provided continuously to the held part slotted hole 563. Since the rigidity is high around a part where the protrusion 663a is formed as described above, the held part 539 can be reliably supported.

The engaging part 540 is provided in such a manner that it penetrates the other convex 516A in the lateral direction. The engaging part slotted hole 562 is formed on the wall 661 of the other convex 516A. Further, the engaging part slotted holes 562 are also formed on the convexes 516C and 516D as described above, and these three engaging part slotted holes 562 are aligned along the lateral direction. Further, since the tip end of the convex 516D is placed separated from the tip end of the convex 516C as well as from the wall 661 of the other convex 516A as described above, these three engaging part slotted holes 562 are also placed separately from one another.

The engaging part slotted hole 562 which is formed on the other convex 516A penetrates the wall 661, and the engaging part slotted hole 562 which is formed on the convex 516D penetrates the convex 516D in the lateral direction. As shown in FIG. 30, the engaging part slotted hole 562 which is formed on the other convex 516C is adapted not to penetrate the convex 516C.

The engaging part slotted holes 562 which are respectively formed on these convexes 516C and 516D are opposed to the ratchet 535. Further, since the engaging part slotted hole 562 which is formed on the wall 661 of the convex 516A is placed to be aligned with the engaging part slotted holes 562 which are respectively formed on the convexes 516C and 516D, it is also opposed to the ratchet 535 across the convex 516D.

Further, the engaging part slotted holes 562 do not extend beyond the interface of the front part 510 and back part 519, i.e. the back part 519-side face of the convexes 516A and 516A. That is, the engaging part slotted holes 562 are formed within the area from the front wall 511 of the front part 510 to the back part 519-side face of the convexes 516A and 516A.

In this way, the engaging part 540 of the lock member 538 is also provided within the same area as the engaging part slotted hole 562, and the operating range of the engaging part 540 can accordingly be regulated within the same area. Therefore, the headrest frame 509 can be downsized in the fore-aft direction.

Figure 33:
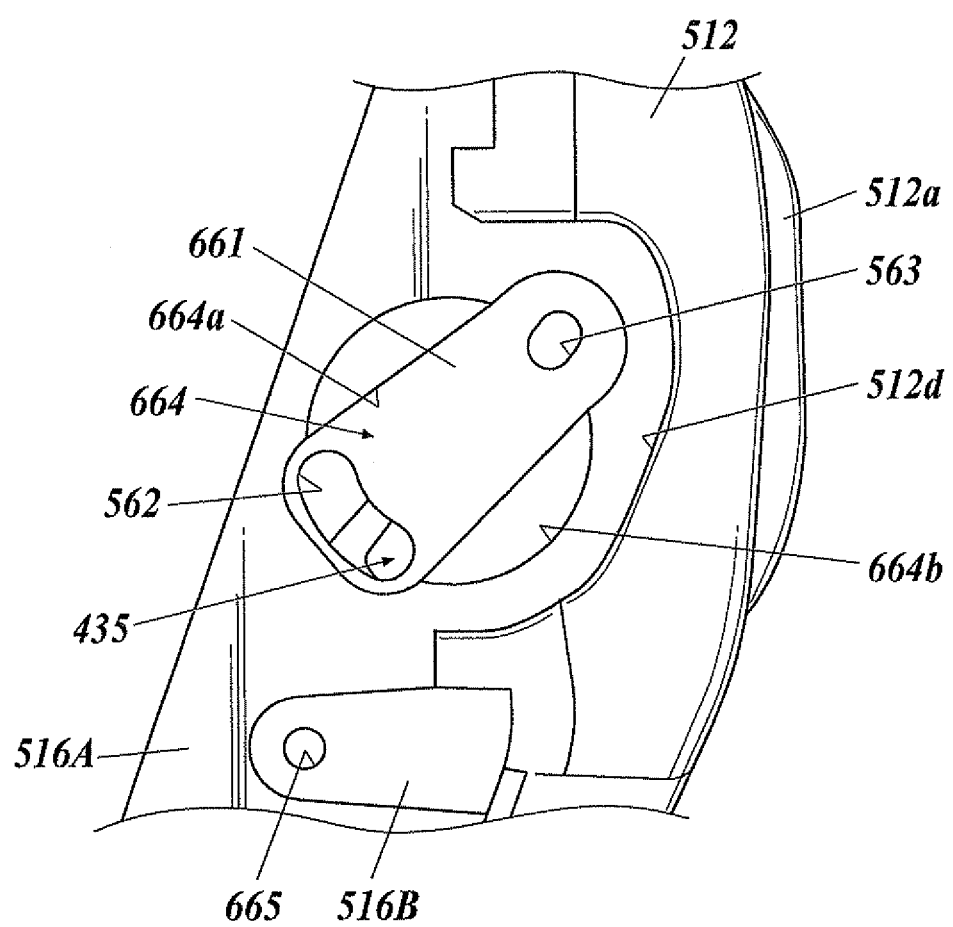
FIG. 33 is an enlarged view showing a connection member insertion part.

As shown in FIGS. 33 and 39, the engaging part slotted holes 562 are curved. The direction of the curvature of the engaging part slotted hole 562 is adapted to agree with the rotational direction of the engaging part 540 which rotates on the held part 539. That is, they are curved along the trajectory of the rotating engaging part 540. Since the engaging part slotted holes 562 are formed in the curved shape as described above, they can permit the movement of the engaging part 540 to cross over the engaging teeth 536 according to the movement of the headrest frame 509.

Further, in the normal state, the engaging part 540 is pressed against the lower side of the engaging part slotted holes 562 in its extending direction by the biasing unit. The engaging part 540 is adapted to be lifted to the upper side of the engaging part slotted holes 562 in its extending direction when the engaging part 540 crosses over the engaging teeth 536. Thus, the engaging part slotted holes 562 extends from the position of the normal state in the opposite direction to the direction in which the biasing member biases the engaging part 540.

Further, as shown in FIG. 39, the engaging part 540 which is inserted through these engaging part slotted holes 562 is in contact with both concave grooves 537 . . . and engaging part slotted holes 562 so as to be fixed on the concave grooves 537 . . . . Further, the concave grooves 537 . . . and engaging part slotted holes 562 are placed to intersect each other in the side view.

That is, the headrest frame 509 itself is constantly pulled toward the lateral shaft 501b by the plurality of biasing members 503 and 503 which are provided between the headrest frame 509 and the lateral shaft 501b. Accordingly, the held part 539 of the lock member 538 is also constantly pulled toward the lateral shaft 501b.

Further, since the engaging part 540 and held part 539 are connected to each other through the intermediate part 541, the engaging part 540 is also pulled toward the lateral shaft 501b. However, this engaging part 540 is pressed against the lower side of the engaging part slotted holes 562 in its extending direction by a biasing unit. That is, the headrest frame 509 including the engaging part slotted holes 562 is biased toward the lateral shaft 501b, and the lower-side edge of the engaging part slotted hole 562 in its extending direction strongly abuts the front side of the engaging part 540. Accordingly, the engaging part 540 strongly abuts the engaging teeth 536 and the ratchet-side face 508a of the rear end 508 of the connection part 506, and is thus strongly engaged with these engaging teeth 536 and the ratchet-side face 508a of the rear end 508 of the connection part 506. Further, the engaging part 540 abuts the bottoms 537a of the concave grooves 537 by the biasing member.

In this way, the engaging part 540 is in contact with both concave grooves 537 and engaging part slotted holes 562 which intersect with each other. In this state, the engaging part 540 is located at the bottoms 537a of the concave grooves 537. Further, in the side view as shown in FIG. 39, a center axis 540a of the engaging part 540 is located at the side of the bottoms 537a of the concave grooves 537 across a virtual line V1 which connects a point P1 where the engaging part 540 is in contact with the concave groove 537 and a point P2 where the engaging part 540 is in contact with the engaging part slotted hole 562.

Further, even if the headrest frame 509 is moved so that the engaging part 540 engages with any one of the plurality of the engaging teeth 536 . . . , this center axis 540a of the engaging part 540 is adapted to be located inside a triangular virtual lines V2 which connects the points P1 and P2 and a point P3 where the engaging part 540 is in contact with the bottom 537a of the concave groove 537 to one another. In FIG. 39, the virtual lines V2 include the virtual line V1.

As shown in FIGS. 22, 24, 32 to 37A and 37B, the biasing unit includes a biasing member 542, a connection member 553, the other-end engaging member 543, a rotation stopper 549, and the like.

The biasing member 542 can apply biasing force toward the engaging teeth 536 and rotational biasing force to the lock member 538. This biasing member 542 is composed of a torsion coil spring which has the function of a compression spring which pushes back the lock member 538 moving along the longitudinal direction of the held part 539 according to operation of the button 532 as well as the function of a torsion spring which rotates the engaging part 540 on the held part 539 so as to press the engaging part 540 against the bottoms 537a of the concave grooves 537. That is, this biasing member 542 has two functions in one.

Further, the biasing member 542 can bring back the held part 539 to the original position after the button 533 is pushed in so as to operate the engaging part 540 through the held part 539 which moves in conjunction with the movement of the button 533. That is, since the button 533 and the held part 539 move in conjunction with each other, the button 533 can be brought back to the original position together with the held part 539. The engaging part 540 can also be brought back to the original position accordingly. This enables to operate the engaging part 540 with the button 533 repeatedly.

Figure 35:
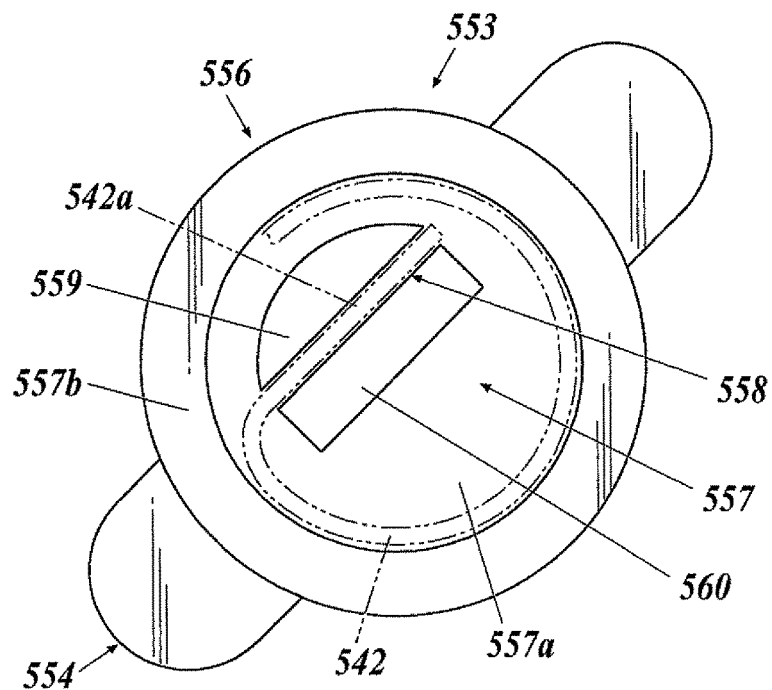
FIG. 35 is an enlarged view showing a second engaging part with which one end of a biasing member is engaged.

One end 542a and the other end 542b of the biasing member 542 protrude linearly inward from a part where a metal wire is coiled in a circular shape. That is, as shown in FIGS. 35 and 36, one end 542a and the other end 542b of the biasing member 542 are formed in an approximately e-shape in the end view.

As shown in FIGS. 32 to 35, the connection member 553 is provided between the lock member 538 and biasing member 542, and includes a first engaging part 554 which engages with the lock member 538 and a second engaging part 556 which engages with one end 542a of the biasing member 556.

The first engaging part 554 includes a holder 555 which holds the held part 539 and the connection member 553-side end of the engaging part 540.

As shown in FIG. 34, the holder 555 represents a tubular part which the held part 539, the connection member 533-side end of the engaging part 540 and the intermediate part 541 are inserted in. Inside the holder 555, although not shown, a hook to prevent the intermediate part 541 from falling off is provided.

As shown in FIG. 35, the second engaging part 556 includes a concave 557 which houses the one end 542a-side of the biasing member 542 and a retainer 558 which retains one end 542a of the biasing member 542.

This concave 557 is composed of a circular bottom wall 557a which is integrally formed with the holder 555 of the first engaging part 554 and a peripheral wall 557b which is provided standing along the rim of the bottom wall 557a.

Further, the retainer 558 is composed of a semicircular protrusion 559 and a rectangular protrusion 560 which are provided on the bottom wall 557a.

There is a gap between the protrusion 559 and the protrusion 560, and this gap is adapted to be approximately equal to the diameter of one end 542a of the biasing member 542. Further, the inner diameter of the peripheral wall 557b is adapted to be slightly larger than the outer diameter of the biasing member 542 at the one end 542a-side. Thus, one end 542a of the biasing member 542 is engaged in the gap between the protrusion 559 and the protrusion 560, while the one end 542a-side of the circular part of the biasing member 542 is held by the concave 557.

As shown in FIGS. 34 and 35, the first engaging part 554 is formed in a rounded-rectangular outer shape, and the second engaging part 556 is formed in a precise-circular outer shape. Further, the diameter of the second engaging part 556 is adapted to be larger than the transverse length of the first engaging part 554. Therefore, the second engaging part 556 has such a shape that it protrudes from both sides of the first engaging part 554 in the transverse direction.

Further, the diameter of the second engaging part 556 is adapted to be shorter than the length of the intermediate part 541 of the lock member 538. Furthermore, this second engaging part 556 is placed slightly closer to the engaging part 540 than to the held part 539. Therefore, it is advantageous that the rotational biasing force of the biasing member 542 is easily transferred in comparison with a case where the second engaging part 556 is placed closer to the held part 539.

As shown in FIGS. 24, 33 and 37A and 37B, a connection member insertion part 664 is formed in the other convex 516A.

This connection member insertion part 664 includes a first insertion part 664a which the first engaging part 554 is inserted in, and a second insertion part 664b which the second engaging part 556 is inserted in.

The depth of the first insertion part 664a into the convex 516A is adapted to be approximately equal to a length obtained by subtracting the thickness of the wall 661 from the lateral length of the other convex 516A.

Further, the depth of the second insertion part 664b into the convex 516A is adapted to be approximately equal to the height of the peripheral wall 557b of the second engaging part 556 so as to correspond to the shape of the connection member 553.

Further, the bottom wall of the first insertion part 664a is the wall 661 of the other convex 516A. On this bottom wall 661, the engaging part slotted hole 562 and held part slotted hole 563 are formed as described above.

Further, as described above, the engaging part 540 of the lock member 538 is rotated on the held part 539 by the biasing member 542. The first insertion part 664a and second insertion part 664b is formed in such a manner that it gets wider toward the engaging part slotted hole 562 so as to secure a space for the engaging part 540 to rotate.

Further, since this connection member insertion part 664 is formed in the other convex 516A, it protrudes from the concave which is formed on the front face of the front wall 511 corresponding to this convex 516A as shown in FIG. 23.

As shown in FIGS. 22, 32, 37A and 37B, the other-end engaging part 543 is placed to be opposed to the second engaging part 556, and engages with the other end 542b of the biasing member 542. The other-end engaging part 543 includes a fixing plate 544, a concave 545 and a retainer 546.

As shown in FIGS. 32, 36, 37A and 37B, the fixing plate 544 has linear upper and lower ends and curved front and rear ends. The concave 545 is provided on the headrest frame 509-side of the fixing plate 544. This concave 545 is provided in the rear center of the fixing plate 544, and is placed to be opposed to the second engaging part 556 of the connection member 553 which is inserted in the connection member insertion part 664.

Ribs 544a and 544b are formed on the headrest frame 509-side face of this fixing plate 544. These ribs 544a and 544b are placed in a reticular pattern in the lateral and vertical directions, and can thus improve the rigidity of the fixing plate 544.

The concave 545 is composed of a circular peripheral wall 545a which are provided standing on the bottom wall, i.e. the fixing plate 544, and an opening 545b which is formed on the fixing plate 544 inside the peripheral wall 545a.

Further, the retainer 546 is composed of a semicircular protrusion 547 and a rectangular protrusion 548 which are provided on the fixing plate 544 inside the peripheral wall 545a.

There is a gap between the protrusion 547 and the protrusion 548, and this gap is adapted to be approximately equal to the diameter of the other end 542b of the biasing member 542. Further, the semicircular protrusion 547 is provided with a hook 547a which protrudes from the protrusion 548-side face.

Further, the inner diameter of the peripheral wall 545a is adapted to be slightly larger than the outer diameter of the biasing member 542 at the other end 542b. Therefore, the other end 542b of the biasing member 542 is engaged in the gap between the protrusion 547 and the protrusion 548, and the other end 542b-side of the circular part of the biasing member 542 is held by the concave 545.

The rectangular protrusion 548 is placed on the extended lines of the vertical ribs 544a of the fixing plate 544, and the rigidity of the surrounding part can thus be improved.

Further, the semicircular protrusion 547 is adapted not to be on the extended lines of the vertical ribs 544a. That is, since the semicircular protrusion 547 is formed with the hook 547a, the semicircular protrusion 547 has to be somewhat flexible in order that the other end 542b of the biasing member 542 is engaged in between the protrusions 547 and 548. Therefore, this protrusion 547 is configured not to be on the extend lines of the vertical ribs 544a.

Further, the opening 545b is an opening to check the engagement of the other end 542b of the biasing member 542 from outside when the other end 542b is engaged in between the protrusions 547 and 548. Further, if the opening 545b were provided on the extended lines of the vertical ribs 544a, it would become difficult that the vertical ribs 544a exert the effect of improving the rigidity. Therefore, this opening 545b is also configured not to be on the extended lines of the vertical ribs 544a.

Regarding the biasing member 542, one end 542a can be received by the concave 557 of the second engaging part 556, and the other-end 542b can be received by the concave 545 of the the-other end engaging member 543. That is, both ends of the biasing member 42 can be received by the planes of the concaves 557 and 545, the biasing force of the biasing member 542 can be effectively transferred.

As shown in FIG. 37B, the rotation stopper 549 abuts the other-end engaging part 543, and restricts the other-end engaging part 543 from rotating in the direction opposite to the direction of the rotational biasing force which is applied to the lock member 538 by the biasing member 542. The rotation stopper 549 is provided corresponding to the position of the cutoff 512d which is formed on the peripheral wall 512 of the front part 510.

As shown in FIGS. 22, 32, 37A and 37B, this rotation stopper 549 includes: an upper end retainer 550 which abuts the linear upper end of the other-end engaging part 543 from above; a lower end retainer 551 which abuts the linear lower end of the other-end engaging part 543 from the below; a front end retainer 552 which abuts the curved front end of the other-end engaging part 543 from the front; and a rear end retainer 552a which abuts the curved rear end of the other-end engaging part 543 from the back. These retainers 550, 551, 552 and 552a have a shape corresponding to the peripheral shape of the other-end engaging part 543.

The upper end retainer 550 and lower end retainer 551 are rectangular plates. In the embodiment, these upper end retainer 550 and lower end retainer 551 are integrally formed with the front wall 511 of the front part 510, peripheral wall 512 and the other convex 516A. Further, the lower end retainer 551 is also integrally formed with a convex 516B which is located just under the lower end retainer 551.

Further, the front end retainer 552 is provided between the upper end retainer 550 and the lower end retainer 551, and is integrally formed with these upper end retainer 550 and lower end retainer 551, the front wall 511 and the peripheral wall 512.

Further, as shown in FIG. 25, the lower end retainer 552a is integrally formed with the peripheral wall 521 of the back part 519.

The rotation stopper 549 of the embodiment is integrally formed with the front part 510 and the back part 519, however it is not limited thereto and may be placed to be opposed to the connection member insertion part 664 and formed as a separate member from the front part 510 or back part 519.

As shown in FIG. 28, the guide concave 564 of the guide mechanism is formed on the side face of the lock bracket 504 along the moving direction of the headrest frame 509.

In the embodiment, this guide concave 564 is formed by penetrating the lock bracket 504 in the lateral or thickness direction, and is thus provided on the same plane as the ratchet 535, which is perpendicular to the horizontal plane.

In the embodiment, the guide concave 564 which penetrates the lock bracket 504 is employed, however a guide concave which does not penetrate the lock bracket 504 may be also employed.

In this case, the guide concave which does not penetrate the lock bracket 504 is partially provided on the same plane as the ratchet 535, which is perpendicular to the horizontal plane.

Whether the guide concave 564 is one which penetrates the lock bracket 504 or one which does not penetrate the lock bracket 504, this guide concave 564 is provided closer to the base end of the lock bracket 504 than the ratchet 535.

The guide member 565 of the guide mechanism is a metal rod. As shown in FIGS. 22, 28, 31, 38A to 38D and the like, the guide member 565 is held by the headrest frame 509 and engaged with the guide concave 564, and moves along the guide concave 564 according to the movement of the headrest frame 509.

In the embodiment, since the guide concave 564 penetrates the lock bracket 504, the guide member 565 is inserted through this guide concave 564.

Since the guide member 565 is made of metal, it is resistant to heat or the like.

Further, the guide member 565 is formed long in the insertion direction through the guide concave 564, and the headrest frame 509 holds both sides of the guide member 565 across the lock bracket 504 to which the guide concave 564 is formed.

That is, holes 566 . . . are formed on each of the convexes 516A and 516A of the headrest frame 509, which the guide member 565 is inserted through. These holes 566 . . . are formed respectively at the position where the guide member 565 laterally penetrates one convex 516A including the wall 660 and the position where it laterally penetrates the other convex 516A including the wall 661.

Further, as shown in FIGS. 22 and 31, the guide member 565 is inserted through the holes 566 . . . which are formed on the convexes 516A and 516A, and is thus double-supported by these convexes 516A and 516A. In particular, it is advantageous that since it is double-supported between one wall 660 and the other wall 661 of the convexes 516A and 516A, a part which is subject to load the most in the guide member 565 can be reliably supported.

Further, as shown in FIGS. 23 and 31, one convex 516A and the other convex 516A include the protrusions 663b and 663c which are integrally formed with these convexes 516A and 516A and which protrude toward the guide member 565 of the movable mechanism.

As shown in FIG. 22, these protrusions 663b and 663c are integrally formed with the convexes 516A and 516A in the production of the headrest frame 509, and concaves are accordingly formed on the back part 519-side face of the convexes 516A and 516A at the positions corresponding to the protrusions 663b and 663c. As shown in FIG. 23, they protrude from the concaves which are formed on the front face of the front wall 511 corresponding to the convexes 516A and 516A.

Further, holes are formed on the protrusions 663b and 663c, which the guide member 565 are inserted through. These holes are adapted to approximately the same shape as the holes 566 . . . , and are continuous to the holes 566 . . . . Since a part where the protrusions 663b and 663c are formed has high rigidity as described above, the guide member 565 can be reliably supported.

Further, as shown in FIGS. 22 and 31, both ends of the guide member 565 are respectively held by other convexes 516B and 516B which are separately placed at laterally outer positions than the convexes 516A and 516A which this guide member 565 penetrates. That is, the holes 665 and 665 for the guide member 565 are formed on these other convexes 516B and 516B as described above, and both ends of the guide member 565 are inserted through these holes 665 and 665.

The guide member 565 is tapered at both ends so that it can be easily inserted into the holes 566 and 665.

Since the guide member 565 is only inserted through the holes 566 and 665, the headrest frame 509 includes a movement restriction unit which restricts movement of the guide member 565 in its axis direction. This movement restriction unit is the peripheral wall 521 itself of the back part 519. When the front part 510 and back part 519 are assembled together, the peripheral wall 521 of the back part 519 is provided at the outer sides of the convexes 516B and 516B in proximity to them.

That is, the guide member 565 can be restricted from moving in its axis direction by the peripheral wall 521 of the back part 519 which is located at the outer sides of the convexes 516B and 516B Further, the biasing members 503 and 503, which bias the guide member 565 toward the lateral shaft 501b, are provided between the lateral shaft 501b of the headrest pillar 501 and the guide member 565 respectively at laterally outer positions across the convexes 516A and 516A which this guide member 565 penetrate. That is, as described above, the lateral shaft 501b-side ends of the biasing members 503 and 503 are hooked on the mounts 502 and 502. Thus, the headrest 509-side ends of these biasing members 503 and 503 are hooked on the guide member 565.

The guide member 565 is held at both ends by the convexes, beads and the like which are placed separately from these convexes 516A and 516A as described above. It is advantageous that the headrest frame 509-side ends of the biasing members 503 and 503 can thus be hooked thereon. That is, since the parts where the biasing members 503 and 503 are hooked of the guide member 565 are double-supported by the convexes 516A and convexes 516B, not only the biasing members 503 and 503 can be hooked easily, but also the biasing member 503 and 503 can be held reliably.

The guide concave 564 is formed long along the moving direction of the headrest frame 509. The transverse length of the guide concave 564 is adapted to be slightly larger than the diameter of the guide member 565. In this way, when the guide member 565 moves along the guide concave 564, the guide member 565 can be prevented from moving significantly in other directions than the extending direction of this guide member 564.

In this way, this guide member 565 can stably guide the headrest frame 509.

Next, the assembling method of the headrest will be described. The components or parts constituting the headrest frame 509 and movable mechanism shall be previously processed and formed.

First, fix the mounts 502 and 502 and lock bracket 504 onto the lateral shaft 501b of the headrest pillar 501. Then, insert the lock bracket 504 into the lower opening 518 of the front part 510 so as to attach the front part 510 to the lateral shaft 501b. At this moment, let the grasps 517 and 517 grasp the lateral shaft 501b.

Subsequently, insert the guide member 565 from the hole 665 of one convex 516B through the holes 566 of the convexes 516A and 516A and the guide concave 564 formed on the lock bracket 504 to the hole 665 of the other convex 516B. Then, attach the biasing members 503 and 503 between the guide member 565 and the mounts 502 and 502.

Subsequently, insert the lock member 538 which is attached with the connection member 553 from the cutoff 512d toward the connection member insertion part 664, where the engaging part 540 and the held part 539 are respectively inserted through the engaging part slotted hole 562 and held part slotted hole 563 which are exposed on the bottom wall of the first insertion part 664.

Here, let the engaging part 540 also inserted through the ratchet 535. Further, let the held part 539 also inserted through the held part slotted holes 563 . . . which are formed on the convexes 516A and 516A, and push in the held part 539 certainly until it reaches the button mount 512a. At this moment, as shown in FIG. 24, the connection member 553 is housed in the connection member insertion part 664.

Further, house the button holder 534 and button body 533 in the button mount 512a in advance so that the tip of the held part 539 is attached to the button 533 when the tip is pushed in.

Subsequently, engage one end 542a of the biasing member 542 with the second engaging part 556 of the connection member 553, and engage the other end 542b of the biasing member 542 with the other-end engaging member 543. Then, as shown in FIG. 37A, while compressing it, turn the biasing member 542 which is engaged with the other-end engaging member 543 in such a direction that the lock member 538 becomes biased toward the bottoms 537a of the concave grooves 537, so as to attach this other-end engaging member 543 to the rotation stopper 549.

Subsequently, attach the decoration rims 528 and 528 to the cutoffs 514a and 514a which are formed on the bottom wall 514 of the front part 510. Then, fit the back part 519 to the front part 510 so as to assemble them. By fitting the back part 519 to the front part 510, the button 532 becomes attached to the button mounts 512a and 521a of the front part 510 and back part 519, and the decoration rims 528 and 528 become attached to the bottom walls 514 and 524 of the front part 510 and back part 519.

Further, the guide member 565 becomes restricted from moving in its axis direction by the peripheral wall 521 of the back part 519, and the other-end engaging member 543 becomes abutted by the abutting part 522 and thus supported by this abutting part 522. Further, the protrusion support 520a becomes inserted between the center part of the lateral shaft 501b and the bottom wall 514 of the front part 510 which is located below this lateral shaft 501b.

As described above, the headrest can be assembled.

Next, movement of the headrest as configured above will be described.

As shown in FIGS. 38A to 38D, the movement of the headrest is based on the rotation of the headrest frame 509 in the fore-aft direction which is attached to the lateral shaft 501b of the headrest pillar 501 in a rotatable manner in the fore-aft direction.

Further, the headrest frame 509 is biased toward the lateral shaft 501b by the biasing member 503 and 503. Thus, when the headrest frame 509 is at the normal position as shown in FIG. 38A, the headrest frame 509 is pulled backward, and the engaging part 540 of the lock member 538 is inserted in the rearmost concave groove 537 of the concave grooves 537 of the ratchet 535 and is thus engaged with the rear end 508 of the connection part 506.

First, when letting the headrest frame 509 move forward from the normal position, apply force to the headrest frame 509 in such a direction that the headrest frame 509 inclines forward.

By doing so, as shown in FIG. 38B, the engaging part 540 detaches from the bottom 537a of the rearmost concave groove 537 and slides upward along the rear end face 536a of the rearmost engaging tooth 536 with being inserted in the ratchet 535.

At this moment, the engaging part 540 moves toward the upper side of the engaging slotted holes 562 in its extending direction against the rotational biasing force applied by the biasing member 542. That is, stronger biasing force is applied to the engaging part 540.

The engaging part 540 moves toward the upper side of the engaging part slotted holes 562 in the extending direction as it slides upward along the rear end face 536a of the rearmost engaging tooth 536, and then reaches the top end of the rearmost engaging tooth 536.

When the engaging part 540 crosses over the top end of the rearmost engaging tooth 536, this engaging part 540 automatically moves toward the bottom 537a of the second rearmost concave groove 537 by the biasing force of the biasing member 542, and thus fits in this bottom 537a of the second rearmost concave groove 537 and engages with the rearmost engaging tooth 536 as shown in FIG. 38D.

Further, the engaging part 540, which was dislocated at the upper side of the engaging part slotted holes 562 in the extending direction, moves toward the lower side of the engaging part slotted holes 562 in the extending direction when it crosses over the rearmost engaging tooth 536.

That is, at the same time the engaging part 540 fits in the bottom 537a of the second rearmost concave groove 537 and engages with the rearmost engaging tooth 536, the engaging part 540 moves toward the lower side of the engaging part slotted holes 562 in the extending direction.

As described above, the headrest frame 509 can be moved forward stepwise. The headrest frame 509 can be locked at a plurality of positions along the fore-aft direction with respect to the lock bracket 504.

As shown in FIG. 38D, when the headrest frame 509 is at the foremost position of its fore-aft movement, the engaging part 540 is inserted in the foremost concave groove 537 and is engaged with the foremost engaging tooth 536.

When bringing back the headrest frame 509 which is dislocated at the foremost position as described above to the normal position, push the button 532 so as to slide the held part 539 in its axis direction. That is, let the lock member 538 itself move in the direction of compressing the biasing member 542.

In conjunction with the slide of the held part 539, the engaging part 540 separates from the ratchet 535, and its tip moves to the engaging part slotted hole 562 which is formed on the convex 516D.

At this moment, the engaging part 540 is engaged with neither any engaging tooth 536 of the ratchet 535 nor the rear end 508 of the connection part 506. Thus, the headrest frame 509, which is biased backward by the biasing members 503 and 503, moves to the rearmost position.

After the headrest frame 509 comes back to the rearmost position, the engaging part 540 is inserted into the ratchet 535 again by the biasing force of the biasing member 542, and as shown in FIG. 38, is inserted into the rearmost concave groove 537 and engages with the rear end 508 of the connection part 506. That is, the headrest frame 509 comes back to the normal position.

Further, along with the movement of the headrest frame 509, the guide member 565 also moves along the extending direction of the guide concave 564.

That is, as shown in FIG. 38A, when the headrest frame 509 is located at the normal position, the guide member 565 is located at the rear end of the guide concave 564 in its extending direction. Further, as shown in FIG. 38D, when the headrest frame 509 is located at the foremost position, the guide member 565 is located around the front end of the guide concave 564 in its extending direction.

If trying to move the headrest frame 509 forward over the foremost position, the engaging part 540 separates from the bottom 537a of the foremost concave groove 537 and slides upward along the front end 507 of the connection part 506. Further, the engaging part 540 moves to the upper side of the engaging part slotted holes 562 in its extending direction.

In this state, if trying to move the headrest frame 509 further forward, the guide member 565 abuts the front end of the guide concave 564 in its extending direction before strong force is applied between the engaging part 540 and the upper end of the engaging part slotted holes 562 in its extending direction. In this way, since the headrest frame 509 can be restricted from moving forward, it can be prevented that strong force is applied between the engaging part 540 and the upper ends of the engaging part slotted holes 562 in its extended direction.

As described above, the headrest can be moved.

According to the embodiment, with respect to the plurality of the engaging teeth 536 . . . of the lock bracket 504 which is supported by the headrest pillar 501, the lock member 538 is placed along the lateral direction and is engaged with the plurality of the engaging teeth 536 . . . from a lateral position. That is, the lock member 538, which is not placed along the fore-aft direction or vertical direction but along the lateral direction, is moved in the fore-aft direction together with the headrest frame 509. Thus, the space for the lock member 538 to move in the fore-aft direction or vertical direction can be reduced as much as possible. In this way, the headrest can be prevented from increasing in size in the fore-aft direction or vertical direction, which contributes to downsizing the headrest.

Further, since the connection part 506 is provided at the tip end 505 of the lock bracket 504, the rigidity around the ratchet 535 is improved. Thus, the surroundings of the ratchet 535 can be prevented from deformation. In this way, since it is not required to thicken the lock bracket 504 or to provide other reinforcing structures in order to improve the rigidity of the lock bracket 504 or the surroundings of the ratchet 535, the headrest can be avoided from increasing in size due to the increase of the lock bracket 504 in size.

Therefore, the simple and lightweight headrest fore-aft position adjuster can thus be composed without using relatively large parts which correspond to the size of the headrest as well as many processed parts with holes, grooves and the like.

Further, the rear face 536a of the rearmost engaging tooth 536 and the ratchet-side face 508a of the rear end 508 of the connection part 506 are opposed to each other, and the ratchet-side face 508a of the connection part 506 is provided along the rear end face 536a of the engaging tooth 536. Thus, since this enables the lock member 538 to smoothly pass through between the engaging tooth 536 and the rear end 508 of the connection part 506, abnormal noise or the like can be suppressed, which may occur when the lock member 538 passes through Further, since the plurality of engaging teeth 536 . . . are inclined forward, and the rear end of the connection part 506 is also inclined forward corresponding to the plurality of the engaging teeth 536 . . . , the rear end of the tip end 505 of the lock bracket 504 has a shape as if its edge were cut off. That is, the rear end 508 of the connection part 506, which is adapted to come closest to the back part 519 of the headrest frame 509, can be prevented from protruding significantly toward the back face of the headrest frame 509 when the headrest frame 509 is inclined forward the most. Thus, the headrest can be prevented from increasing in size in the fore-aft direction. This contributes to further downsizing the headrest.

Further, since the concave 526a is formed at the rear protrusion 526 which is provided to the back part 519 of the headrest frame 509, the rear end 508 of the connection part 506, which is opposed to this rear protrusion 526, can be placed near the headrest frame 509. In this way, regarding the other parts of the back part 519 of the headrest frame 509 than the rear protrusion 526, it is not required to protrude them more than the rear protrusion 526. Therefore, the headrest can be prevented from increasing in size. This contributes to further downsizing the headrest.

Further, forming the slotted hole 504a on the lock bracket 504 can contribute to corresponding weight reduction of the lock bracket 504, which leads weight reduction of the headrest itself.

Further, since this slotted hole 504a is adapted to be shorter than the fore-aft length of the ratchet 535, decrease in rigidity of the ratchet 535 can be reduced in comparison with the case where it is longer than the fore-aft length of the ratchet 535, for example.

Further, since the slotted hole 504a is formed closer to the headrest pillar 502 than the ratchet 535, it can be expected that the slotted hole 504a cushions the load on the ratchet 535.

Further, since the lock bracket 504 is fixed to the lateral shaft 501b at a position between the plurality of the biasing members 503 and 503 which are placed along the longitudinal direction of the lateral shaft 501b separately from each other, they can apply the biasing force to the headrest frame 509 in such a good balance as to avoid torsion, inclination or the like. In this way, since the headrest frame 509 can be attached in a good condition, the headrest frame 509 can be supported stably.

By the way, in prior art 1, the headrest frame is biased in the direction of inclining backward by means of spring pressure of a tension spring. However, a lower part of the ratchet which a rivet head cannot fix completely may be subject to external force due to this spring pressure, and the ratchet may thus get inclined. If the ratchet gets inclined, it may not be possible to make good engagement between engaging teeth of the ratchet and a hook of an engaging part. For this reason, it has been desired to develop a technique which enables to make good engagement between the engaging teeth of the ratchet and the lock member.

In this respect, as described above, the lock mechanism of the headrest fore-aft direction adjuster of the embodiment is configured to include: the ratchet 535 which is formed in the lock bracket 504 and which includes the plurality of engaging teeth 536 . . . and the plurality of concave grooves 537 . . . which are alternately placed along the moving direction of the headrest frame 509; a lock member 538 which is placed along the lateral direction with being held by the headrest frame 509 and which engages with the plurality of engaging teeth 536 . . . according to the movement of the headrest frame 509; and a biasing unit which biases the lock member 538 toward the ratchet 535 as well as toward the bottoms 537a of the concave grooves 537.

According to the headrest fore-aft position adjuster as configured above, since the lock member 538 engages with the plurality of engaging teeth 536 . . . according to the fore-aft movement of the headrest frame 509, the headrest frame 509 is adjustable in the fore-aft direction in a stepwise manner along a plurality of positions.

Further, since the biasing unit including the biasing member 542 biases the lock member 538 toward the ratchet 535, the engaging part 540 of this lock member 538 can be pushed into the ratchet 535. Further, since the biasing unit biases the engaging part 540 toward the bottoms 537a of the concave grooves 537, the engaging part 540 which is pushed in the ratchet 535 can be pressed against the bottoms 537a of the concave grooves 537. That is, the engaging part 540, which engages with the plurality of engaging teeth 536 . . . according to the movement of the headrest frame 509, can be reliably pressed against the bottoms 537a of the plurality of concave grooves 537 by the biasing unit. Thus, good engagement between the engaging teeth 536 . . . of the ratchet 535 and the engaging part 540 of the lock member 538 is achieved.

Further, for the purpose of making the good engagement between the engaging teeth of the ratchet and the lock member similarly, the lock mechanism of the headrest fore-aft position adjuster of the embodiment is formed in the headrest frame 509 at the position opposed to the ratchet 535, and includes the engaging part slotted holes 562 which the engaging part 540 is inserted through and which permits the movement of the engaging part 540 to cross over the engaging teeth 536 according to the movement of the headrest frame 509, wherein the engaging part 540 is in contact with both concave grooves 537 and engaging part slotted holes 562 so as to be fixed to the concave grooves 537.

According to the headrest fore-aft position adjuster as configured above, the engaging part slotted holes 562 permits the movement of the engaging part 540 of the lock member 538 to cross over the engaging teeth 536. Therefore, the engaging part 540 can be reliably engaged with the plurality of the engaging teeth 536 according to the movement of the headrest frame 509. In this way, the headrest frame 509 is adjustable in the fore-aft direction in a stepwise manner along a plurality of positions.

Further, since the biasing unit including the biasing member 542 biases the engaging part 540 toward the ratchet 535, this engaging part 540 can be pushed into the ratchet 535 which is formed in the lock bracket 504. Further, since the biasing unit biases the engaging part 540 toward the bottoms 537a of the concave grooves 537, the engaging part 540 which is pushed in the ratchet 535 can be pressed against the bottoms 537a of the concave grooves 537. Furthermore, since the engaging part 540 is in contact with both concave grooves 537 and engaging part slotted holes 562 so as to be fixed to the concave grooves 537, it is not simply pressed against the bottoms 537a of the concave grooves 537 but is pressed at a plurality of positions. In this way, since the engaging part 540 is fixed to the concave grooves 537 more firmly, the good engagement between the engaging teeth of the ratchet and the lock member is achieved. Therefore, the headrest frame 509 can be reliably locked when the headrest frame 509 is adjusted in fore-aft direction in a stepwise manner along a plurality of positions.

Further, in prior art 1, the ratchet includes: guide holes which penetrate ratchet teeth in the lateral thickness direction; and the ratchet teeth which protrude from the engaging member-side face of the ratchet toward the engaging member. A rivet is pushed in the guide hole, and is fixed to a support bracket. The ratchet teeth are configured to engage with the engaging member.

According to the ratchet mechanism as configured above, since the guide holes and ratchet teeth are aligned laterally and are not provided on the same plane, they may cause increase in size in the width direction. Furthermore, it may lead increase in size of the headrest itself. For this reason, it has been desired to develop a technique which enables to avoid the headrest from increasing in size.

In this respect, the headrest fore-aft position adjuster of the embodiment includes a guide mechanism which guides the fore-aft movement of the headrest frame 509 as described above. This guide mechanism includes: the guide concave 564 which is formed on the side face of the lock bracket 504 along the moving direction of the headrest frame 509; and the guide member 565 which is held by the headrest frame 509 and engaged with the concave 564 and which moves along the guide concave 564 according to the movement of the headrest frame 509, wherein the ratchet 535 and at least a part of the guide concave 564 are configured to be provided on a same plane which is perpendicular to the horizontal plane.

According to the fore-aft position adjuster as configured above, the guide member 565 is held by the headrest frame 509. Therefore, when this guide member 565 is engaged with the guide concave 564 which is formed on the side face of the lock bracket 504, the guide member 565 moves along the guide concave 564 according to the movement of the headrest frame 509. Since the guide member 565 moves along the guide concave 564 as above, the movement of the headrest frame 509 is also guided by the guide member 565, and the headrest frame 509 can thus be moved smoothly. Further, since the ratchet 535 and guide concave 564 are provided on a same plane which is perpendicular to the horizontal plane, the ratchet structure can be prevented from increasing in size in the width direction, which leads preventing the headrest itself from increasing in size. Furthermore, since it is prevented that the lock bracket 504 and the lock member 538 which is engaged with the ratchet 535 are aligned in the width direction of the headrest as above, the lock member 538 can be prevented from contacting with the guide member 565 reliably, which can ensure smooth movement of the headrest frame 509. Further, compared to the case where the guide concave 564 dose not penetrate the lock bracket 504, for example, the area on the same plane is larger. Thus, load from the ratchet 535 can be supported more reliably. Furthermore, the guide member 565 can be inserted through the guide concave 564 more reliably. In this way, since the guide member 565 can guide the headrest frame 509 more smoothly, the movement of the headrest frame 509 can be improved in reliability. Further, since the ratchet 535 and guide concave 564 are provided on the same plane which is perpendicular to the horizontal plane, the guide concave 564 can cushion load on the ratchet 535, and the ratchet 535 can thus be prevented from deformation.

Meanwhile, regarding techniques which employ a lock mechanism including a ratchet structure and in which a headrest frame is rotated in the fore-aft direction so as to adjust its position in such a way that ratchet teeth and a hook of a pole of the ratchet are engaged with each other or the pole is operated with an unlocking wire so that the hook is uncoupled from the ratchet teeth, it is known that such techniques are disclosed, for example, in JP 2001-112573 (hereinafter, prior art 3).

In prior art 3, a movable mechanism like the above ratchet structure is housed in the headrest frame. In such a case where the movable mechanism is housed in the headrest frame, it has been desired to improve the support rigidity of the movable mechanism in order to ensure stable movement of this movable mechanism.

In this respect, the headrest includes the hollow headrest frame 509 which receives an occupant's head and the movable mechanism (fore-aft position adjuster) which is housed in the headrest frame 509 and which allows the headrest frame 509 to move with respect to the headrest pillar 501, wherein the headrest frame 509 is aligned in parallel with the movable mechanism and includes convexes 516A and 516A including one and the other walls 660 and 661 which are opposed to each other, and the movable mechanism is configured to be double-supported between one and the other walls 660 and 661 of the convexes 516A and 516A.

According to the headrest as configured above, the movable mechanism, which is housed in the headrest frame 509 and includes the lock mechanism and guide mechanism, is double-supported between one and the other walls 660 and 661 of the convexes 516A and 516A. Thus, the support rigidity of the movable mechanism such as the lock member 538 and guide member 565 can be further improved in comparison with a case of single-support. This enables to ensure the reliability of the movement of the movable mechanism which is housed in the headrest frame 509, which leads to ensure the reliability of the movement of the headrest frame 509 itself.

Further, since the hollow headrest frame 509 includes the convexes 516A and 516A, the rigidity of the headrest frame 509 itself can be improved with these convexes 516A and 516A.

[Variation 1]

Next, a variation of the button surroundings of the embodiment will be described.

In the description of this variation, with respect to configurations similar to those of the above fifth embodiment, the same reference numerals are used and their descriptions are omitted.

Figure 40:
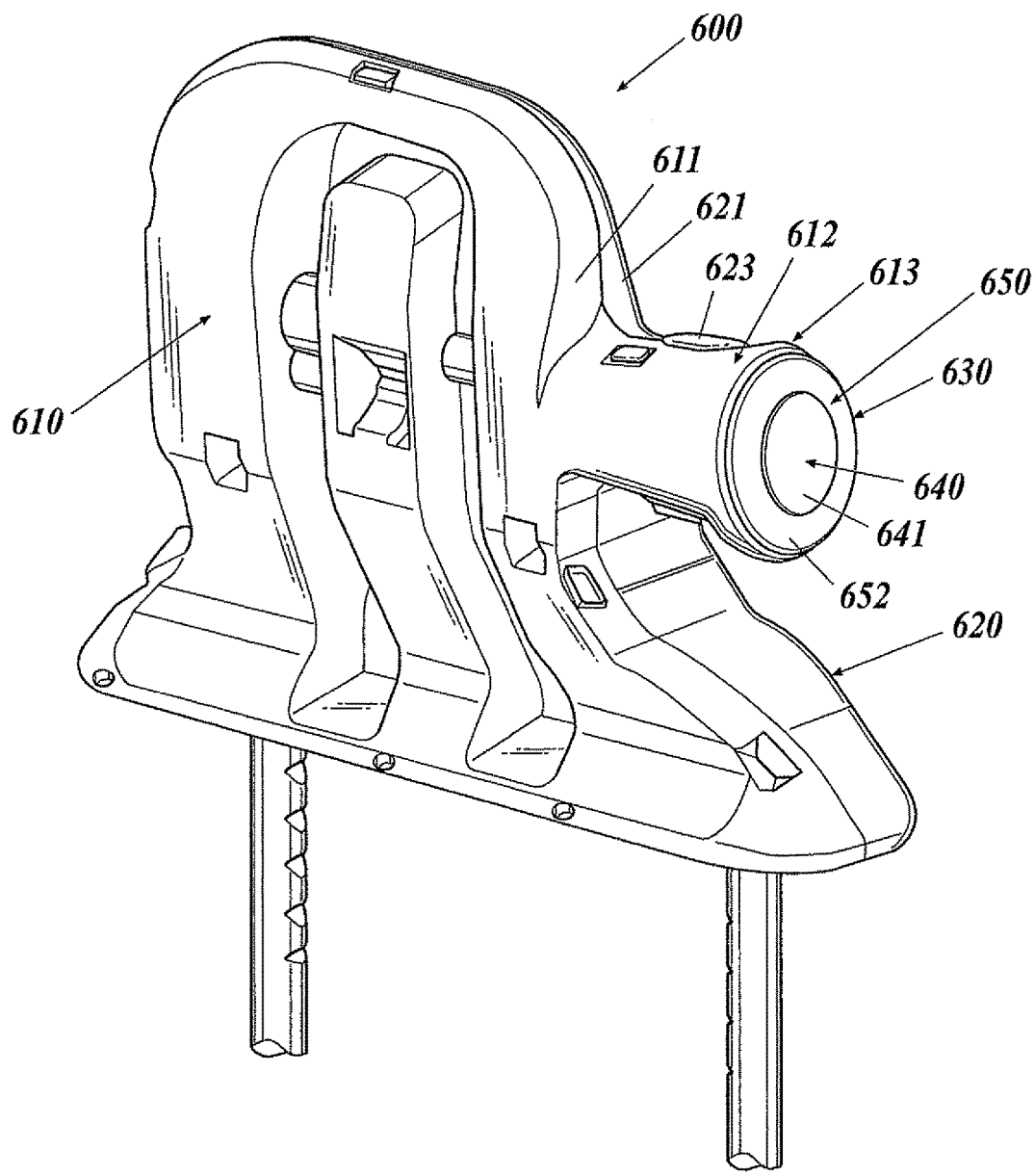
FIG. 40 is a perspective view showing another example of a headrest frame.
Figure 42:
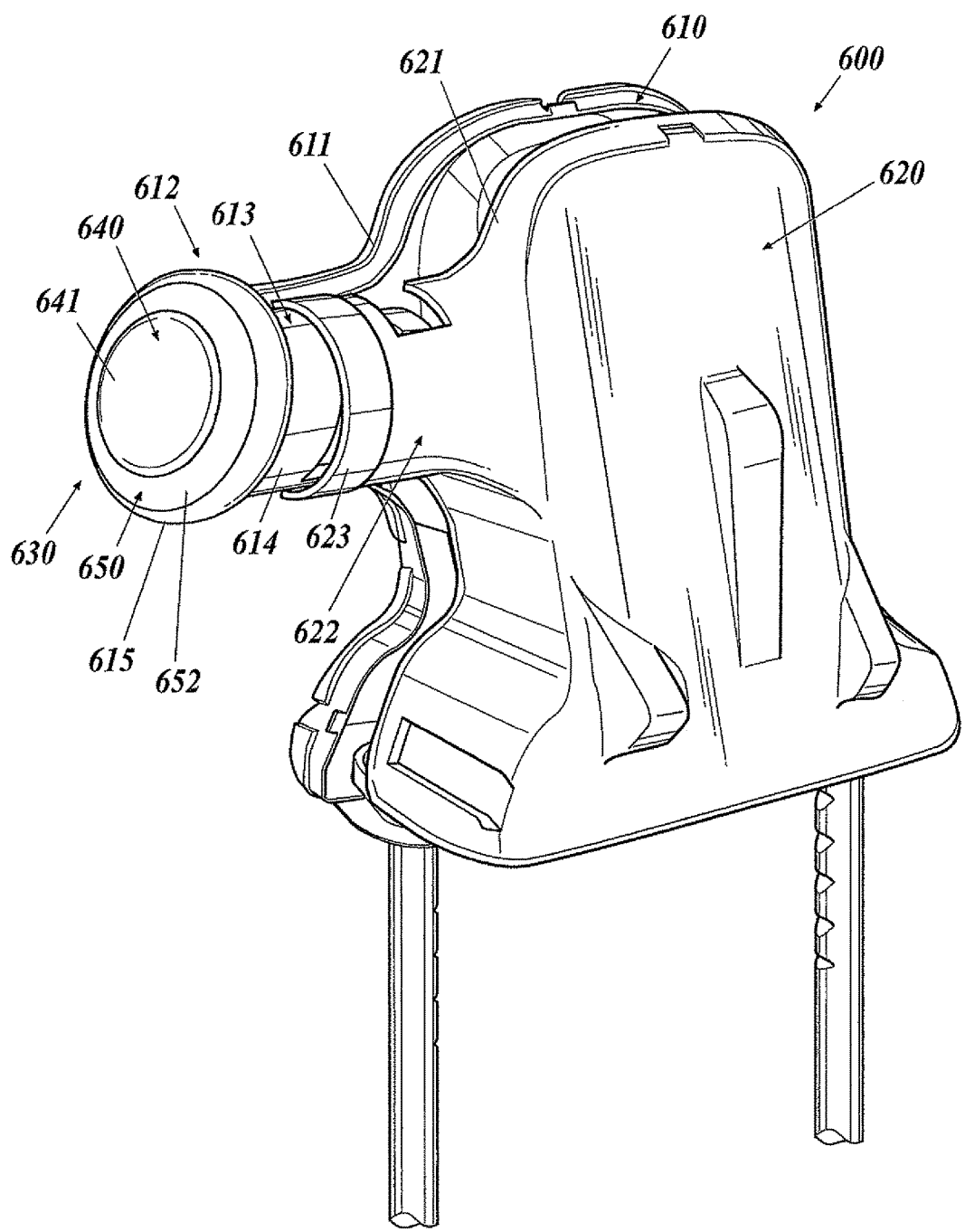
FIG. 42 is a perspective view showing a configuration in the vicinity of a button mount in a front part of a headrest frame.

As shown in FIGS. 40 and 42, a headrest frame 600 according to this variation includes a front part 610 and a back part 620.

The front part 610 and back part 620 have a fitting-in structure in which their rims engage with each other. These front part 610 and back part 620 are configured to form a hollow inside them when fitted and assembled together. A movable mechanism which is the same as that of the above fifth embodiment is embedded in the headrest frame 600 by use of the hollow.

Figure 41:
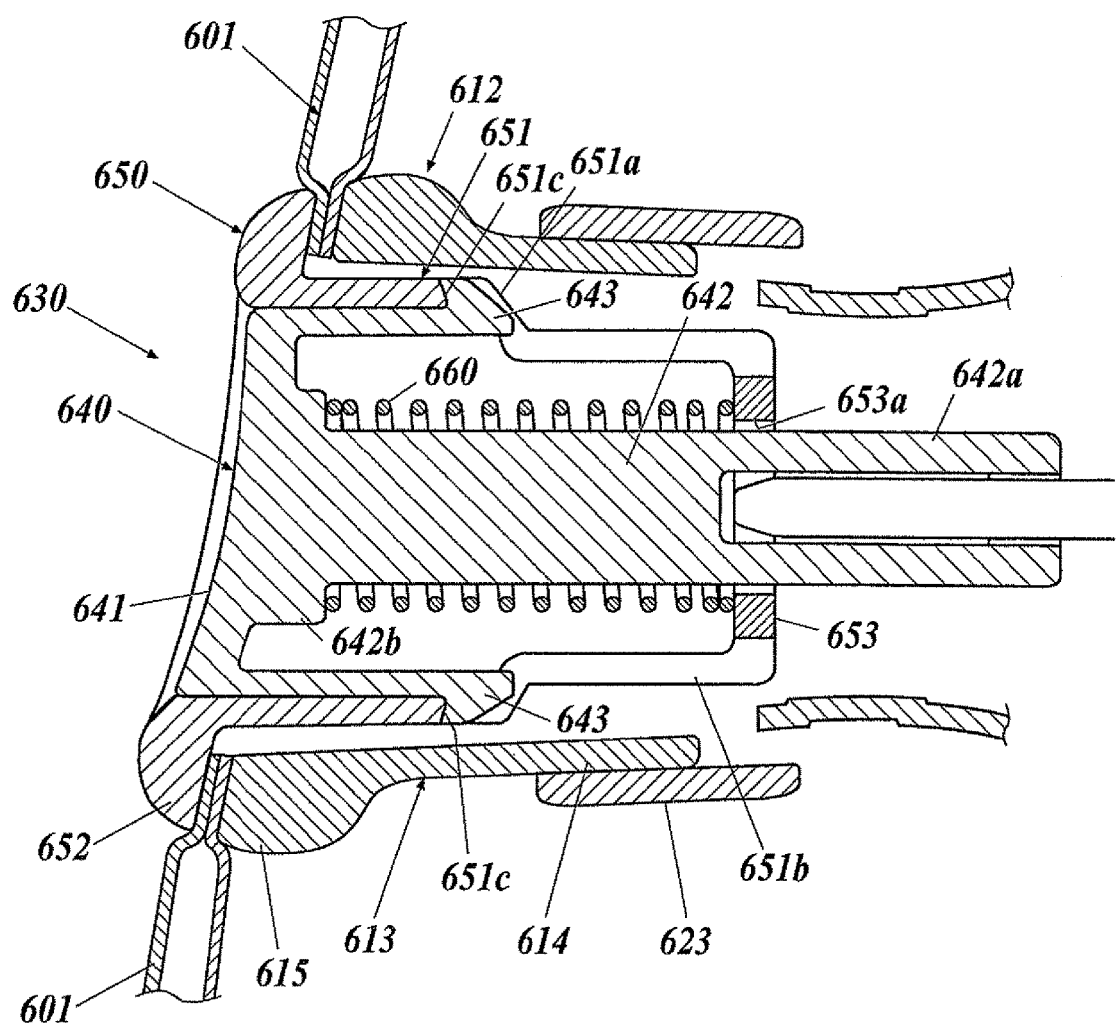
FIG. 41 is a cross-sectional view showing a configuration in the vicinity of a button.

A button mount 612 to attach the button 630 as shown in FIGS. 40 and 41 is integrally formed on a peripheral wall 611 of the front part 610, and protrudes sideward.

As shown in FIG. 42, the button mount 612 includes an insertion tube 613 which is provided at the protrusion tip-side end and in which the tubular button 630 is inserted. The protrusion base-side end of the button mount 612, i.e. the peripheral wall 611-side end is formed as extension of the peripheral wall 611.

The insertion tube 613 includes a tube body 614 and a flange 615 which is provided at the outer end rim of the tube body 614 and which has a larger diameter than the opening of the tube body 613.

As shown in FIGS. 40 to 42, a cover 622 is integrally provided to the peripheral wall 621 of the back part 620. The cover 622 protrudes sideward, and covers the back face of the button 612 of the front part 610.

As shown in FIG. 42, the cover 622 is formed in an arc shape, and includes a cover body 623 which covers the back face of the tube body 614 of the insertion tube 613. This cover body 623 is configured in an arc of more than 180° so that it can cover the upper and lower parts of the front face of the tube body 614.

As shown in FIGS. 40 and 41, the button 630 is provided in such a manner as to be inserted in the opening of the insertion tube 613 of the button mount 612. The movable mechanism is operable with this button 630.

The button 630 is composed of a button body 640 which is attached to the button-side end of the held part 539 of the lock member 538 and a button holder 650 which is attached to the button mount 612 and which holds the button body 640 in a movable manner.

The button holder 650 is inserted from the opening of the insertion tube 613 into the headrest frame 600, and includes a tube 651, a flange 652 and an inner-side wall 653.

Further, this button holder 650 fits in the button mount 612 so as to form a fitting-in structure in which they engage with each other.

The tube 651 is provided with a step 561a in an intermediate part between the outside and inside of the headrest frame 600, and is so configured that the outer side from this step 651a has a larger diameter than the inner side.

Further, on this tube 651, a plurality of slits 651b and 651b are provided between the step 651a and the inner-side wall 653 which is located at the inner side than the step 651a. These plurality of slits 651b and 651b are placed at intervals along the circumferential direction of the tube 651.

The flange 652 is provided at the outer end rim of the tube 651, and is adapted to have approximately the same diameter with the flange 615 of the insertion tube 613.

Since this flange 652 and the flange 615 of the insertion tube 613 are adapted to have approximately the same diameter, the button holder 650 can be prevented from going down into the insertion tube 613.

Further, the button 630-side end of a skin 601 which covers the headrest frame 600 can be tucked between this flange 652 and the flange 615 of the insertion tube 613. That is, the flanges 615 and 652 function as a sealing structure for filling a resin such as urethane of a cushion pad between the headrest frame 600 and the skin 601.

The inner-side wall 653 corresponds to the bottom of the tube 651, and includes an insertion hole 653a which is formed in the center and receives insertion of a protrusion 642 (described below) of the button body 640.

Further, the part of the inner-side wall 653 between the plurality of slits 651b and 651b and the insertion hole 653a are abutted by a biasing unit 660 described below.

The button body 640 is inserted in the tube 651 of the button holder 650, and is movable back and forth along this tube 651.

Further, this button body 640 includes a face 641, the protrusion 642 and an engaging part 643.

The face 641 is a part which an operator of the button 603 directly touches.

The protrusion 642 protrudes from the back face of the face 641 toward the inside of the headrest frame 600, and its protrusion tip is provided with a holder 642a which holds the button-side end of a held part 539 of the lock mechanism 538. Further, the protrusion base end is provided with a step 642b, and is adapted to have a larger diameter than the other parts of the protrusion 642. This step 642b is a part which the biasing unit 660 described below abuts.

The engaging part 643 protrudes from the rim of the face 641 toward the inside of the headrest frame 600. A plurality of engaging parts 643 are provided corresponding to the plurality of slits 651b and 651b.

The tips of the plurality of engaging parts 643 and 643 are formed in a hook shape, and are adapted to engage with the tube 651 at the position of ends 651c and 651c of the plurality of slits 651b and 651b. That is, since these plurality of engaging parts 643 and 643 are engaged with the tube 651, the button body 640 can be prevented from falling out of the button holder 650.

Further, the plurality of engaging parts 643 and 643 are adapted to slide along the plurality of slits 651b and 651b according to button operation.

The biasing unit is provided between the button body 640 and the button holder 650. The biasing unit 600 brings back the button 530 to the original position after the engaging part 540 is operated by moving the button 630 and the held part 539 of the interlock.

In more detail, the biasing unit 660 of the variation is a coil compression spring, and the protrusion 642 of the button body 640 is inserted in this compression spring 660. Further, one end of this compression spring 660 abuts the inner-side wall 653, and the other end abuts the step 642b of the protrusion 642. That is, the compression spring 660 can be placed as shown in FIG. 41 in such a way that before the button 640 is inserted into the tube 651 of the button holder 650, the compression spring 660 is previously attached to the protrusion 642, and the button body 640 is then inserted into the tube 651 of the button holder 650.

Further, this compression spring 660 is placed nearer to the button 630 than the lock bracket 504.

The compression spring 660 can bring back the held part 539 to the original position after the button body 640 of the button 630 is pushed in so as to operate the engaging part 540 through the held part 539 which moves in conjunction with the movement of the button body 640 That is, since the button body 640 and the held part 539 move in conjunction with each other, the button body 640 can be brought back to the original position together with the held part 539. The engaging part 540 can also be brought back to the original position accordingly. This enables to operate the engaging part 540 with the button 533 repeatedly.

According to the variation as described above, since the compression spring 660, which is the biasing unit to bring the button 540 back to the original position, can be placed near the button 630, the accuracy can be improved in bringing back the button to the original position. Therefore, rattle can be prevented in button operation. Further, since the compression spring 660 is provided between the button holder 650 which is attached to the button mount 612 and the button body 640 which is held by this button holder 650 in a movable manner, the button body 640 is affected by the biasing force of the compression spring 660 more directly. Therefore, the accuracy can be improved in bringing back the button body 640 to the original position by the compression spring 660, and rattle can thus be prevented in button operation more effectively.

[Variation 2]

Next, a variation of the decoration rim of the embodiment will be described.

In the description of this variation, with respect to configurations similar to those of the above fifth embodiment, the same reference numerals are used and their descriptions are omitted.

Figure 43:
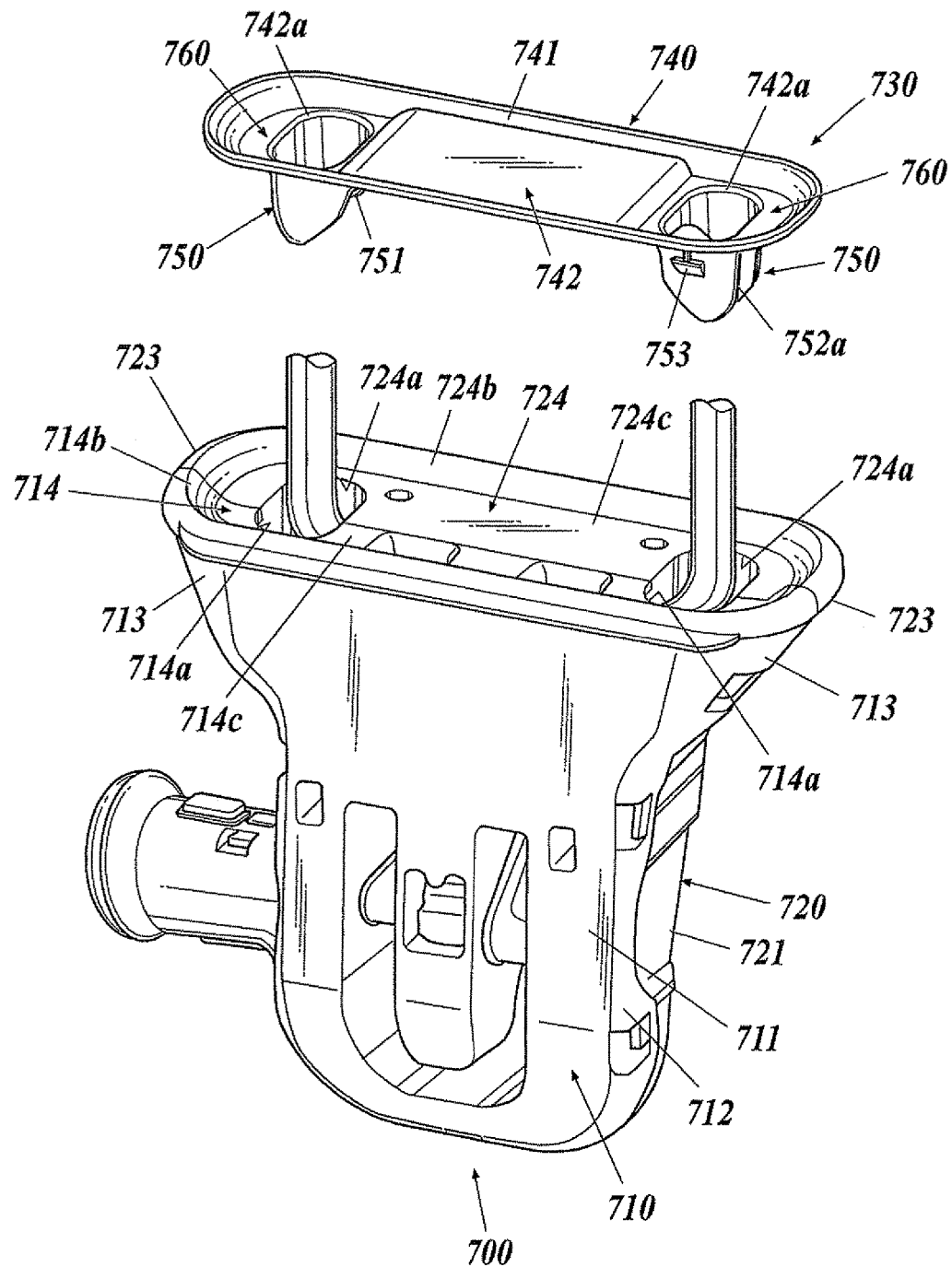
FIG. 43 is a perspective view showing a state where a decoration rim is attached onto the bottom of a headrest frame.
Figure 45:
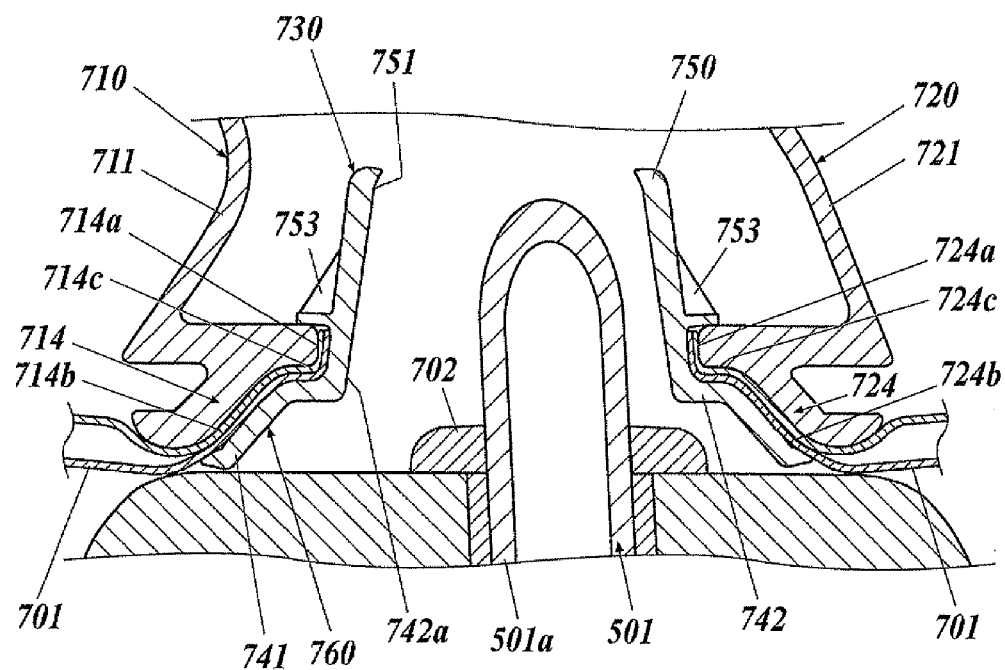
FIG. 45 is a cross-sectional view showing the vicinity of an insertion part of a decoration rim which is attached on to the bottom of a headrest frame.
Figure 46:
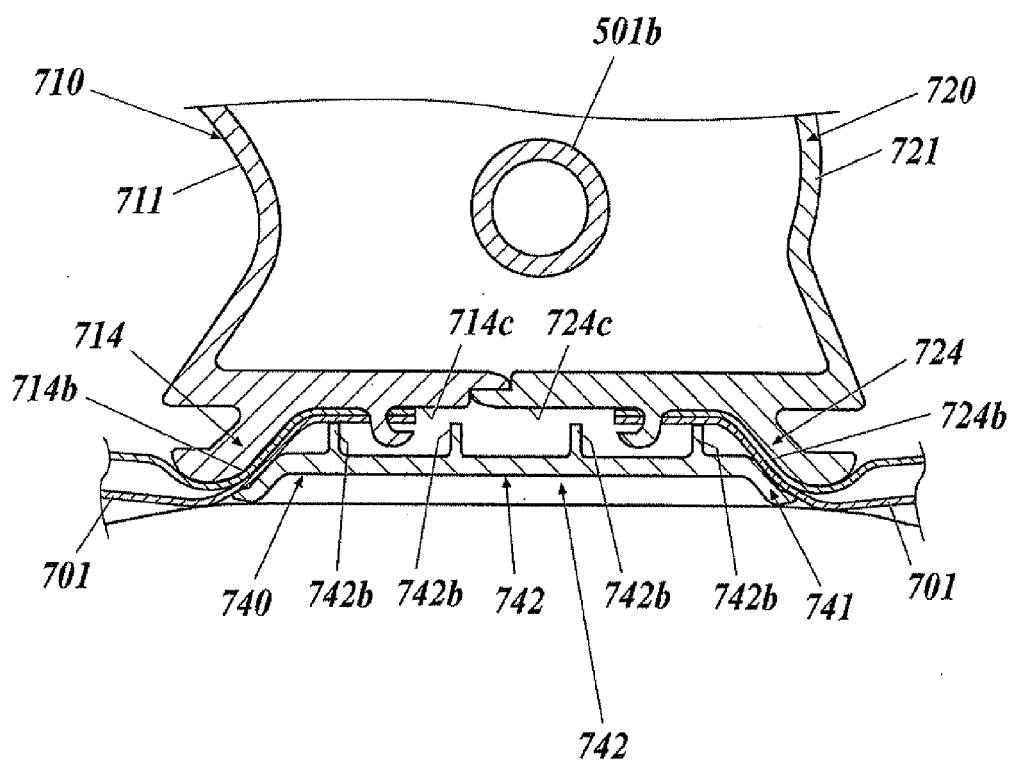
FIG. 46 is a cross-sectional view showing the vicinity of a connection part of a decoration rim which is attached on to the bottom of a headrest frame.

As shown in FIGS. 43, 45 and 46, a headrest frame 700 according to this variation includes a front part 710 and a back part 720.

The front part 710 and back part 720 have a fitting-in structure in which their rims engage with each other. These front part 710 and back part 720 are configured to form a hollow inside them when fitted and assembled together. A movable mechanism which is the same as that of the above fifth embodiment is embedded in the headrest frame 700 by use of the hollow.

The front part 710 includes a front wall 711, a peripheral wall 712, bulges 713 and 713, a bottom 714 and the like. These front wall 711, peripheral wall 712, bulges 713, bottom 714 and the like are integrally formed.

The bottom 714 is provided continuously to the peripheral wall 712 along the lower rims of the front wall 711 and bulges 713 and 713, and forms the bottom face of the front part 710.

Figure 44:
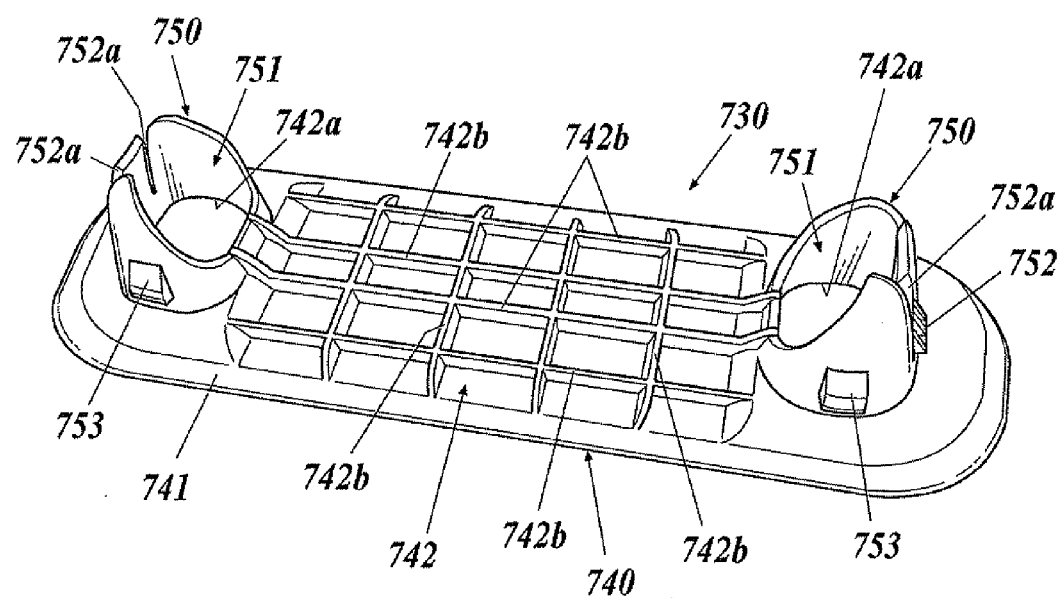
FIG. 44 is a perspective view of a decoration rim.

Cutoffs 714a and 714a are formed on this bottom 714, to which a decoration rim 730 as shown in FIGS. 43 and 44 is fitted in.

The back part 720 includes a rear wall 721, a peripheral wall 722, bulges 723 and 723, a bottom 724 and the like. These rear wall 721, peripheral wall 722, bulges 723, bottom 724 and the like are integrally formed.

The bottom 724 is provided continuously to the peripheral wall 721 along the lower rims of the rear wall 721 and bulges 723 and 723, and forms the bottom face of the rear part 720.

Cutoffs 724a and 724a are formed on this bottom 724, to which the decoration rim 730 as shown in FIGS. 43 and 44 is fitted in.

The bottom 714 of the front part 710 and the bottom 724 of the back part 720 recess toward the inside of the headrest frame 700 as shown in FIG. 43 when the front part 710 and back part 720 are fitted and assembled together.

In more detail, the bottom 714 includes: an inclined face 714b which gradually rises from the lower rims of the front wall 711 and bulges 713 and 713; and an upper face 714c which is located at the upper end of the inclined face 714b. The cutoffs 714a and 714a are formed on this upper face 714c.

Further, the bottom 724 includes: an inclined face 724b which gradually rises from the lower rims of the front wall 721; and bulges 723 and 723 and an upper face 724c which is located at the upper end of the inclined face 724b. The cutoffs 724a and 724a are formed on this upper face 714c.

The cutoffs 714a and 714a and cutoffs 724a and 724a are provided at the positions corresponding to a pair of poles 501a and 501a of a headrest pillar 501.

The decoration rim 730 of the variation as shown in FIG. 44 is attached to the above-described bottoms 714 and 724.

The decoration rim 730 decorates the bottoms 714 and 724, and includes a decoration cover 740 and insertion parts 750 and 750.

The decoration cover 740 is provided covering the bottoms 714 and 724 of the front part 710 and back part 720, and recesses toward the inside of the headrest frame 700 similarly to the shape of the bottoms 714 and 724. Further, this decoration cover 740 includes an inclined abutting part 741 and upper face abutting part 742.

The inclined abutting part 741 is provided at the peripheral rim of the decoration cover 740, and abuts and overlaps with the inclined faces 714b and 724b of the bottoms 714 and 724 from below when the decoration rim 740 is attached, and is adapted to have approximately the same inclination angle with the inclination faces 714b and 724b.

The upper face abutting part 742 is provided at a position closer to the center of the decoration cover 740 than the inclination abutting part 741, and abuts and overlaps with the upper faces 714c and 724c of the bottoms 714 and 724 from below when the decoration rim 740 is attached. The upper face abutting part 742 is placed in parallel with the upper faces 714c and 724c.

Openings 742a and 742a which the pair of poles 501a and 501a of the headrest pillar 501 are inserted through are formed in both ends of the upper face abutting part 742 at the positions corresponding to the cutoffs 714a, 714a, 724a and 724a.

Further, the upper face abutting part 742 includes a reinforcement 742b which reinforces this upper face abutting part 742.

The insertion parts 750 and 750 are tubes which are provided standing upward (toward the inside of the headrest frame 700) at the rims of the openings 742a and 742a of the upper face abutting part 742.

Inward openings 751 and 751 are respectively formed in the tubular insertion parts 750 and 750 corresponding to the lateral shaft 501b of the headrest pillar 501. In other words, these openings 751 and 751 are placed to be opposed to each other.

Further, a plurality of hook-shaped engaging parts 752 and 753 are integrally formed around the insertion parts 750. Of these plurality of engaging parts 752 and 753, the engaging parts 752 which are located at both lateral ends of the decoration rim 740 are elastic due to slits 752a and 752a which are formed at both ends of each engaging part 752 of the insertion parts 750.

The engaging parts 753 are provided at each of the front part 710-side and back part 720-side of the insertion parts 750.

After the insertion part 750 is inserted into the openings which are formed by fitting the cutoffs 714a and cutoffs 724a, these plurality of engaging parts 752 and 753 engage with the inner face of the upper face 714c of the front part 710 and the inner face of the upper face 724c of the back part 720. Since the engaging parts 752 are elastic, they can be bent when the insertion parts 750 is inserted. Therefore, the insertion parts 750 can be easily inserted into the openings which are formed by fitting the cutoffs 714a and cutoffs 724a. Further, since the insertion parts 750 themselves also flexible due to the openings 751 and slits 752a and 752a, the insertion parts 750 can be easily inserted into the openings which are formed by fitting the cutoffs 714a and cutoffs 724a.

In this way, the attachment of the decoration rim 730 to the headrest frame 700 is completed when the insertion parts 750 and 750 are inserted in the openings which are formed by fitting the cutoffs 714a and cutoffs 724a.

At this moment, the bottom 714-side end and bottom 724-side end of a skin 701 which covers the headrest frame 700 can be tucked between the decoration rim 730 and the bottoms 714 and 724 of the headrest frame 700. That is, the decoration rim 730 and the bottoms 714 and 724 function as a sealing structure for filling a resin such as urethane of a cushion pad between the headrest frame 700 and the skin 701.

In more detail, the rim of the decoration rim 730 can seal the whole periphery of the bottoms 714 and 724 of the headrest frame 700. Furthermore, the part of the upper face abutting part 742 around the insertion parts 750 can seal the whole peripheries of the openings which are formed by fitting the cutoffs 714a and cutoffs 724a of the bottoms 714 and 724 of the headrest frame 700.

In the variation, the reinforcement 742b of the upper face abutting part 742 is a plurality of ribs 742b . . . which are integrally formed with the upper face abutting part 742 and which are provided in a reticular shape to the upper face of the upper face abutting part 742 over a broad area between the insertion parts 750 and 750

Of these plurality of ribs 742b, the ribs 742 which are provided between one insertion part 750 and the other insertion part 750 extend to the edges of the openings 751 of the insertion parts 750 so that they can reinforce the insertion parts 750.

The part of the lower face of the upper face abutting part 742 between the insertion parts 750 and 750 protrudes downward over the surroundings of the openings 742a and 742a which are formed at both ends of the upper face abutting part 742.

In other words, the surroundings of the openings 742a and 742a recess toward the inside of the headrest frame 700 compared to the lower face. The recesses of the surroundings of the openings 742a and 742a define housings 760 and 760 which house the upper ends of headrest guides 702 and 702 supporting the pair of poles 501a and 501a of the headrest pillar 501.

The housings 760 are formed larger than the upper ends of the headrest guides 702.

Taking the movement of the movable mechanism into account, the fore-aft length of the housings 760 are adapted to be longer than the fore-aft length of the upper ends of the headrest guide 702. In this way, contact with the upper ends of the headrest guides 702 occurs less during the fore-aft movement of the headrest frame 700.

Further, the vertical depth of the housings 760 is adapted to be longer than the height of the upper ends of the headrest guides 702. In this way, even when the headrest frame 700 is adjusted in height along the headrest pillar 501, the decoration rim 730 gets less contact with the upper ends of the headrest guide 702 since it gets contact with the upper end of a seat back before it gets contact with the upper ends of the headrest guides 702.

According to the variation as described above, the upper ends of the headrest guides 702 and 702 can be housed in the housings 760 and 760 formed at both sides of the decoration rim 730, and the decoration rim 730 gets less contact with the upper ends of the headrest guides 702. In this way, the decoration rim 730 as well as headrest guides 702 gets less flaws. Also, abnormal noise can be suppressed in operating the headrest frame 700.

According to one aspect of the preferred embodiments of the present invention, there is provided a headrest fore-aft position adjuster including a displaceable body which receives load of an occupant's head and which displaces in a fore-aft direction with respect to a headrest pillar and a lock mechanism which locks and unlocks the displaceable body at a plurality of positions along the fore-aft direction, and the lock mechanism includes an engaging part which displaces in the fore-aft direction integrally with the displaceable body, a plurality of engaged part which is provided along a trajectory of the engaging part and which the engaging part is engaged with in a locked state and the engaging part is configured to engage with the engaged parts from a lateral position.

According to the present invention as above, the displaceable body can be adjusted in fore-aft position only by engaging the engaging part with the plurality of engaged parts which are provided along the trajectory of the engaging part. Furthermore, since the engaging part is configured to engage with the engaged part from the lateral position, it does not require, for example, a conventional long shaft provided along the fore-aft direction of the headrest. As a result, it can be avoided that the headrest gets long, i.e. thick in the fore-aft direction.

In this way, the simple and lightweight headrest fore-aft position adjuster can be composed without using relatively large parts which correspond to the size of the headrest as well as many processed parts with holes, grooves and the like.

Preferably, the lock mechanism further includes a button which is held by the displaceable body and which is used for operating the engaging part, an interlock which connects the engaging part with the button and which moves in conjunction with movement of the button and a biasing unit which brings back at least one of the button and the interlock to an original position after the engaging part is operated by moving the button and the interlock.

According to the present invention as above, the biasing mean can bring back at least one of the button and interlock to the original position after the engaging part is operated. If the biasing unit bring back at least one of the button and interlock to the original position, the engaging part can also be brought back to the original position. Therefore, the engaging part can be operated with the button repeatedly.

Preferably, the headrest fore-aft position adjuster further includes a lower bracket which is fixed to the headrest pillar, an upper bracket as the displaceable body which is fixed to an inner cover of a headrest, one and the other links which are each pivotally connected with the lower bracket and upper bracket and which allows the upper bracket to move along the fore-aft direction of a vehicle seat and the lock mechanism which lock and unlocks the upper bracket at a plurality of positions along the fore-aft direction, and the lock mechanism comprises: the plurality of engaged parts which are aligned on a side wall of the one link opposed to the upper bracket along a rotational direction of the one link, a through hole which is provided on a side wall of the upper bracket opposed to the one link at a position on a rotational trajectory of the plurality of engaged parts according to rotation of the one link, and a lock member which comprises at least a lock pin as the engaging part whose tip is pushed into and pulled out from the plurality of engaged parts while the lock pin remains inserted through the through hole.

According to the present invention as above, since the upper bracket can be moved in the fore-aft direction according to the rotation of the one and other links, the inner cover of the headrest, which this upper bracket is fixed to, can also be moved in the fore-aft direction together.

Further, the tip of the lock pin is pushed into and pulled out form the plurality of engaged parts while the lock pin remains inserted through the through hole which is provided along the rotational trajectory of the plurality of engaged part. Thus, while the lock pin is pushed in one of the plurality of the engaged parts . . . , the fore-aft movement of the upper bracket can be locked by holding the rotation of one link. While the lock pin is pulled out from the plurality of engaged parts . . . , the locked fore-aft movement of the upper bracket can be unlocked by allowing one link to rotate.

In this way, the simple and lightweight headrest fore-aft position adjuster can be composed without using relatively large parts which correspond to the size of the headrest as well as many processed parts with holes, grooves and the like.

Preferably, the lock member is composed of the lock pin, a shaft which is placed in parallel with the lock pin and which is inserted through a shaft insertion hole which laterally penetrates the upper bracket and a connection part which connects the lock pin with the shaft and which abuts and separates from the side wall of the upper bracket according to push-in and pull-out movement of the lock pin, and the shaft is provided with a biasing member as the biasing unit which biases the shaft in a direction that the connection part abuts the side wall of the upper bracket and the lock pin is pushed in the engaged parts.

According to the present invention as above, by pushing in the shaft along the shaft insertion hole in the direction opposite to the biasing direction by the biasing member, the lock pin can be operated in such a direction as to be pulled out from the engaged parts as well as the connection part can be operated in such a direction as to be separated from the side wall of the upper bracket. Further, since the shaft is biased by the biasing member, when the push-in operation along the shaft insertion hole is stopped, the lock pin can be inserted into the engaged part as well as the connection part can abut the side wall of the upper bracket.

Further, since the shaft penetrates the upper bracket laterally and is biased by the biasing member, the shaft can be prevented from falling off from the upper bracket, and the lock member itself can thus be prevented from falling off from the upper bracket.

Further, since the connection part abuts the side wall of the upper bracket, this connection part can be used as a stopper which prevents the lock pin biased by the biasing member from being pushed in unnecessary deep to the plurality of engaged parts.

Further, since the lock member can be relatively a small component which is composed of the lock pin, shaft and connection part, it can contribute to simplification and weight reduction of the fore-aft position adjuster.

Preferably, the biasing member is provided to the shaft in a manner that a biasing direction of the biasing member accords with an axis direction of the shaft.

According to the present invention as above, since the axis of the shaft can be coordinated with the biasing direction of the biasing member, the shaft easily move in the biasing direction of the biasing member.

Preferably, the side wall of the upper bracket is provided with a step which protrudes outward in a table shape and on which the through hole is formed, and a stroke of the shaft in a direction opposite to the biasing direction of the biasing member is adapted to be shorter than a stroke that the lock pin falls off from the through hole.

According to the present invention as above, since the stroke of the shaft is adapted to be shorter than such a stroke that the lock pin falls off from the through hole, the lock pin can be reliably prevented from falling off from the through hole even if the lock pin operably moves in such a direction that the lock pin falls off from the through hole. Further, since the step protrudes outward from the side wall of the upper bracket, and the through hole is formed on this step, when the lock pin is displaced in a direction of removing it from through hole, the through hole is located closer to a base end of the lock pin than to its tip. In this way, the lock pin can be reliably prevented from falling off from the through hole.

Preferably, the lock pin includes a shaft body, a taper which is provided at a tip of the shaft body and which narrows in diameter toward a tip of the lock pin in an axis direction; and a shaft tip which is provided at a tip of the taper and which is adapted to have a smaller diameter than the shaft body, and hole walls of the engaged parts includes a taper support which receives the taper of the lock pin and a tip support which receives the shaft tip of the lock pin.

According to the present invention as above, by pushing in the lock pin to the engaging parts, the taper of the lock pin can abut the tapered support of the hole wall of engaged parts as well as the shaft tip can abut the tip support. In this way, the lock pin can be reliably pushed into the engaged parts, as well as rattle or noise can be prevented.

Further, since the shaft tip of the lock pin abuts the tip support of the hole wall of the engaged parts, when the lock pin is subject to force in a torsional direction, for example, the tip support can support the lock pin which is to displace in the torsinoal direction. That is, when the shaft tip is pulled out from the tip support, it is required to remove it along the axis direction of the shaft tip. Even if the lock pin is subject to the force in the torsional direction, the lock pin is resistant to falling off from the engaged parts.

Preferably, a biasing unit is provided between the upper bracket and the lower bracket and biases the upper bracket toward the lower bracket.

According to the present invention as above, since the biasing unit is provided between the upper bracket and lower bracket and biases the upper bracket toward the lower bracket, the upper bracket is pulled toward the lower bracket even during the fore-aft movement. Therefore, noise can be suppressed, which may be caused by the members getting contact to each other.

Preferably, the lock pin, the shaft and the connection part are integrally formed.

According to the present invention as above, since the lock pin, shaft and connection part are formed integrally, the number of parts can be reduced compared to the case where they are not integrally formed, as well as a process like connecting the lock pin to the shaft with the connection part can be omitted.

Preferably, the connection part includes flexion parts which are provided on both ends integrally with the lock pin and the shaft respectively and a straight part which is provided between the flexion parts, and a step of the upper bracket is provided with a convex which protrudes outward and which abuts the straight part of the connection part at least at a point when the lock pin is pushed in the engaged parts.

According to the present invention as above, since the straight part of the connection part abuts the convex when the lock pin is pushed in the engaged parts, the flexion parts of the connection part can be separated from the step of the upper bracket. In this way, it can be reliably prevented, for example, that the flexion parts stuck at an edge of the through hole or shaft insertion hole, which may happen in the absence of the convex.

Further, since the convex which protrudes outward is provided on the step of the upper bracket, the rigidity of the surrounding step of the convex can be improved.

Preferably, the headrest fore-aft position adjuster further includes a lock bracket which is supported by the headrest pillar, a headrest frame as the displaceable body which receives the occupant's head and which is attached to the headrest pillar in an adjustable manner in the fore-aft direction and the lock mechanism which locks and unlocks the headrest frame at a plurality of positions along the fore-aft direction with respect to the lock bracket, and the lock mechanism includes a ratchet as the engaged parts which is formed at a tip of the lock bracket and which comprises a plurality of engaging teeth and a plurality of concave grooves which are alternately placed along a moving direction of the headrest frame and a lock member which comprises at least the engaging part which is held by the headrest frame and placed along a lateral direction and which is biased so as to engage with the plurality of engaging teeth according to movement of the headrest frame, and the lock bracket is placed closer to a protrusion end of the lock bracket than the ratchet separately from the ratchet and comprises a connection part which connects a front end and a rear end of the tip of the lock bracket to each other.

According to the present invention as above, the lock member is placed along the lateral direction and engages with the plurality of engaging teeth of the lock bracket supported by the headrest pillar from a lateral position. That is, the lock member, which is not placed along the fore-aft direction or vertical direction but along the lateral direction, is moved in the fore-aft direction together with the headrest frame. Thus, the space for the lock member to move in the fore-aft direction or vertical direction can be reduced as much as possible. In this way, the headrest can be prevented from increasing in size in the fore-aft direction or vertical direction, which contributes to downsizing the headrest.

Further, since the connection part is provided at the tip end of the lock bracket, the rigidity around the ratchet is improved. Thus, the surroundings of the ratchet can be prevented from deformation. In this way, since it is not required to thicken the lock bracket or to provide other reinforcing structures in order to improve the rigidity of the lock bracket or the surroundings of the ratchet, the headrest can be prevented from increasing in size due to the increase of the lock bracket in size.

Therefore, the simple and lightweight headrest fore-aft position adjuster can be composed without using relatively large parts which correspond to the size of the headrest as well as many processed parts with holes, grooves and the like.

Preferably, the biasing unit is placed closer to the button than to the lock bracket.

According to the present invention as described above, since the biasing unit to bring back the button to the original position can be placed near the button, the accuracy can be improved in bringing back the button to the original position. Therefore, rattle can be prevented in button operation.

Preferably, the headrest frame includes a button mount which is provided at a side wall of the headrest frame and to which the button is attached, the lock member includes the engaging part and a held part as the interlock which are held by the headrest frame, and the button includes a button body which is attached to a button-side end of the held part and a button holder which is attached to the button mount and which holds the button body in a movable manner, and the biasing unit is provided between the button body and the button holder.

According to the present invention as above, since the biasing unit is provided between the button which is attached to the button mount and the button body which is held by this button holder in a movable manner, the button body is affected by the biasing force of the compression spring more directly. Therefore, the accuracy can be improved in bringing back the button to the original position by the biasing unit, and rattle can thus be prevented in button operation more effectively.

Preferably, a rear end face of a rearmost engaging tooth of the plurality of engaging teeth is opposed to a ratchet-side face of a rear end of the connection part, and the ratchet-side face of the connection part is provided along the rear end face of the engaging tooth.

According to the present invention as above, the rear face of the rearmost engaging tooth and the ratchet-side face of the rear end of the connection part are opposed to each other, and the ratchet-side face of the connection part is provided along the rear end face of the engaging tooth. Thus, since this enables the lock member to smoothly pass through between the engaging tooth and the rear end of the connection part, abnormal noise or the like can be suppressed, which may occur when the lock member passes through.

Preferably, the rear end of the connection part is adapted to come closest to a back part of the headrest frame when the headrest frame inclines forward most, and the plurality of the engaging teeth are inclined forward and the rear end of the connection part is inclined forward corresponding to the plurality of the engaging teeth.

According to the present invention as above, since the plurality of engaging teeth . . . are inclined forward, and the rear end of the connection part is also inclined forward corresponding to the plurality of the engaging teeth . . . , the rear end of the tip end of the lock bracket has a shape as if its edge were cut off. That is, the rear end of the connection part, which is adapted to come closest to the back part of the headrest frame, can be prevented from protruding significantly toward the back face of the headrest frame when the headrest frame is inclined forward the most. Thus, the headrest can be prevented from increasing in size in the fore-aft direction. This contributes to further downsizing the headrest.

Preferably, the back part of the headrest frame is provided with a rear protrusion which is opposed to the rear end of the connection part and which protrudes backward from an outer face of the headrest frame, in which a concave is formed on an inner face of the headrest frame at a position corresponding to the rear protrusion.

According to the present invention as above, since the concave is formed at the rear protrusion which is provided to the back part of the headrest frame, the rear end of the connection part, which is opposed to this rear protrusion, can be placed near the headrest frame. In this way, regarding the other parts of the back part of the headrest frame than the rear protrusion, it is not required to protrude them more than the rear protrusion. Therefore, the headrest can be prevented from increasing in size. This contributes to further downsizing the headrest.

Preferably, the lock bracket comprises a slotted hole which is formed at a position closer to the headrest pillar than the ratchet and which is adapted to be shorter than a fore-aft length of the ratchet.

According to the present invention as above, forming the slotted hole on the lock bracket can contribute to corresponding weight reduction of the lock bracket, which leads weight reduction of the headrest itself.

Further, since this slotted hole is adapted to be shorter than the fore-aft length of the ratchet, decrease in rigidity of the ratchet can be reduced in comparison with the case where it is longer than the fore-aft length of the ratchet, for example.

Further, since the slotted hole is formed closer to the headrest pillar than the ratchet, it can be expected that the slotted hole cushions the load on the ratchet.

Preferably, the headrest pillar comprises a lateral shaft which is placed laterally, a plurality of biasing members are provided between the headrest frame and the lateral shaft of the headrest pillar, and bias the headrest frame toward the lateral shaft, and the plurality of the biasing members are placed separately from each other along a longitudinal direction of the lateral shaft, and the lock bracket is fixed to the lateral shaft at a position between the plurality of the biasing members.

According to the present invention as above, since the lock bracket is fixed to the lateral shaft at a position between the plurality of the biasing members which are placed along the longitudinal direction of the lateral shaft separately from each other, they can apply the biasing force to the headrest frame in such a good balance as to avoid torsion, inclination or the like. In this way, since the headrest frame can be attached in a good condition, the headrest frame can be supported stably.

What is claimed is:

1. A headrest comprising:
   a hollow headrest frame which receives an occupant's head and which can be displaced in a fore-aft direction;
   a lock mechanism which locks the headrest frame at a plurality of positions along the fore-aft direction; and
   a first operating portion for operating the lock mechanism, the first operating portion being provided at the headrest frame,
   wherein
   the headrest frame is configured to include convexes respectively provided at right and left sides with respect to the lock mechanism,
   at least one of the convexes is provided with a guiding portion that guides movement of the lock mechanism,
   the lock mechanism is guided by the guiding portion whereby the lock mechanism is movable along right and left directions, and
   a position of one of the convex which faces the operating portion and the guiding portion are overlapped along the right and left directions.

2. The headrest according to claim 1, wherein
   the guiding portion is provided on each of the left and right convexes, or on one of the left and right convexes that is provided nearer to the first operating portion.

3. The headrest according to claim 1, wherein
   the guiding portion is a hole formed on the convex so as to extend along the right and left directions.

4. The headrest according to claim 1, wherein the at least one of the convexes is provided with wall portions which are formed so as to extend along the right and left directions and which sandwich the guiding portion along a vertical direction.

5. The headrest according to claim 4, wherein
a surface of the headrest frame opposite to a surface on which the convex is formed is provided with a recess which is recessed corresponding to the convex, and
the wall portion extends from the convex on a side of the recess.

6. The headrest according to claim 1, wherein
the headrest frame includes a wall which constitutes an outer circumferential surface of the headrest frame and a reinforcing portion provided between the convex and the wall which constitutes the outer circumferential surface, and
the reinforcing portion is provided at a position of the headrest frame opposite to a position where the first operating portion is provided.

7. The headrest according to claim 1, further comprising:
a movable mechanism which is accommodated in the headrest frame and which enables the headrest frame to move with respect to a headrest pillar,
wherein
the convex is provided aside of the movable mechanism, and
the headrest frame further includes:
    a wall which constitutes a circumferential surface of the headrest frame; and
    at least one reinforcing portion which is provided between the convex and the wall.

8. The headrest according to claim 7, wherein
the at least one reinforcing portion is integrally formed with at least one of the convex and the wall.

9. The headrest according to claim 7, wherein
the at least one reinforcing portion is a plurality of reinforcing portions, and
at least one of the plurality of reinforcing portions is provided at a position which is not overlapped with the movable mechanism along a vertical direction.

10. The headrest according to claim 7, wherein
the at least one reinforcing portion is a plurality of reinforcing portions, and
at least one of the plurality of reinforcing portions is provided at a position which is overlapped with the movable mechanism along a vertical direction.

11. The headrest according to claim 7, wherein
the headrest frame is configured to be able to divided into a front part and a back part which are formed so as to engage with each other by rims thereof and which each have a fitting structure engaging with each other,
the fitting structure is composed of a plurality of engaging hooks provided along the rim of one of the front part and back part and a plurality of engaging concaves provided along the rim of the other of the front part and back part, and
the rim of the other of the front part and back part has an inner wall and an outer wall which form a groove into which the rim of the one of the front part and back part is fitted, and the engaging concave is provided in the groove.

12. The headrest according to claim 11, wherein
the engaging hooks and the engaging concaves are provided in proximity of the reinforcing portion.

13. The headrest according to claim 7, further comprising
a second operating portion for operating the movable mechanism, wherein the reinforcing portion is provided at a position of the headrest frame opposite to a position where the second operating portion is provided.

* * * * *